United States Patent
Di Girolamo et al.

(10) Patent No.: US 11,985,195 B2
(45) Date of Patent: May 14, 2024

(54) METHODS TO ENABLE DATA CONTINUITY SERVICE

(71) Applicant: CONVIDA WIRELESS, LLC, Wilmington, DE (US)

(72) Inventors: Rocco Di Girolamo, Laval (CA); Quang Ly, North Wales, PA (US); Dale N. Seed, Allentown, PA (US); Catalina Mihaela Mladin, Hatboro, PA (US); William Robert Flynn, IV, Schwenksville, PA (US); Shoshana Loeb, Philadelphia, PA (US); Zhuo Chen, Claymont, DE (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/756,154

(22) PCT Filed: Oct. 23, 2018

(86) PCT No.: PCT/US2018/057013
§ 371 (c)(1),
(2) Date: Apr. 15, 2020

(87) PCT Pub. No.: WO2019/083941
PCT Pub. Date: May 2, 2019

(65) Prior Publication Data
US 2020/0244741 A1    Jul. 30, 2020

Related U.S. Application Data

(60) Provisional application No. 62/575,990, filed on Oct. 23, 2017.

(51) Int. Cl.
*H04L 67/125*    (2022.01)
*G06F 9/50*    (2006.01)
*H04L 67/563*    (2022.01)
*H04W 4/70*    (2018.01)

(52) U.S. Cl.
CPC .......... *H04L 67/125* (2013.01); *G06F 9/5011* (2013.01); *H04L 67/563* (2022.05); *H04W 4/70* (2018.02)

(58) Field of Classification Search
CPC .... H04L 67/125; H04L 67/2814; H04W 4/70; G06F 9/5011
(Continued)

(56) References Cited

U.S. PATENT DOCUMENTS

2009/0024713 A1    1/2009    Strasenburgh et al.
2015/0033311 A1    1/2015    Seed et al.
(Continued)

FOREIGN PATENT DOCUMENTS

| CN | 105409189 A | 3/2016 |
| CN | 107113182 A | 8/2017 |
| WO | 2017/152070 A1 | 9/2017 |

OTHER PUBLICATIONS

"OIC Core Specification V1.1.1 Part 1" Open Connectivity Foundation (OCF), Copyright 2016, 151 pages.
(Continued)

*Primary Examiner* — Meng Vang
*Assistant Examiner* — Chong G Kim
(74) *Attorney, Agent, or Firm* — BakerHostetler

(57) ABSTRACT

A Data Producer may be configured to negotiate and initiate a Data Continuity service with an M2M/IoT system. This service may be for specific data sets or all data sets generated by the Data Producer. The M2M/IoT system may be configured to autonomously decide to start a Data Continuity Service for a data set of a Data Producer. The Data Producer may interact directly with an Aggregator SL to store its aggregated data set, and may also be configured to update and delete entries in this data set and start a data service on this aggregated data set. A Local SL may be configured to
(Continued)

manage all interactions with an Aggregator SL, and the Local SL may be configured to retarget requests from the Data Producer to the Aggregator SL, including a request to start a data service on the aggregated data set.

18 Claims, 46 Drawing Sheets

(58) Field of Classification Search
USPC .......................................................... 709/201
See application file for complete search history.

(56) References Cited

U.S. PATENT DOCUMENTS

| | | |
|---|---|---|
| 2015/0033312 A1 | 1/2015 | Seed et al. |
| 2015/0358864 A1* | 12/2015 | Park .................. H04W 36/0058 370/331 |
| 2016/0094663 A1* | 3/2016 | Seed .................. H04L 41/0213 709/227 |
| 2016/0198284 A1 | 7/2016 | Bhalla |
| 2017/0272894 A1 | 9/2017 | Wang et al. |

OTHER PUBLICATIONS

OneM2M Technical Specification TS-0001 V2.12.0, "Functional Architecture", Dec. 2016, 426 pages.

Pereira, et al., "IoT Interoperability for Actuating Applications through Standardised M2M Communications", 2016 IEEE 17th International Symposium on a World of Wireless, Mobile and Multimedia Networks (WOWMOM), IEEE, Jun. 2016, 6 pages.

* cited by examiner

Application(s)

Service Layer (e.g. oneM2M, etc.)

Application Protocol Layer (e.g. CoAP, etc.)

Transport Layer (e.g. UDP, etc.)

Network Layer (e.g. IPv6, etc.)

MAC/PHY Layer (e.g. IEEE 802.15.4, etc.)

FIG. 2

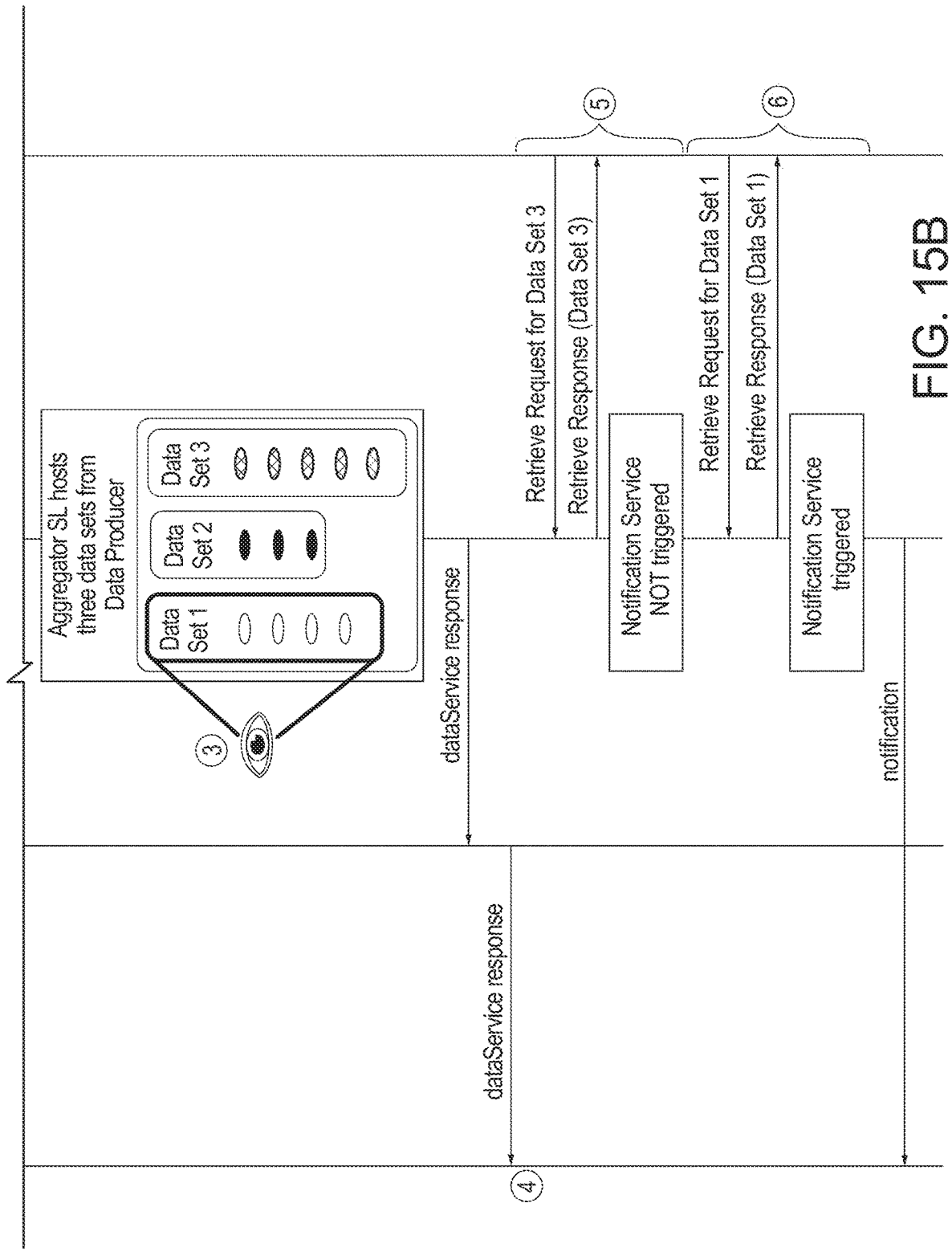

METHODS TO ENABLE DATA CONTINUITY SERVICE

CROSS-REFERENCE TO RELATED APPLICATION

This application is the National Stage Application of International Patent Application No. PCT/US2018/057013, filed Oct. 23, 2018, which claims the benefit of U.S. Provisional Application No. 62/575,990, filed Oct. 23, 2017, the content of which is hereby incorporated by reference in its entirety.

BACKGROUND

A Resource Oriented Architecture (ROA) provides a solution for sharing data in distributed systems. The architecture is based on the concept of a resource and how we interact with this resource. A resource may be anything that can be exposed, from a sensor reading, to a video clip, to a business process, etc. These resources may be hosted on "resource-hosting" entities and may be accessed by "resource-querying" entities. The resources within a ROA may have the following general properties:

They have a unique address within the distributed system. Typically, this is in the form of a Uniform Resource Identifier (URI). The URI makes the resource addressable so that it can be accessed and manipulated by clients. A resource may have multiple URIs (that is multiple addresses), but a URI can only refer to one unique resource. The URI may provide information about the location of the resource and even how to access it;

They have a representation, which provides a view of the state of a resource at a given point in time. When a client retrieves a resource from a server, the resource's representation is provided to the client;

A representation may have a "link" to other resources. An application may proceed by transitioning from one state to another. An application retrieves a resource representation (state of resource A) which includes "links" to other resources. The progression to the next state is influenced by these "links," similar to how a human user navigates the web by following links of web-pages; and They are manipulated by a uniform interface. The main idea is that a small number of verbs (operations) with well-defined and widely accepted semantics, are sufficient to meet the requirements for most applications (see, for example, J. Webber, S. Parastatidis, I. Robinson, "REST in Practice", O'Reilly, 2010). These verbs are used to allow a client to manipulate a resource on a server. For example, the client can Create/Retrieve/Update/Delete (CRUD) a resource. HTTP defined additional verbs (operations) to manipulate resources, but these are not as common (e.g. PATCH, TRACE, HEAD, OPTIONS, CONNECT).

The state information that is tied to a resource makes up its metadata. Often the metadata are defined as resource attributes. These attributes can define properties of the resource. A typical attribute list that defines properties of the resource may include, for example: type, creation time, last modified time, expiration time, access rights, size, number of child resources, parent resource, label/marker, and creator.

The resource attributes may define state information related to some business logic tied to that resource. For example, if the resource is used for storing a temperature sensor reading, one attribute may be the latest reading generated by the sensor.

Within a resource-hosting entity, resources may have a natural hierarchy, with some resources being sub-resources of a parent resource. The net result is that the resources form a resource tree. Resources within this tree have a parent resource, and may have one or more child resources. An example high level overview of a Resource Oriented Architecture is shown in FIG. 1.

SUMMARY

Data Producers (applications, service layers, etc.) rely on service layers to provide three main functionalities: store their data, have their data readily available to Data Consumers, and provide value added services that operate on the stored data. Unfortunately, when Data Producers are mobile, they may store their data in different service layers of the M2M/IoT system. The overall impact of fragmented data being stored in different service layers is that service layers have difficulty simultaneously providing these three main functionalities. Disclosed herein are methods and systems for enhancing the M2M/IoT system so that it provides these functionalities to mobile Data Producers.

A Data Producer may be configured to negotiate and initiate a Data Continuity service with the M2M/IoT system. This service may be for specific data sets or all data sets generated by the Data Producer. The M2M/IoT system may be configured to autonomously decide to start a Data Continuity Service for a data set of a Data Producer. The Data Producer may interact directly with an Aggregator SL to store its aggregated data set, and may also be configured to update and delete entries in this data set and start a data service on this aggregated data set. A Local SL may be configured to manage all interactions with an Aggregator SL, and the Local SL may be configured to retarget requests from the Data Producer to the Aggregator SL, including a request to start a data service on the aggregated data set. The aggregated data set may follow the Data Producer, and the Local SL may have the aggregated data set. Upon a change in Local SL, the current Local SL may retrieve the data set from prior local SLs, including all data services running on the data set.

The aggregated data set may be distributed across all the Local SLs that have served the Data producer, and the M2M/IoT system may maintain links between these Local SLs to assist in finding all the Local SLs that may host a portion of the aggregated data set. Any request to a Local SL that targets the aggregated data set may require the Local SLs to recursively interact with prior Local SLs that may have data that may be part of the aggregated data set. A Local SL may receive a request from a Data Consumer and may propagate this request to Local SLs that have data related to the aggregated data set. A Data Consumer may be notified if a data service that it has started on the aggregated data set has been moved from one local SL to another local SL.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 2 shows an example protocol stack supporting a service layer

FIGS. 15A and 15B show an example of a data service running on data set using Method 1a;

DETAILED DESCRIPTION OF ILLUSTRATIVE EMBODIMENTS

The potential benefit of M2M and IoT has resulted in a number of sector specific (or vertical) applications that enable machines to communicate with each other. For example, solutions can be found in the healthcare sector, the energy sector, and the automotive sector. These solutions have been optimized for these vertical applications, but fail to deliver on the promise of the all-encompassing IoT, where machines and things from different vertical applications interact with each other.

To this end, a number of standards bodies (for example oneM2M) are developing service layers that define a single horizontal platform for the exchange and sharing of data among applications, even those from different industry sectors.

From a protocol stack perspective, service layers are typically situated above the application protocol layer and provide value added services to applications. Hence, service layers are often categorized as 'middleware' services. FIG. 2 shows an example service layer between an IP network stack and applications.

An M2M/IoT service layer can provide Service Users (applications and devices) access to a collection of M2M/IoT-oriented capabilities (M2M/IoT services) supported by the service layer. These capabilities are made available to applications via Application Programming Interfaces (APIs). For example, an M2M/IoT service layer may maintain massive amounts of M2M/IoT data, which can be discovered, retrieved, or subscribed-to by applications (provided these applications have suitable access rights). Additional examples of M2M/IoT services that can be provided by the service layer include security, charging, device management, provisioning, and connectivity management.

A typical M2M/IoT deployment may have a number of entities/nodes that provide various levels of M2M/IoT service functionality. Some of these entities/nodes include, for example, M2M/IoT servers which host M2M/IoT services and are operated by an M2M/IoT service provider, M2M/IoT middle nodes (or gateways) which host M2M/IoT services, M2M/IoT devices which host M2M/IoT services, and "Light" M2M/IoT devices which typically host no M2M/IoT services.

Figure 1:
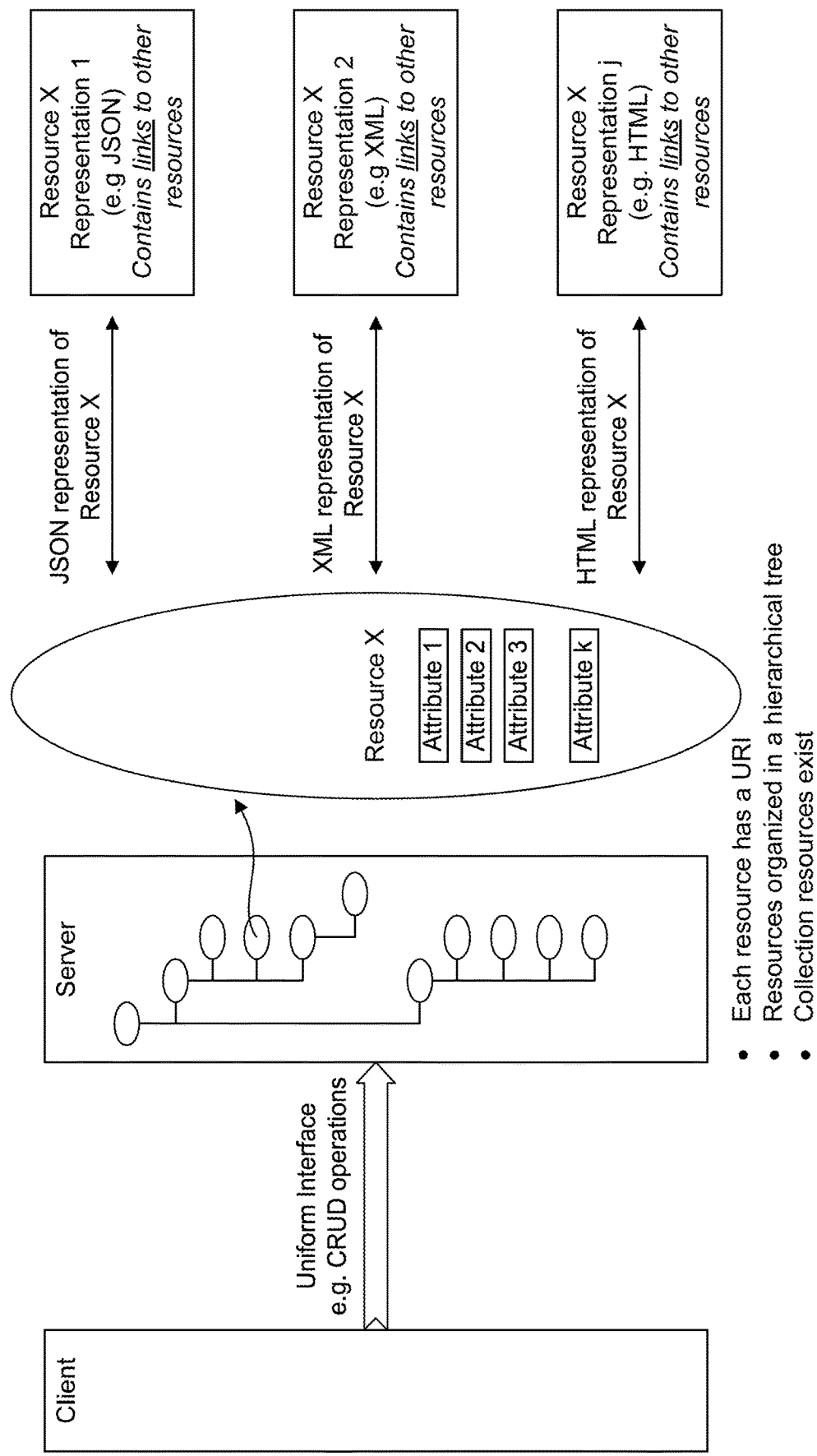
FIG. 1 shows an example high level overview of Resource Oriented Architecture.
Figure 3:
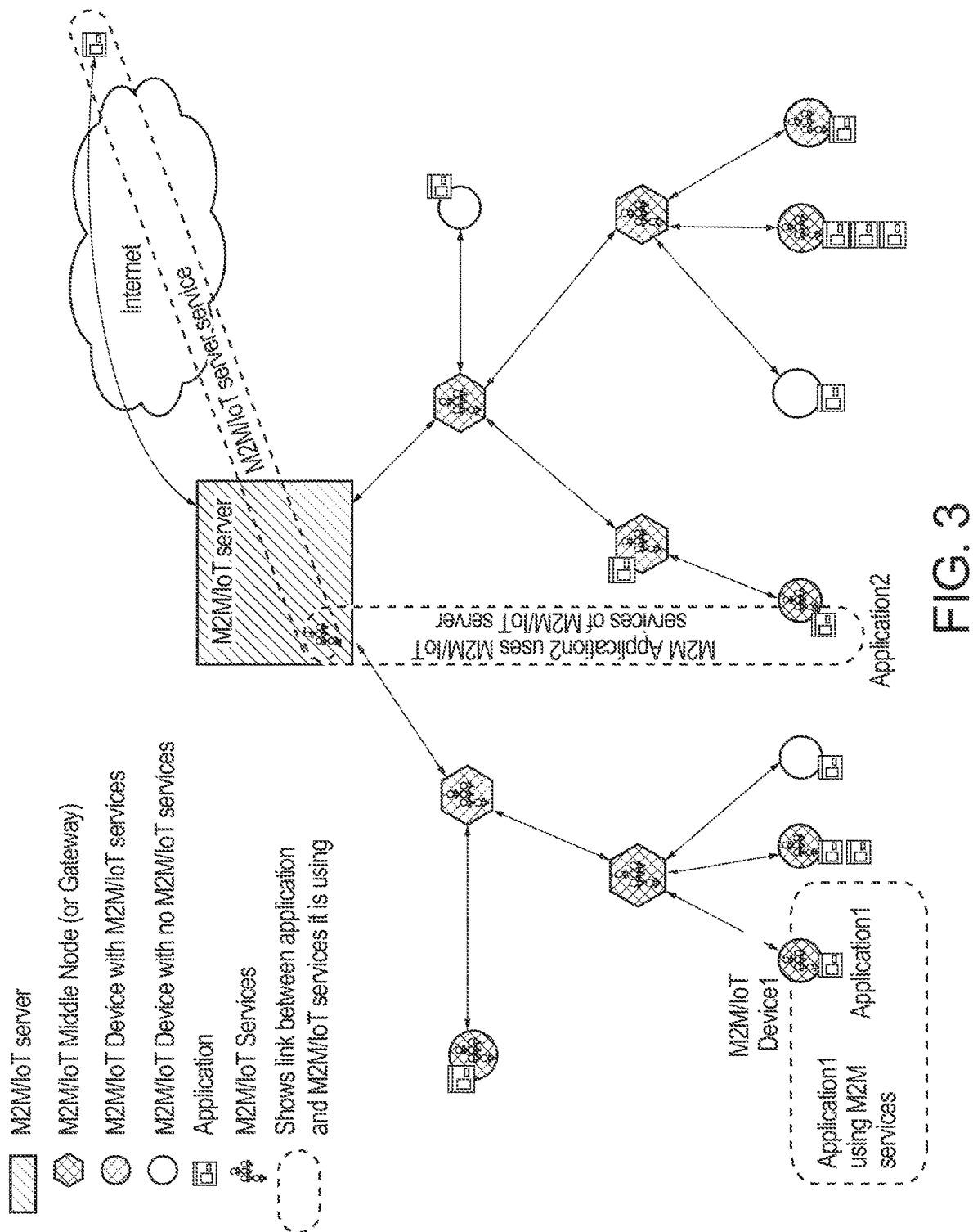
FIG. 3 shows an example M2M/IoT deployment with distributed M2M/IoT services.

Applications, which can either reside on these entities or have access to these entities through a network, may take advantage of the provided M2M/IoT services. As shown in FIG. 3, these M2M/IoT services can be provided locally, for instance, application1 can use the local M2M/IoT services provided by the M2M/IoT Device1 to provide data storage. In addition, the M2M services may also be provided remotely. For instance, application2 can use the services provided by the M2M/IoT server to make its data discoverable. Note that the M2M/IoT services deployment shown is inherently hierarchical and distributed, and this is typical of M2M/IoT service layers described in oneM2M and ETSI M2M.

A number of standardization efforts are ongoing to define M2M/IoT service layers (oneM2M, ETSI M2M, OCF). Each of these different service layers offers a set of M2M/IoT services. A few of these services are unique, offering some differentiation between the service layers. However, a large number of these services are common (for example: data storage, resource discovery, sending notifications). In addition, all these service layers may follow the principles of ROA.

Figure 4:
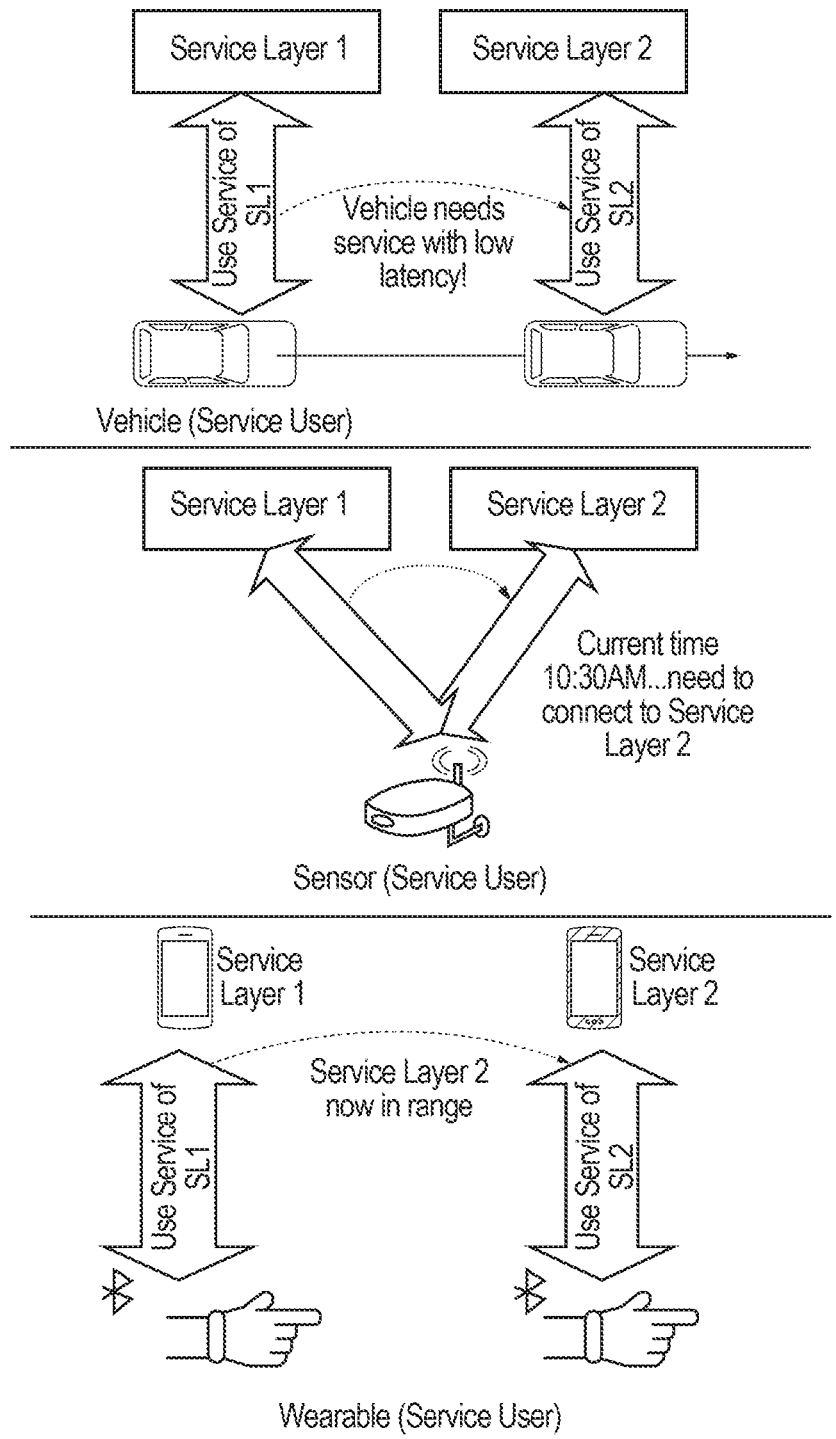
FIG. 4 shows example causes of a service layer mobility event.

It is expected that a large number of Service Users of an M2M/IoT system may be mobile. These Service Users may use both local services as well as remote services. In some cases, the Service User may require that the services be nearby (for instance due to latency concerns or due to privacy concerns). In order to maintain this requirement as a Service User moves, this user may need to change the service layer that is providing it an M2M/IoT service. Changing a service layer that is providing an M2M/IoT service may be referred to as a Service Layer Mobility event. Note that Service Layer Mobility is not tied exclusively to the physical movement of a Service User. FIG. 4 shows other factors that may result in a Service Layer Mobility event, including:

Policy and movement of service layer. Typical policy examples include: Time of Day (e.g., use one service layer between 10 AM and 12 PM and another service layer at all other times), Load (e.g., change the service layer providing service, if current load on service layer exceeds 75%), and Service Layer Capability (e.g., a Service User connected to SL1 may decide to switch to SL2, as the latter supports more services); and Movement of service layer: A Service User may be fixed/stationary, but may receive M2M/IoT service from mobile devices in its vicinity (for example through Bluetooth).

oneM2M is one standard development organization that is targeting the creation of an M2M service layer (see, for example, oneM2M-TS-0001 oneM2M Functional Architecture-V-2.12.0). They describe their service layer as "a distributed software layer—like an operating system—which is facilitating unification by providing a framework for interworking with different technologies" (see, for example, OIC Core Specification Part 1 v1.1.1). This distributed software layer is implemented in a common service layer that sits between the M2M applications and the communication HW/SW that provides data transport.

The Common Services Layer provides a set of standardized M2M services which are grouped together, by functionality, into Common Services Functions (CSFs). A number of instantiated CSFs makeup a Common Services Entity (CSE). These service layers (CSEs) may interface with: applications (Application Entities or AEs in oneM2M nomenclature) through an Mca reference point, other service layers (CSEs), through an Mcc (or Mcc') reference point, and the underlying networks (Network Service Entity or NSE in oneM2M nomenclature) through an Mcn reference point.

Figure 5:
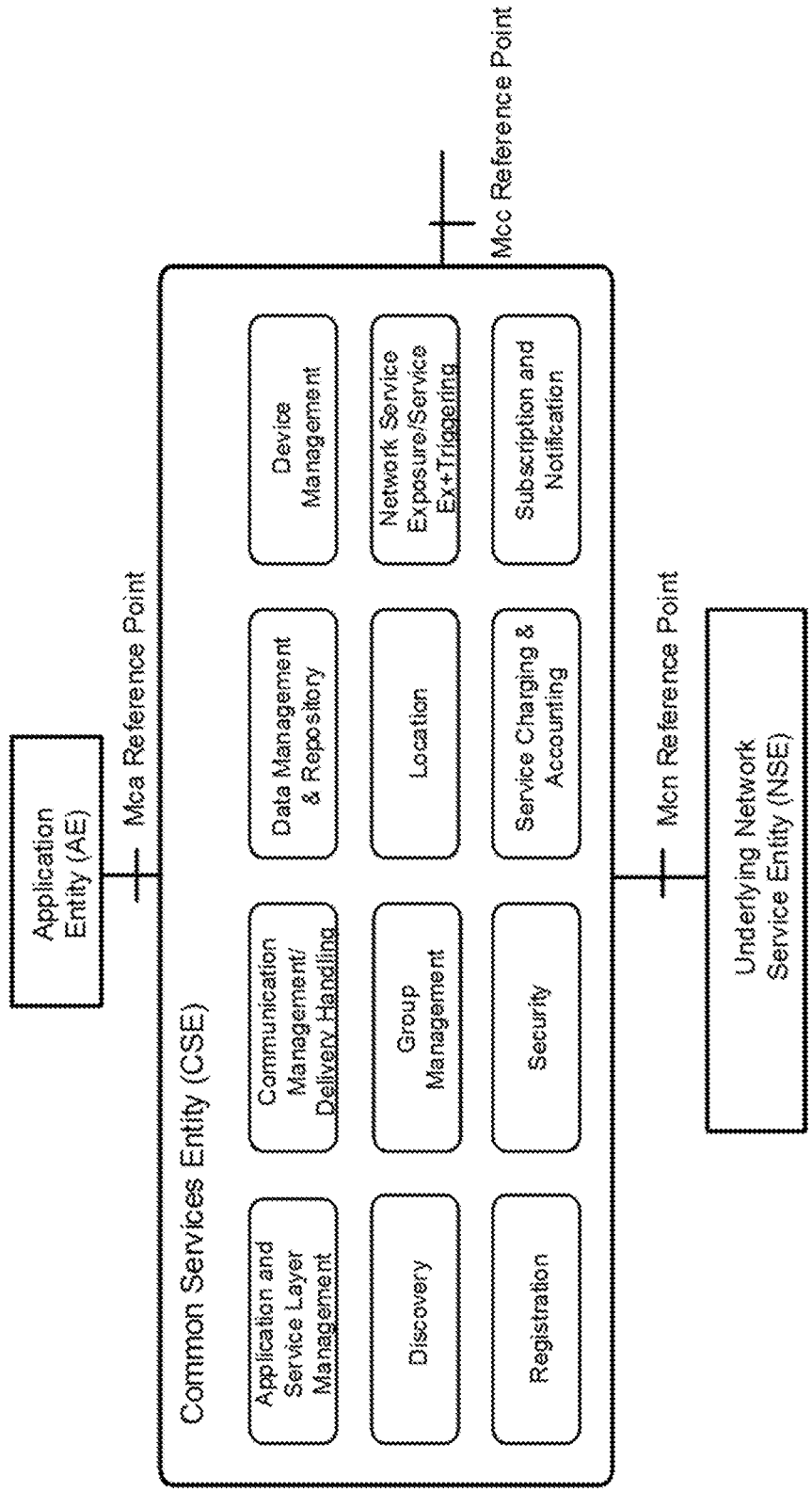
FIG. 5 shows an example common services function.

FIG. 5 shows twelve CSFs that are currently defined by oneM2M. Each of the CSFs are briefly described below:

Application and Service Layer Management CSF: provides management of AEs and CSEs. This includes capabilities to configure, troubleshoot and upgrade functions of the CSE, as well as to upgrade the AEs;

Discovery CSF: searches for information about applications and services based on a filter criteria;

Registration CSF: provides the functionality for AEs (or other remote CSEs) to register with a CSE. This allows the AEs (or the remote CSE) to use the services of the CSE;

Communication Management/Delivery Handling CSF: provides communications with other CSEs, AEs and NSEs. This CSF decides at what time and which communication connection for delivering communications and if necessary and allowed, to buffer communication requests so that they can be forwarded at a later time;

Group Management CSF: provides for the handling of group related requests. Enables an M2M system to support bulk operations on multiple devices, applications, etc.;

Security CSF: provides security functions for the service layer, such as access control including identification, authentication, and authorization;

Data Management and Repository CSF: provides data storage and mediation functions (e.g., collecting data for aggregation, re-formatting data, and storing data for analytics and semantic processing);

Location CSF: provides the functionality to enable AEs to obtain geographical location information;

Service Charging & Accounting CSF: provides charging functions for the service layer;

Device Management CSF: provides management of device capabilities on M2M gateways and M2M device;

Network Service Exposure, Service Execution and Triggering CSF: manages communications with the Underlying Networks for accessing network service functions; and Subscription and Notification CSF: provides functionality to allow for subscribing to an event and to be notified when this event occurs.

oneM2M defines five resource types for sharing data. Within oneM2M, these are defined as content sharing resources:

container;
contentInstance;
flexContainer;
timeSeries; and
timeSeriesInstance.

The Data Management and Repository CSF is responsible for managing the data stored in these content sharing resources. The data stored in one of these resources may be thought of as a data set.

In addition to data storage, oneM2M defines a number of value added services that a Service User may ask of the service layer hosting these content sharing resources. Some of these services are described in Table 1.

TABLE 1

Value Added Data Services offered by oneM2M

| Resource Type | Value Added Service |
| --- | --- |
| container | Cap the amount of data stored by the service layer |
| | Keep track of amount data stored by the service layer |
| | Discard application data that becomes too old |
| | Keep track of size of data stored by the service layer |
| | Allow enabling/disabling retrieval of data stored by the service layer |

TABLE 1-continued

Value Added Data Services offered by oneM2M

| Resource Type | Value Added Service |
| --- | --- |
| flexContainer | Allows for application defined value added services. For example, for HAIM applications, the service layer may allow requests that are based on state of the resource (for instance to allow requests such as upVolume, toggle, upChannel, which require the service layer to obtain the current volume or channel. |
| timeSeries | All services that are available to resources of type container + Monitor the time between successive data stored in the service layer Detect missing data (and time when data was missed) |

The Open Connectivity Forum (OCF) is another IoT architecture that defines service layer functionalities for M2M/IoT devices to communicate with each other. In OCF, all interactions are between OIC clients and OIC servers. OIC servers store resources, provide M2M/IoT services, and act upon requests from OIC clients. The resources have a defined type and interface.

OCF also provides value added services to a number of data sharing resource types. For example, an OIC server may monitor a data sharing resource to make sure that the data provided by an OIC client is in the correct range (e.g., that is between a certain minimum and maximum value) and consistent with the current value of the data in the data sharing resource (e.g., changing the status of an already unlocked door to: unlock).

It is expected that a large number of data producing IoT devices may be mobile and may benefit from the value added services that are provided by an M2M/IoT system. Consider the case of a shipping facility for a large online retailer that spans many acres and consists of several floors. Robots are used to fetch packages and move them throughout the facility. The robots connect to the company network via whatever gateway is physically closest to them. They generate data related to their observed surroundings (other robots, human workers, terrain, weather conditions, etc.), and provide this data to the M2M/IoT system for storage. The movements of the robots are controlled based on two main types of data: (1) what item(s) need to be fetched and where each item needs to be delivered, and (2) the real-time situation around the robot (e.g. the local terrain, what other robot(s) are nearby, what people are nearby, etc.)

Information type (1) is fairly static and can be provided to the robot from a central application server.

Information type (2) is dynamic in nature and changes in the information, require that the robot react in real time with low latency.

It may be beneficial to architect the M2M/IoT system such that the gateway that each robot connects to can process information of type (2) in real time for the robot. The gateway can examine the robot's situation and send it commands, or recommendations, for how to move. Since this information may need to be processed with low latency, it may need to come from the gateways and not a central server that might sit in a remote location. However, the problem that arises, when deploying this type of low-latency architecture, is that, as the robot's location changes, its connection may be required to move from one gateway to another. As this movement occurs, the new gateway may need to become aware of the robot's state information. The M2M/IoT system architecture may need to support a way for each robot's gateway to obtain the data set that is relevant to the robot. At the same time, the M2M/IoT system may also allow the data to be used by a central application server to help track and manage the robot fleet.

Consequently, the data stored by the robots may be used by:

The local application on the gateway to control the robot movement. This application is very sensitive to delay and requires very low latency access to the data; and The central application server residing in the Internet, that accesses the stored data through an M2M/IoT server and uses it to track/monitor the robot fleet.

Figure 6:
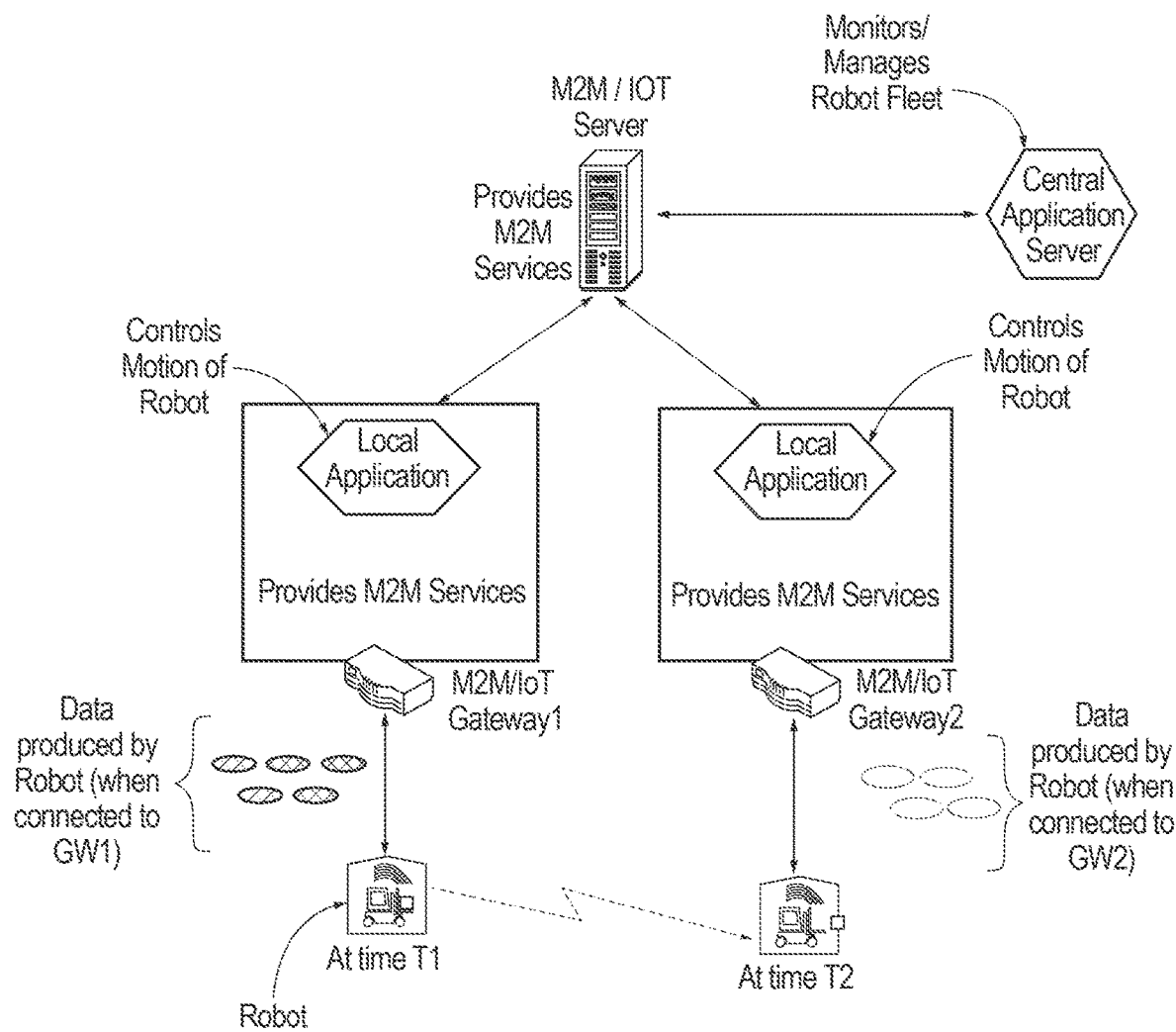
FIG. 6 shows an example mobile M2M application.

As shown in FIG. 6, at time T1, the robot is close to M2M/IoT Gateway1, and connects to this gateway for M2M service. At time T2 the mobile robot has lost connection to Gateway 1 and has re-established connection to a nearby Gateway2. M2M services may now be provided through Gateway 2.

In such a use case, the robot expects to regularly generate data, have that data stored in the M2M/IoT system, and have the M2M/IoT system provide seamless value added services on that data—all without regard to the fact that the robot is mobile and may connect to different gateways. The Local Application in the gateway expects to always have the data stored locally such that latency in accessing the data is not an issue. In addition, the central application server expects to be able to retrieve all the data produced from the robot, even though the robot moves and receives its M2M service from different gateways.

Figure 7:
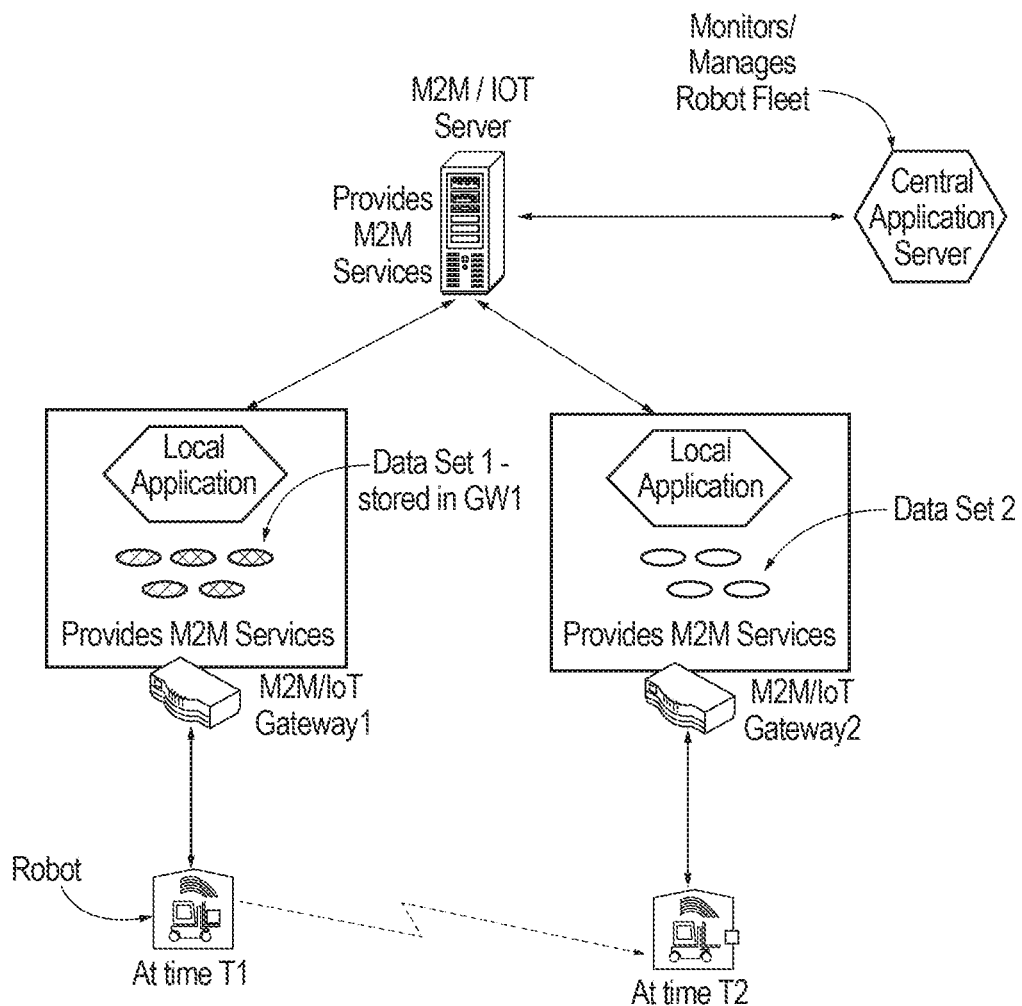
FIG. 7 shows an example mobile M2M application using Approach 1.

There are three different approaches on how current service layer technologies (like oneM2M) address the above use case:

Approach 1: The application data from the robot may be stored in the local gateways. In doing so, the robot data is split across two GWs and the data in each gateway is not linked together. The data is from a single robot, but stored in different nodes within the M2M/IoT system (see, for example, FIG. 7).

Figure 8:
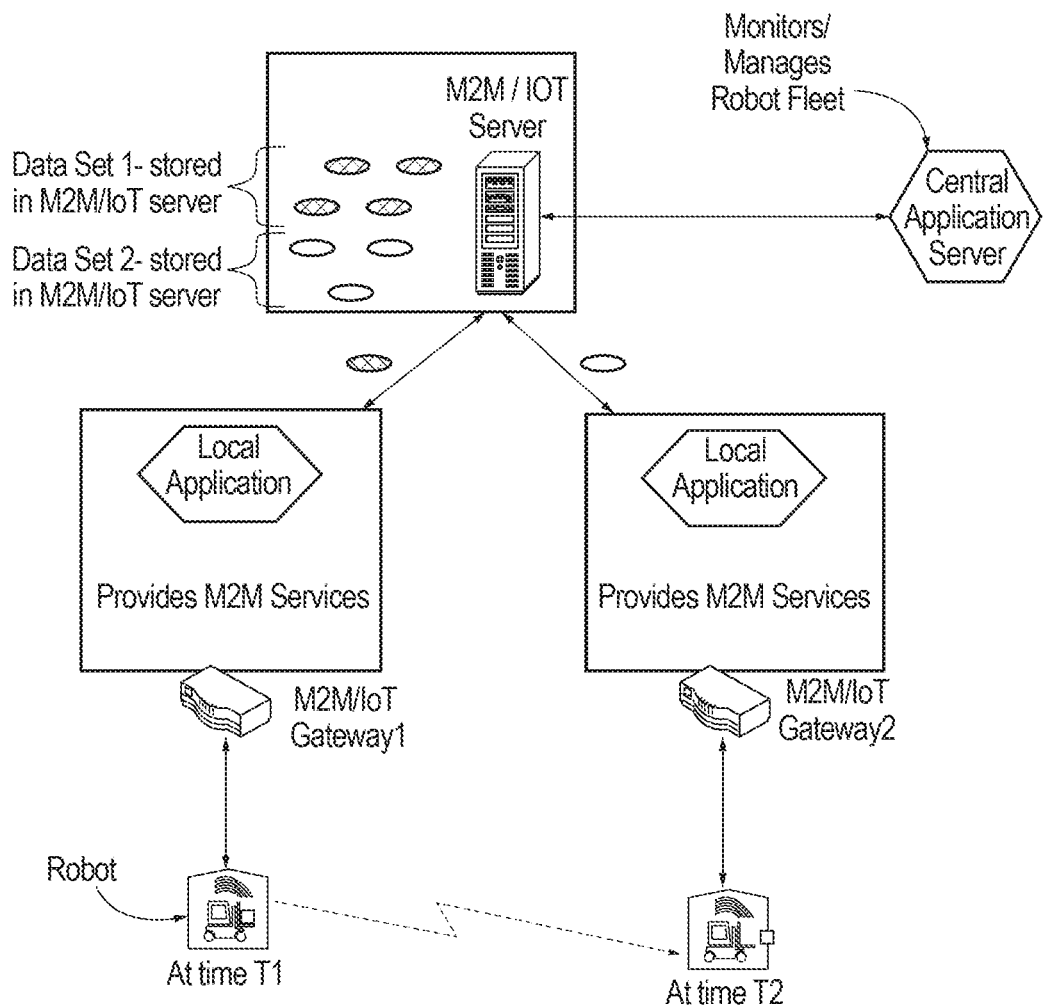
FIG. 8 shows an example mobile M2M application using Approach 2.

Approach 2: The application data from the robot may be stored in the M2M/IoT server. In doing so, the data from the robot is stored in one node, but the gateways would need to retrieve the data before they could be processed by the local application to control the robot (see, for example, FIG. 8).

Figure 9:
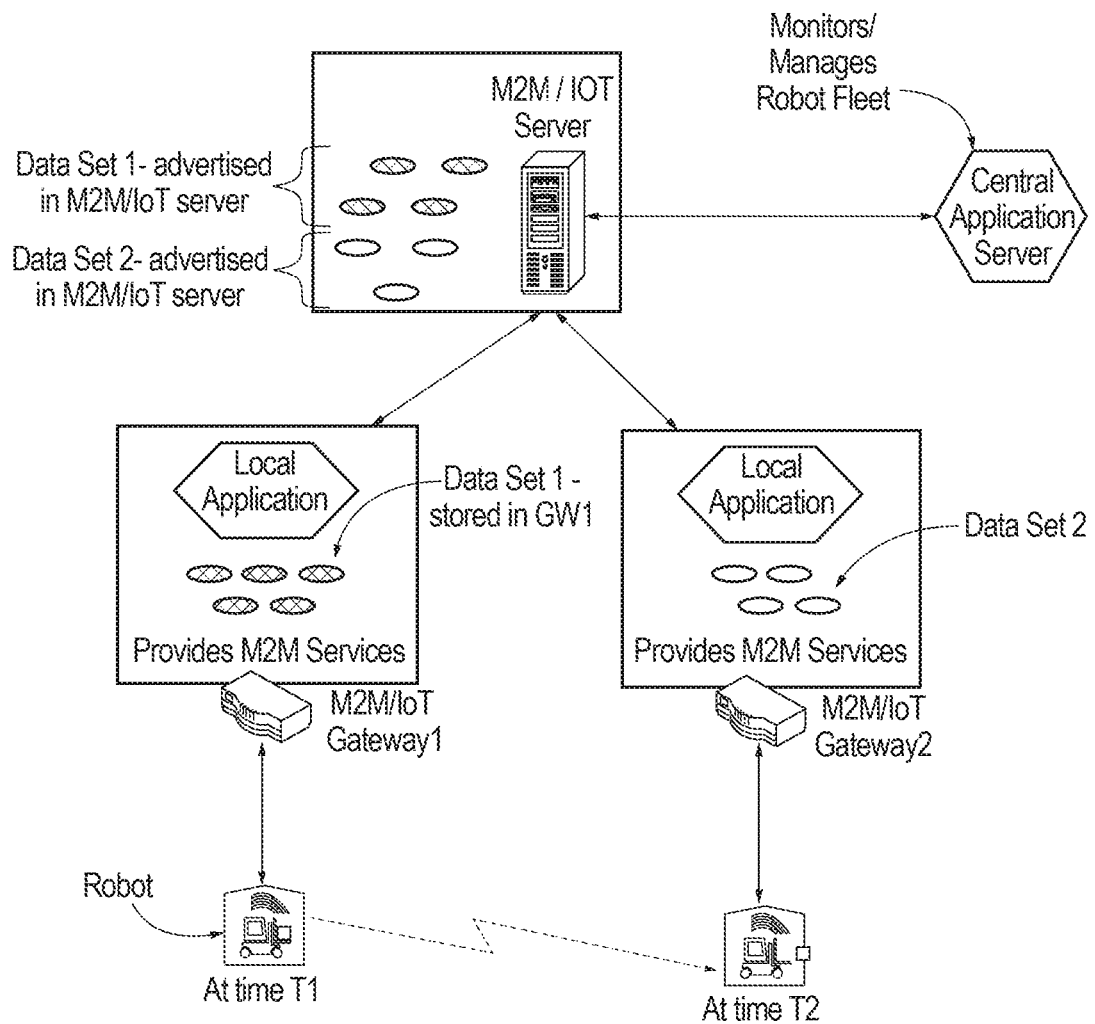
FIG. 9 shows an example mobile M2M application using Approach 3.

Approach 3: The application data from the robot may be stored in the local gateways and announced/advertised to the M2M/IoT server. This is a combination of Approach 1 and Approach 2—the data is still split across nodes in the M2M/IoT system, but the M2M/IoT server maintains information that links the data together (see, for example, FIG. 9).

Note that the example problems and solutions described herein are applicable to a number of other use cases, such as virtual reality use cases where an application may use data from multiple sensors to compute the "context" of the user and gaming use cases where applications in edge node gateways and in central application servers use the data generated by a gaming device.

The example use case shows two different problems/shortcomings related to how an M2M/IoT system should manage data storage for an entity that may undergo Service Layer Mobility events.

Problem 1: If a third Party Application (like the central application server) wants to recover all data generated by the M2M/IoT application, it may need to retrieve the data that is stored in the M2M/IoT system. Third Party Applications may be smart enough to, for example, discover all the data sets, retrieve all the data sets, and combine all the data sets. However, this places a burden on the M2M/IoT applications to manage data set fragmentation which is not aligned with the goals for a common service layer.

Problem 2: Some M2M/IoT systems, like oneM2M, may offer value added services to the M2M/IoT applications. Examples of such services include: check for missing sensor readings, verify the integrity of time-series data (e.g., for data that is periodic, the M2M/IoT system may validate that data is received when expected), cap the number of readings stored, and delete readings older than a certain time. However, if the data sets generated by an M2M/IoT application are stored in different nodes, and this information is fragmented, the M2M/IoT system may not be able to offer such value added services.

For example, consider that data from a sensor is stored in different nodes in an M2M/IoT system. In such a case, it may be very difficult for the M2M/IoT system to cap the total number of stored sensor readings. The M2M/IoT system may need to keep track of how many readings are in each of the nodes, and update this information as new readings are generated and as old readings are deleted or expire.

Similarly, it may be very difficult for the M2M/IoT system to provide verification for consistency in time series data. If a time series is split across multiple nodes, the M2M/IoT system may detect a time series anomaly every time an M2M/IoT application disconnects from one node and reconnects to another node.

Similarly, it may be very difficult for the M2M/IoT system to provide a moving average of data collected over time. Let's say a Data Producer is moving to a new area and the service layer is performing some operations that require data from a previously collected data set. The Data Producer may need to fetch the previous data set for use in the operation at the new SL.

There are many use cases where data from an M2M application, that is stored in different nodes, is needed in aggregation for it to be useful. Taken individually, the data stored in the individual nodes may be useless.

Note that the problems presented here are similar to issues that have been discussed in Data Integration Systems. However, those problems deal more with how a data consumer interacts with disparate data sets. The case disclosed herein is different in that the problem in M2M/IoT systems also includes the potential services on the disparate data sets that are offered to the data producers and needs to deal with the mobility of the data producers.

Data Producers (applications, service layers, etc.) rely on service layers to provide three main functionalities: store their data, have their data readily available to Data Consumers, and provide value added services that operate on the stored data. Unfortunately, when Data Producers are mobile, they may store their data in different service layers of the M2M/IoT system. The overall impact of fragmented data being stored in different service layers is that service layers have difficulty simultaneously providing these three main functionalities. Disclosed herein are methods and systems for enhancing the M2M/IoT system so that it provides these functionalities to mobile Data Producers. For example, disclosed herein are:

A method for a Data Producer to negotiate and initiate a Data Continuity service with the M2M/IoT system—this may be for specific data sets or all data sets generated by the Data Producer;

A method by which an M2M/IoT system may autonomously decide to start a Data Continuity Service for a data set of a Data Producer;

A method where a Data Producer interacts directly with an Aggregator SL to store its aggregated data set, whereby the Data Producer may also update and delete entries in this data set and start a data service on this aggregated data set;

A method where a Local SL manages all interactions with an Aggregator SL, whereby the Local SL retargets all requests from the Data Producer to the Aggregator SL, including a request to start a data service on the aggregated data set;

A method where the aggregated data set follows the Data Producer, whereby the Local SL has the aggregated data set. Upon a change in Local SL, the current Local SL retrieves the data set from prior local SLs, including all data services running on the data set;

A method where the aggregated data set is distributed across all the Local SLs that have served the Data producer, and whereby the M2M/IoT system maintains links between these Local SLs to assist in finding all the Local SLs that may host a portion of the aggregated data set. Any request to a Local SL that targets the aggregated data set requires the Local SLs to recursively interact with prior Local SLs that may have data that is part of the aggregated data set;

A method whereby a Local SL receives a request from a Data Consumer and propagates this request to all Local SLs that have data related to the aggregated data set; and A method whereby a Data Consumer is notified if a data service that it has started on the aggregated data set has been moved from one local SL to another local SL.

In addition, this disclosure also includes an embodiment of the procedures to a oneM2M system and further defines a Graphical User Interface (GUI) to configure and monitor some of the proposed features.

Figure 10:
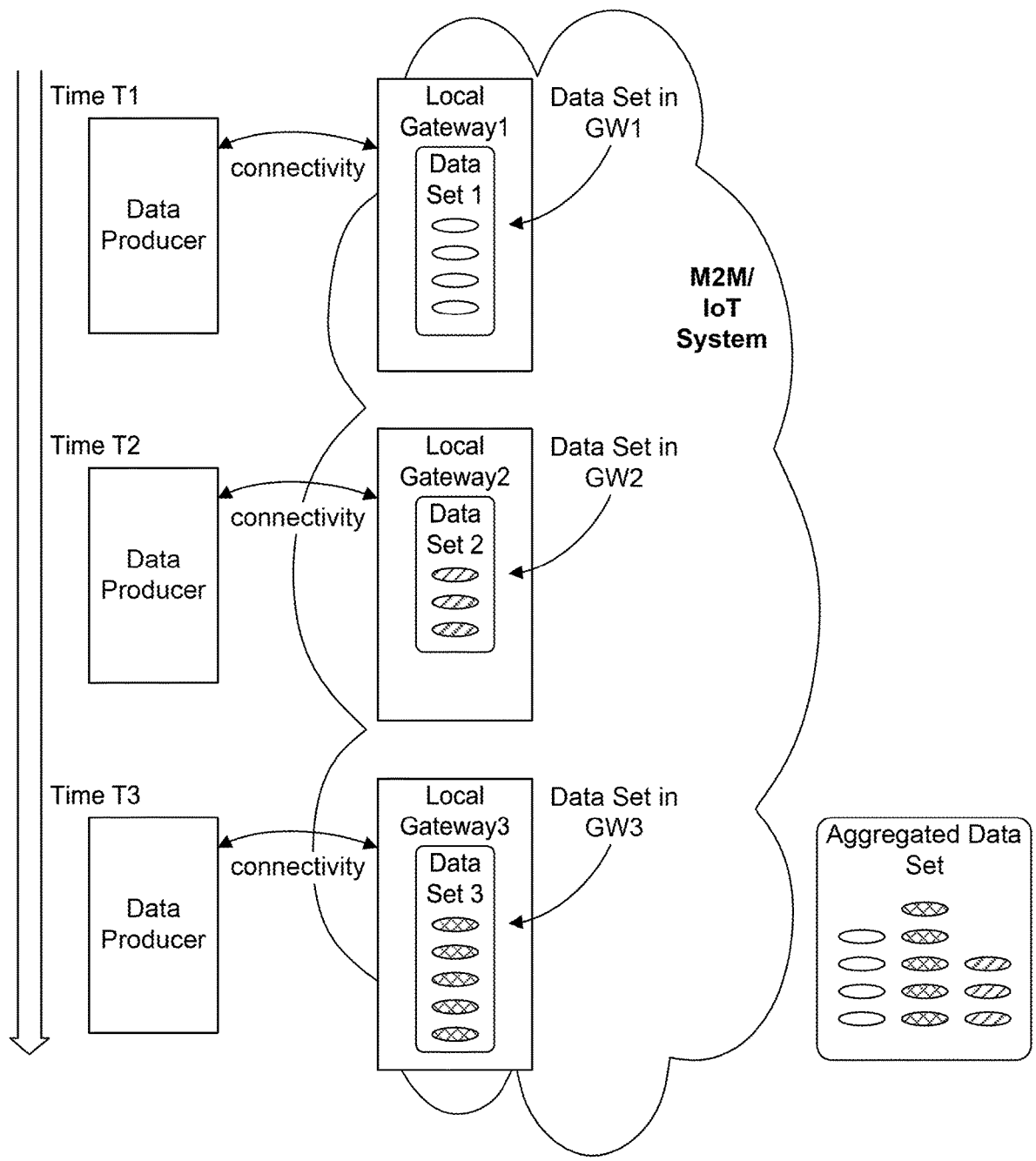
FIG. 10 shows example data sets and aggregated data sets.

Data producers may decide to store their data into the M2M/IoT system to take advantage of the provided M2M/IoT services. However, as a result of a Service Layer Mobility event, a data producer may store its information in more than one entity within the M2M/IoT system. For example, FIG. 10 shows a mobile data producer storing its data in three different local gateways at different times of the day. The information stored by the producer in each of the local gateways is referred to as a data set. The combination of all the data sets of a producer is referred to as an aggregated data set. Note that the notion of an aggregated data set only applies to those data sets that would have been part of a single set had they been stored in a single entity. So for example, if the data producer in FIG. 10 generates both temperature readings and heart rate readings, these may be stored in two unrelated data sets that may not be combined in an aggregated data set.

The following entities may interact with data sets:

Data Producer: The functional entity that produces or updates the data sets. The Data Producer may also retrieve the data sets, delete the data sets, or ask the M2M/IoT system to perform some Data Service on the data set;

Data Consumer: The functional entity that requires/consumes the information in the data set. The Data Consumer may retrieve, use, and delete the data sets, and it may also ask the M2M/IoT system to perform some Data Service on the data set;

Local Service Layer: Service Layer where a Data Producer intends to stores its data set. Typically, this is close to the Data Producer to reduce latency issues when storing and accessing the data. A Data Producer may store its information in multiple Local SLs, and the data in a specific local SL may be referred to as a data set. A Data Producer has a current Local SL where it is currently receiving service for connectivity and data storage, and zero or more past Local SLs where the Data Producer had previously received service for connectivity and data storage; and Aggregator Service Layer: Service layer which hosts the aggregated data set of a Data Producer.

In addition, the above functional entities may make use of a Data Service on the data set. A Data Service refers to the value added M2M/IoT services provided by the M2M/IoT system on the data sets. Examples of some typical Data Services include:

Capping the total size of all data stored in the data set;

Providing statistics on all data in a data set (for example: mean, median, standard deviation);

Notifying a third party if the data in the data set is modified/deleted;

Providing the newest or oldest entry in the data set;

Data mashups where data from different sources are combined to generate new data for different uses; and Fetching historical data sets for reference and comparison to current data sets.

Figure 11A:
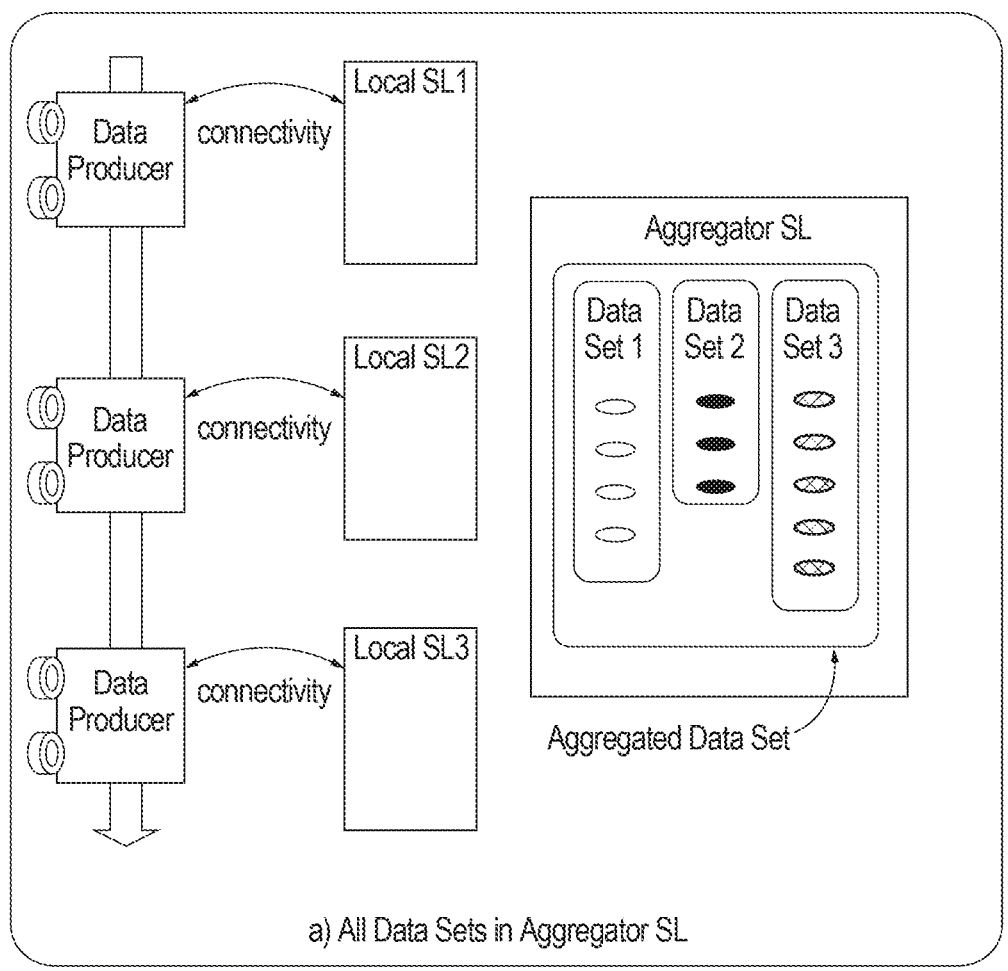
FIG. 11A shows an example method to provide data continuity where all data sets are in the aggregator SL.

The Data Continuity Service allows Data Producers and Data Consumers to interact with the aggregated data set. Three methods to provide a data continuity service within the M2M/IoT system are described herein:

Method 1(a/b): All data sets are stored in an Aggregator SL. In this implementation option, all the data sets of a Data Producer may be stored in a single Aggregator SL (see, for example, FIG. 11A). This method may be implemented by the Data Producer or by the M2M/IoT system. In the former case, the Data Producer may be aware of how the Data Continuity Service is provided and is responsible for making sure that the data sets are created in the Aggregator SL. Hereinafter, we refer to this case as Method 1a or the Data Producer Driven case. In the latter case, the Data Producer may be unaware of how the Data Continuity Service is provided. Instead, the Data Producer requests the service and the M2M/IoT system ensures that the data sets are created in the Aggregator SL. Hereinafter, we refer to this case as Method 1b or the M2M/IoT System Driven (or M2M/IoT SL Driven) case.

Figure 11B:
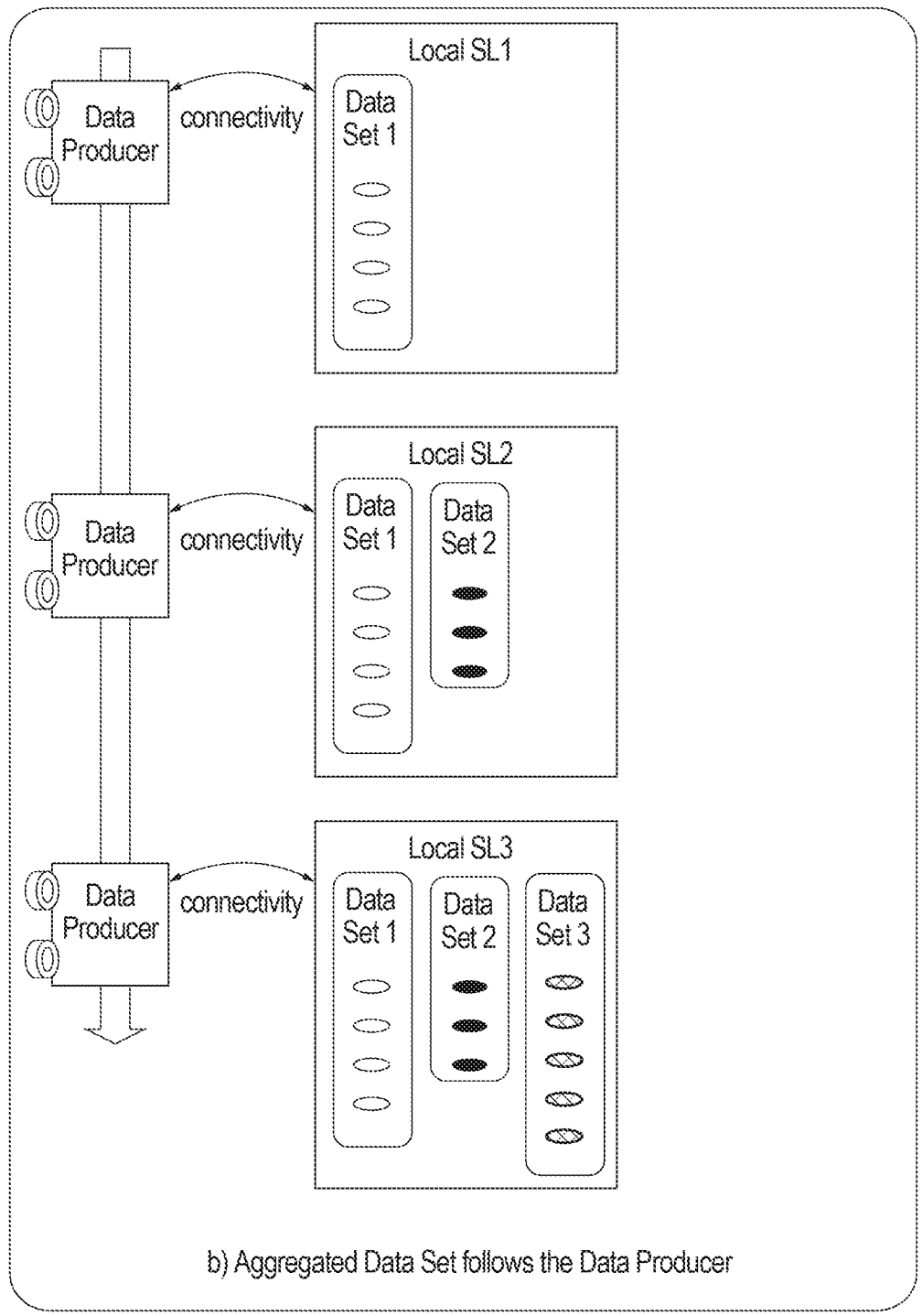
FIG. 11B shows an example method to provide data continuity where the aggregated data sets follow the data producer.

Method 2: Aggregated Data Set follows the Data Producer. In this method, a Data Producer may store its data in its current Local SL. The M2M/IoT system may be responsible for transferring old data sets in past Local SL, to the new current Local SL. The net result is that the current Local SL may have the aggregated data set. However, unlike Method 1 where the aggregated data set is stored in one Aggregator SL, in this method, the aggregated data set moves from one Local SL to another (see, for example, FIG. 11B).

Figure 11C:
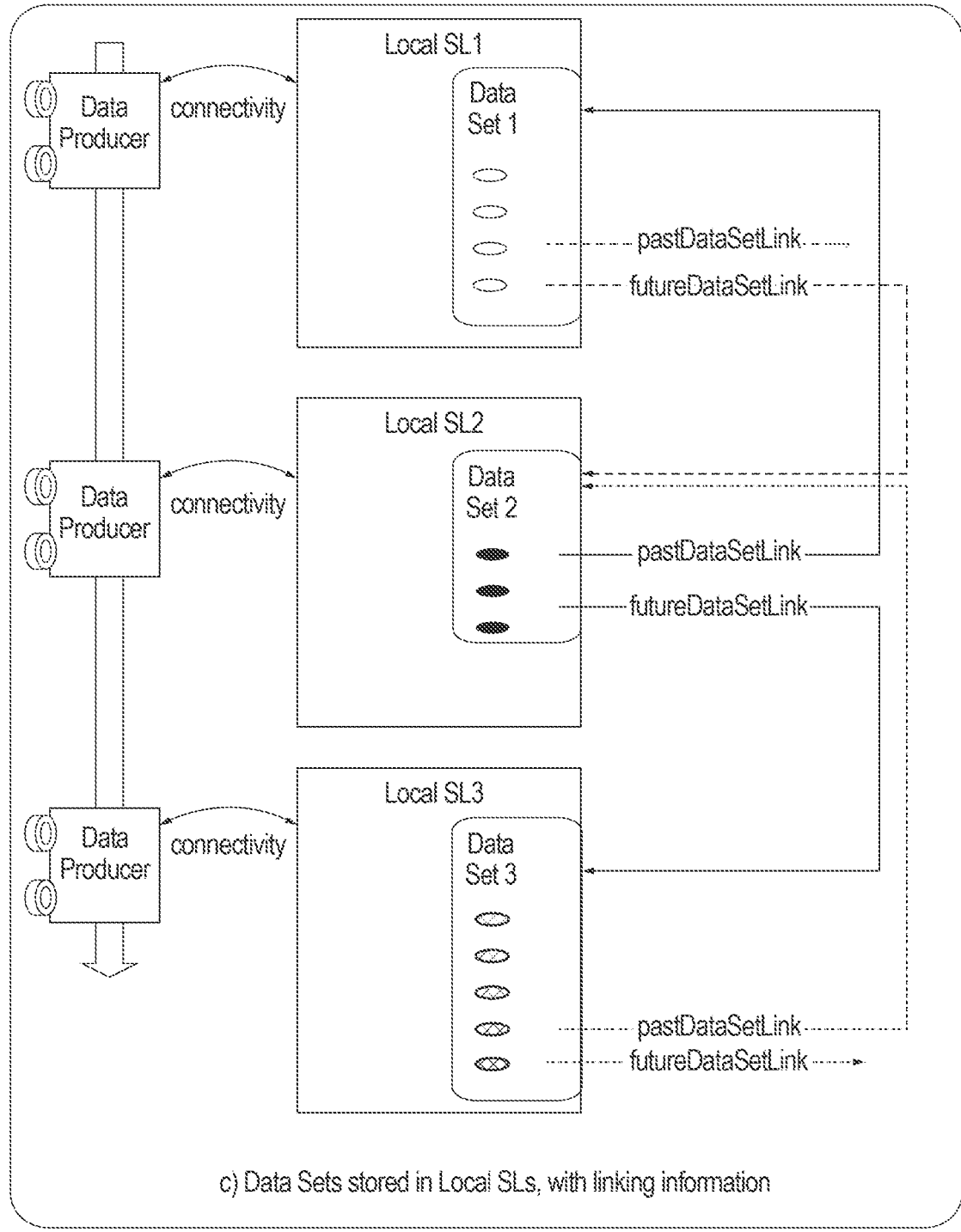
FIG. 11C shows an example method to provide data continuity where the data sets are stored in local service layers with linking information.

Method 3: Aggregated data set made up of a "linked" set of individual data sets. In this method, the data sets may only be stored in the Local SL, but each of these data sets has information that link the individual data sets to the aggregated data set (see, for example, FIG. 11C). Each data set has two new attributes. One links to the prior or past data set (pastDataSetLink) and another that links to the subsequent or future data set (futureDataSetLink).

The Data Continuity Service may be initiated by the Data Producer based on request, triggered autonomously by the M2M/IoT system, or some combination of the above.

In one example, a method performed by a first service layer entity implemented on an apparatus of a communications network may comprise: receiving, from a computing device, a data continuity service request, wherein the data continuity service request comprises information associated with the computing device; determining, based on the data continuity service request, to configure a second service layer entity for performing a data operation on data associated with the computing device; configuring the second service layer entity for performing a data operation on data associated with the computing device; receiving, from the computing device, a request to perform a data operation, wherein the request to perform the data operation identifies a virtual resource associated with the first service layer entity; and retargeting, to the second service layer entity, a request to perform a data operation on at least a portion of the data.

The method may further comprise sending, to the computing device, an indication that at least a portion of the data is stored at the second service layer entity. The indication that at least a portion of the data is stored at the second service layer entity comprises an identifier of the second service layer entity. The method may further comprise receiving, from the second service layer entity, a response indicating that the data operation on the at least a portion of the data has been performed; and sending, to the computing device, the indication that the data operation on the at least a portion of the data has been performed. The computing device is pre-configured with information associated with the virtual resource. The method may further comprise sending, based on configuring the second service layer entity for performing a data operation on data associated with the computing device, information associated with the virtual resource. The request to perform the data operation comprises a request to perform one or more of a create, update, retreive, or delete operation associated with the data. A data continuity service request may comprise a request to a service layer entity (e.g., the first service layer entity) to maintain or store data associated with the computing device and to keep track of where that data is maintained or stored.

Figure 12:
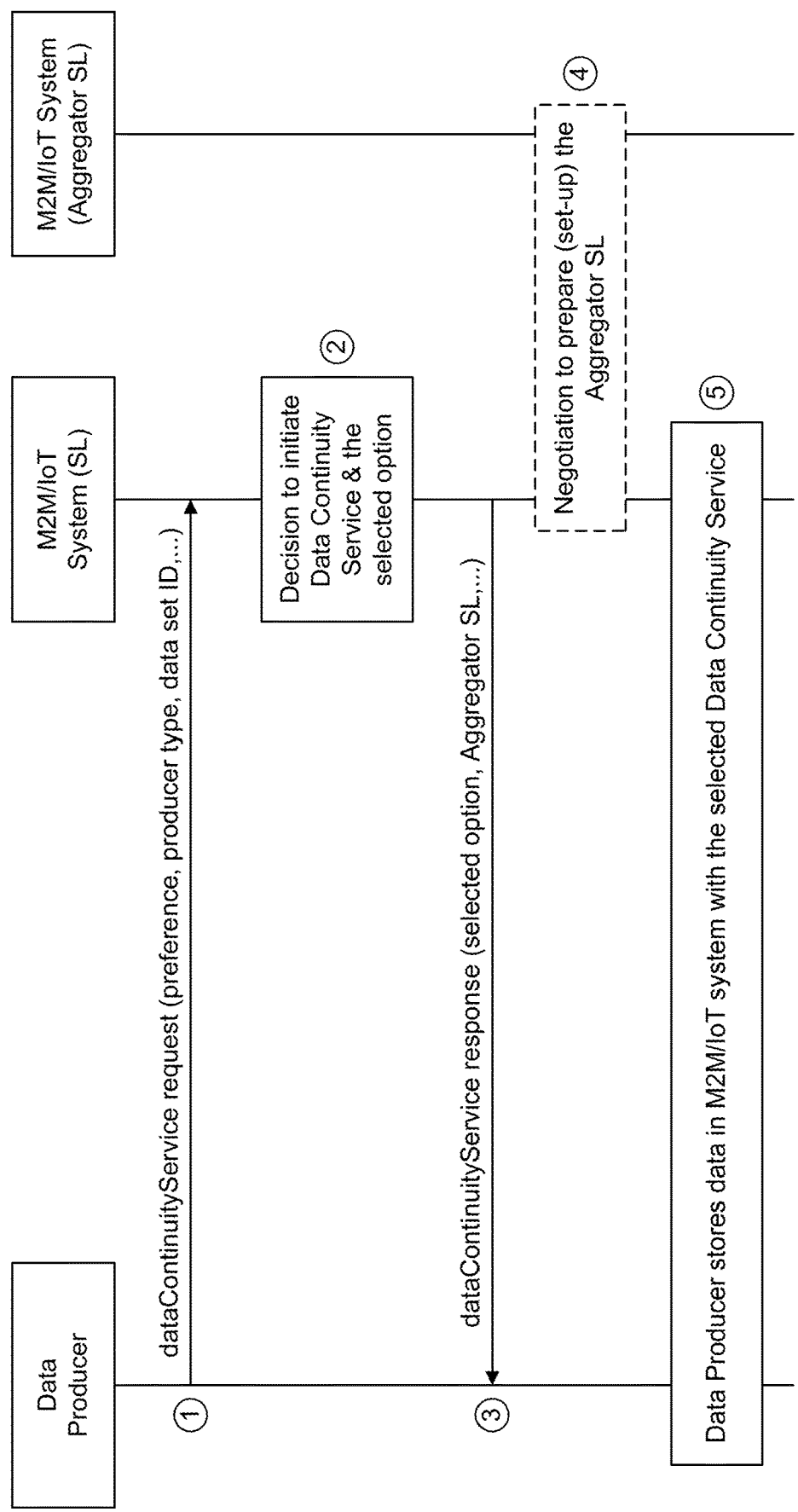
FIG. 12 shows an example data continuity service request.

A Data Producer may initiate the Data Continuity Service using a dataContinuityService Request. The general procedure is shown for example in FIG. 12 and is discussed below.

In step 1, the Data Producer knows that all or some of its data requires data continuity. It may issue a dataContinuityService request to the M2M/IoT system (for instance this may be to a Local SL in the M2M/IoT system). The Data Producer may include the following options in the request:

(1) The type of Data Producer (dataProdType): This provides the service layer an indication of the type of device/entity that is producing the data, and may assist the M2M/IoT system in determining if Data Continuity Service should be enabled. For example, the Data Producer could be a pacemaker heart rate monitor or a fitness wristband heart rate monitor.

(2) Data Set IDs (dataSetID): Identifiers for data sets produced by the Data Producer. If a Data Producer generates more than one type of data (e.g. temperature readings and heart rate monitor readings), the Data Producer may choose to request data continuity for only a subset of these. If not specified, or an "ALL" is specified, the Data Producer may request that data continuity be applied to all its data.

(3) For each of the data sets, the type of data that is being produced (dataSetType): Using the same example, a Data Producer may indicate that it generates temperature readings or heart rate readings. In addition, the Data Producer may provide an indication as to the priority of the Data.

(4) Data continuity implementation Preference (dataContPref): In some cases, an M2M/IoT service may support one or more of the Data Continuity methods. In such a case, the Data Producer may request a preference as to the mechanism used. Alternatively, the Data Producer may provide some general guidance as to the preferred option. For example, it may request a service that results in (one or more of): low latency, high storage capability, easy discoverability, etc. If no preference is specified, the M2M/IoT system may choose one from the list of Data Continuity Support.

(5) Data Continuity Support (dataContSupp): List of Data Continuity methods that the Data Producer supports. Some of the Data Continuity methods may require that the Data Producer behave differently. As a result, the Data Producer may indicate if it supports this new behavior.

(6) Indication that data producing device is mobile (dataProdMobInd): This indicates to the M2M/IoT system that the Data Producer may store data in different Local SLs.

(7) Address of Aggregator SL (addrAggregatorSL). This is the address of the service layer that hosts the aggregated data set. The Data Producer may know this from prior interactions with the M2M/IoT system or it may be pre-provisioned in the Data Producer.

(8) Latency in storing/accessing the data (syncingLatency): This indicates how long the Data Producer is willing to wait before the data is stored in the M2M/IoT system or the maximum delay in accessing previously stored data. It may optionally be defined per request type (create, delete, retrieve, or delete). This may influence the type of Data Continuity service selected by the M2M/IoT system. For example, favoring Method 2 or selecting an Aggregator SL that is closer to the Data Producer.

(9) Frequency for Aggregator SL to pull information from local SLs (pullFrequency): Indicates to the M2M/IoT system how often the Aggregator SL needs to pull the data sets from the local SLs so that the aggregated data set remains in sync with the local data sets. The Aggregator SL may perform this after a period with no interaction from the local SLs.

(10) Maximum data set size (maxDataSetSize): The maximum number of entries in a data set, or the maximum size (in bytes) of a data set. This may be used by the M2M/IoT system to influence the type of Data Continuity service selected. For example, for large data sets, selecting an Aggregator SL that has large storage capacity.

(11) Maximum data set duration (maxDataSetDuration): The maximum lifetime of a data set. This may be used by the M2M/IoT system to influence the type of Data Continuity service selected. For example, for very short lived data sets, the M2M/IoT system may decide to use a Method 2, since the number of prior local SLs is likely to be very small.

(12) Schedule associated with Data Continuity Service (dataContinuitySchedule): Some Data Producers may only want the data continuity service for specific times. As an example, this information may allow the M2M/IoT system to better distribute data sets among Aggregator SLs.

(13) Timeout Value for Data Continuity Service (dataContinuityTimeout): A M2M/IoT system may terminate or pause the Data Continuity service if there is no activity from the Data Producer for the timeout specified.

(14) Aggregated Data Set Operation (aggDataSetOperation): In some cases, the Data Producer may want to have the M2M/IoT system perform an operation on the data prior to storing in the aggregated data set. For example, the Data Producer may request to store the average of 100 readings in the aggregated data set. The M2M/IoT system may perform the average and only store the result in the aggregated data set. The operation may be selected from a standard list of operations (average, variance, maximum, minimum, etc.) Alternatively, the Data Producer may specify the details of the operation in the dataContinuityService request.

(15) Geo-Spatial Indicator (geoSpatialIndication): Provides location restriction information to the M2M/IoT system as to where the data sets may be hosted. For example, this may impact the selection of the Aggregator SL. It may also be used to provide geo-spatial restrictions with regards to the location of a Data Producer. For example the Data Producer may want the M2M/IoT system to use an Aggregator SL if data is generated from a certain location.

In step 2, based on the inputs that were provided in step 1, the M2M/IoT System decides how to deal with the data from the Data Producer. The decision may be based on one or more of the following:

(1) Data continuity service implementation supported by the M2M/IoT system;

(2) Data continuity service implementation supported by the Data Producer (as received from the dataContinuityService request in Step 1 or obtained from the subscription profile of the Data Producer);

(3) Data continuity service implementation preference of the Data Producer (as received from the dataContinuityService request in Step 1 or obtained from the subscription profile of the Data Producer);

(4) Policies defined by the service operator of the M2M/System. For example, the policy may indicate that the M2M/IoT system must provide data continuity for all heart rate readings. The policy may be based on one or a combination of: the type of data in the data set, the type of Data Producer, the mobility if the Data Producer, the priority of the data, etc.; and (5) Any geo-spatial restrictions provided in the dataContinuityService request.

In step 3, the M2M/IoT system informs the Data Producer about the selected implementation using a dataContinuityService response. The response may provide one or more of the following:

(1) Data continuity service method (dataContSel) selected; and (2) Configuration details regarding the Data continuity service method selected. For example, this may include:

(a) Address of Aggregator SL (addrAggregatorSL). This is the address of the service layer that hosts the aggregated data set;

(b) Data set refresh period(dataSetRefreshPeriod): An indication to the Data Producer to interact with the M2M/IoT system at the least once every dataSetRefreshPeriod. This tells the M2M/IoT system that the Data Producer is still active and that it wants to use the Data Continuity Service; and (c) Address of Virtual resource to use for interacting with an aggregated data set through a Local SL.

In step 4, for those methods relying on an Aggregator SL, the M2M/IoT system may configure the Aggregator SL for accepting the aggregated data set. For example, the Aggregator SL may be configured to pull the information from the local SLs every pullFrequency seconds (as specified in the initial dataContinuityService request).

In step 5, the Data Producer interacts with the M2M/IoT system using the negotiated method (e.g., Method 1 a/b, Method 2, or Method 3 described herein)

Note that the dataContinuityService request may be carried in a Registration message, a new dedicated message, or piggybacked in the initial data storage request from the Data Producer.

The selection of the Aggregator SL may be: (1) provided by the M2M/IoT service provider or the data producer, (2) based on policy (for example, all Data Producers of Type X will use Aggregator SL Y); (3) based on machine learning (for example, the M2M/IoT system may monitor the Local SLs used by the Data Producers, and select the Aggregator SL that is closest in terms of latency, communication hops, etc. to all of these); (4) based on relationships within the M2M/IoT system (for example, if a local SL is registered to another SL, the M2M/IoT system may choose to use this other SL as the Aggregator SL); (5) and/or based on the information provided by the Data Producer in Step 1. For example, the Local SL may choose a Aggregator SL based on the type of data sets produced by the Data Producer (dataSetType), the mobility of the Data Producer (dataProdMobInd), the latency requirements of the Data Producer (syncingLatency), the persistency or lifetime of the data sets (maxDataSetDuration), the storage requirements or size of the data sets (maxDataSetSize), the geo-spatial requirements of the Data Producer (geoSpatialIndication).

As an alternative to the above negotiation, the Data Producer may be pre-provisioned with all the necessary information to use the Data Continuity Service.

The M2M/IoT system may use heuristic observations to decide whether to start the Data Continuity service. The M2M/IoT system may monitor data sets to see how Data Producers and Data Consumers interact with these. Based on these observations, the M2M/IoT system may decide to activate the Data Continuity Service for a data set. For example, the M2M/IoT system may determine that most consumers that interact with data sets produced by Data Producer 1 always retrieve all of the individual data sets that are stored in different local SLs. As a result, the M2M/IoT system may decide to store/create an aggregated data set so that these consumers can more efficiently access the aggregated data.

In addition, the M2M/IoT system may rely on guidance from the Data Producer to determine when to trigger the data continuity service. The Data Producer may provide this guidance information as part of its registration message (or in another dedicated message). Examples include the type of Data Producer, data continuity implementation preferences, data continuity methods supported, an indication that data producing device is mobile, maximum latency data producer can tolerate in storing/accessing the data, maximum data set size, maximum data set duration, schedule associated with Data Continuity Service, data continuity timeout value, and maximum rate at which Data Producer changes SL (maxRateSLChange).

The M2M/IoT system may use this information to better determine when to stop/start the data continuity service. For example, the M2M/IoT system can decide to stop the service and stop accumulating data in a data set when one or more of the following conditions occur: the data producer has reached the maximum data set size; when a data set is considered stale (it has been in the system longer than the Maximum data set duration); or the service has timed-out (there has been no interaction from Data Producer for the Data continuity timeout value).

In addition the M2M/IoT system can decide to start the service when the M2M/IoT system detects that a Data Producer is mobile (i.e. it changes its local SL). Alternatively, this can be based on a rate of change of local SLs exceeding a threshold (maxRateSLChange).

Details on how a Data Producer interacts with data sets, for each of the methods to implement the Data Continuity Service, are disclosed herein. In particular, details are provided for how the data sets are created, how a Data Producer interacts with already created data sets (for retrieval, update or deletion), and how a Data Producer can use Data Services provided on the data set(s).

In Method 1a, all data sets are stored in an Aggregator SL, and the Data Producer is aware that the data is to be stored in the Aggregator SL. Thus, it may be assumed that: the Data Producer receives some Connectivity Service from a local SL, the Data Producer requires the Data Continuity Service from the M2M/IoT system for data set with dataSetID=ID1, the Data Producer has already negotiated Method 1 with the M2M/IoT system and has identified an Aggregator SL to store its data set, and Data Sets are stored in the M2M/IoT system using a storeData request. For example, in a oneM2M implementation, the storeData request may be mapped to a CREATE request.

Figure 13:
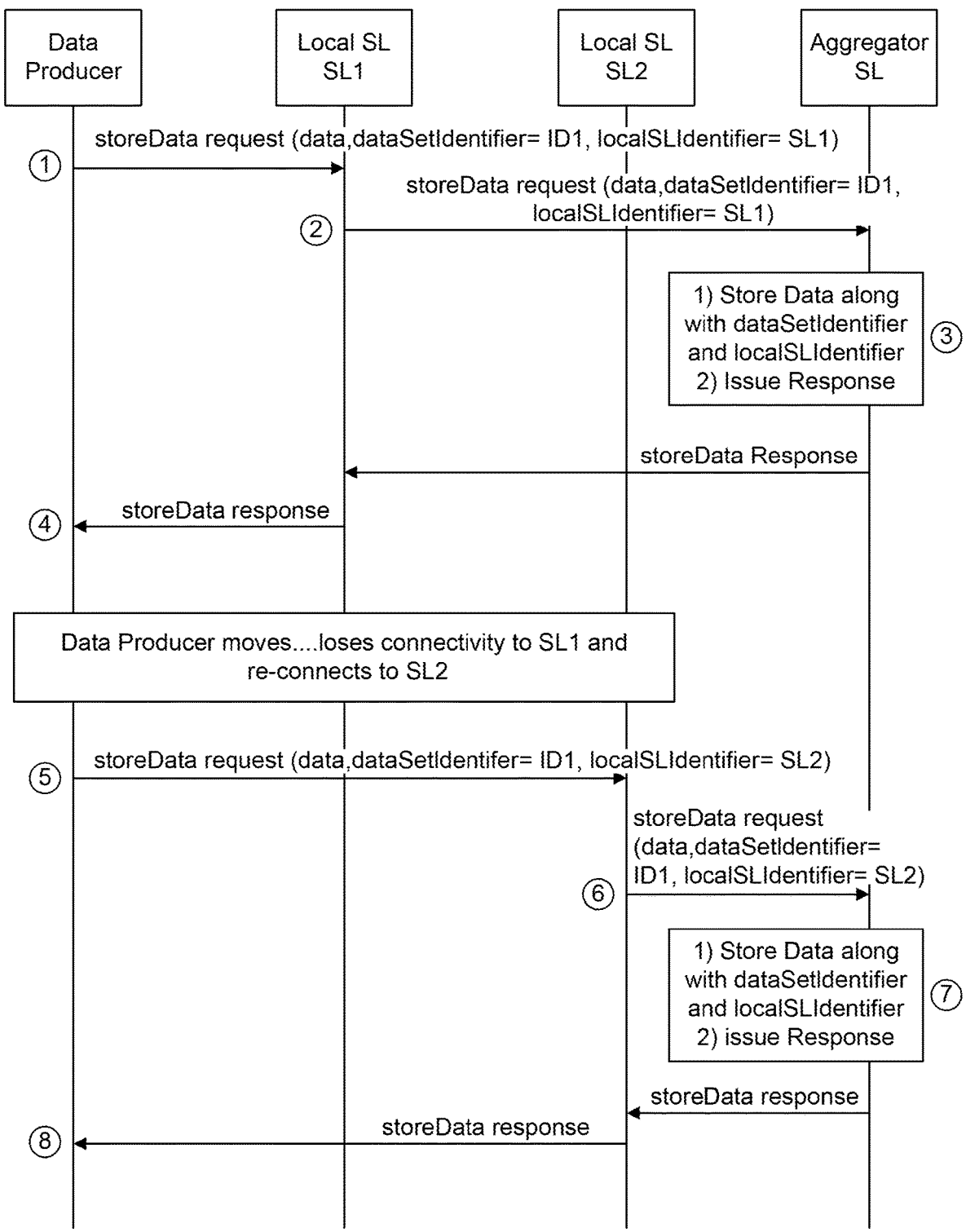
FIG. 13 shows an example data set configuration using Method 1.

As the Data Producer generates data, it may store this data in the M2M/IoT system. As it moves, the Data Producer changes its local SL (moving from Local SL1 to Local SL2). As shown in the example of FIG. 13, the Data Producer may be connected to Local SL1 and the M2M/IoT system has told it to store all its data sets in an Aggregator SL.

In step 1, the Data Producer generates new data and issues a storeData request targeting the Aggregator SL. The request first arrives at the Local SL (SL1), which is providing a connectivity service for the Data producer. SL1 forwards this request to the Aggregator SL. In addition to the data to be stored, the StoreData request may contain one or more of the following parameters:

(1) Indication for data continuity service (dataContinuityFlag): Boolean to indicate to the Local SL if this data is to use the data continuity service. If TRUE, then Local SL uses the agreed method to provide data continuity;

(2) Aggregated Data Set identifier (aggDataSetIdentifier): This identifier allows the M2M/IoT system to distinguish between multiple data sets that may be produced by the Data Producer. In this example, aggDataSetIdentifier=ID1;

(3) Local SL Identifier (localSLIdentifier): This identifier allows the M2M/IoT system to know the local SL that handled the StoreData request. In this example, localSLIdentifier=SL1;

(4) Data Set Sequence Number (dataSetSequenceNumber): Allows M2M/IoT system to know how the aggregated data set is structured and to determine missing data sets. The Aggregator SL can use this to help ensure that all data is aggregated. It may be used as a hint to avoid duplication and to look for missing data; and (5) Data Set Complete Indicator (dataSetCompleteInd): Indicator to Local SL that this is the last entry for a data set.

In step 2, SL1 forwards this request to the Aggregator SL.

In step 3, the Aggregator SL stores the data and issues a storeData response. The localSLIdentifier and aggDataSetIdentifier may be stored along with the data.

In step 4, Data Producer receives the storeData response. This response may return a representation of the updated data set. At some later time, the Data Producer loses connectivity to Local SL (SL1), and re-connects to Local SL (SL2). Data Producer may still be aware that the aggregated data set is to be stored in Aggregator SL.

In step 5, the Data Producer generates new data and issues a storeData request targeting the Aggregator SL. The request first arrives at SL2, which is now providing a connectivity service for the Data Producer. SL2 forwards this request to the Aggregator SL. The StoreData request contains aggDataSetIdentifier=ID1 and localSLIdentifier=SL2.

In step 6, SL2 forwards this request to the Aggregator SL.

In step 7, the Aggregator SL stores the data and issues a storeData response. The localSLIdentifier and aggDataSetIdentifier may be stored along with the data.

In step 8, Data Producer receives the storeData response. This response may return a representation of the updated data set.

As an alternative to Step 1 and Step 5, the Data Producer may issue a storeData request without the localSLIdentifier.

Instead, the Local SL recognizes the need for data continuity by the presence of the dataSetIdentifier and may automatically include its localSLIdentifier in the storeData request, before forwarding this request to the Aggregator SL.

Figure 14:
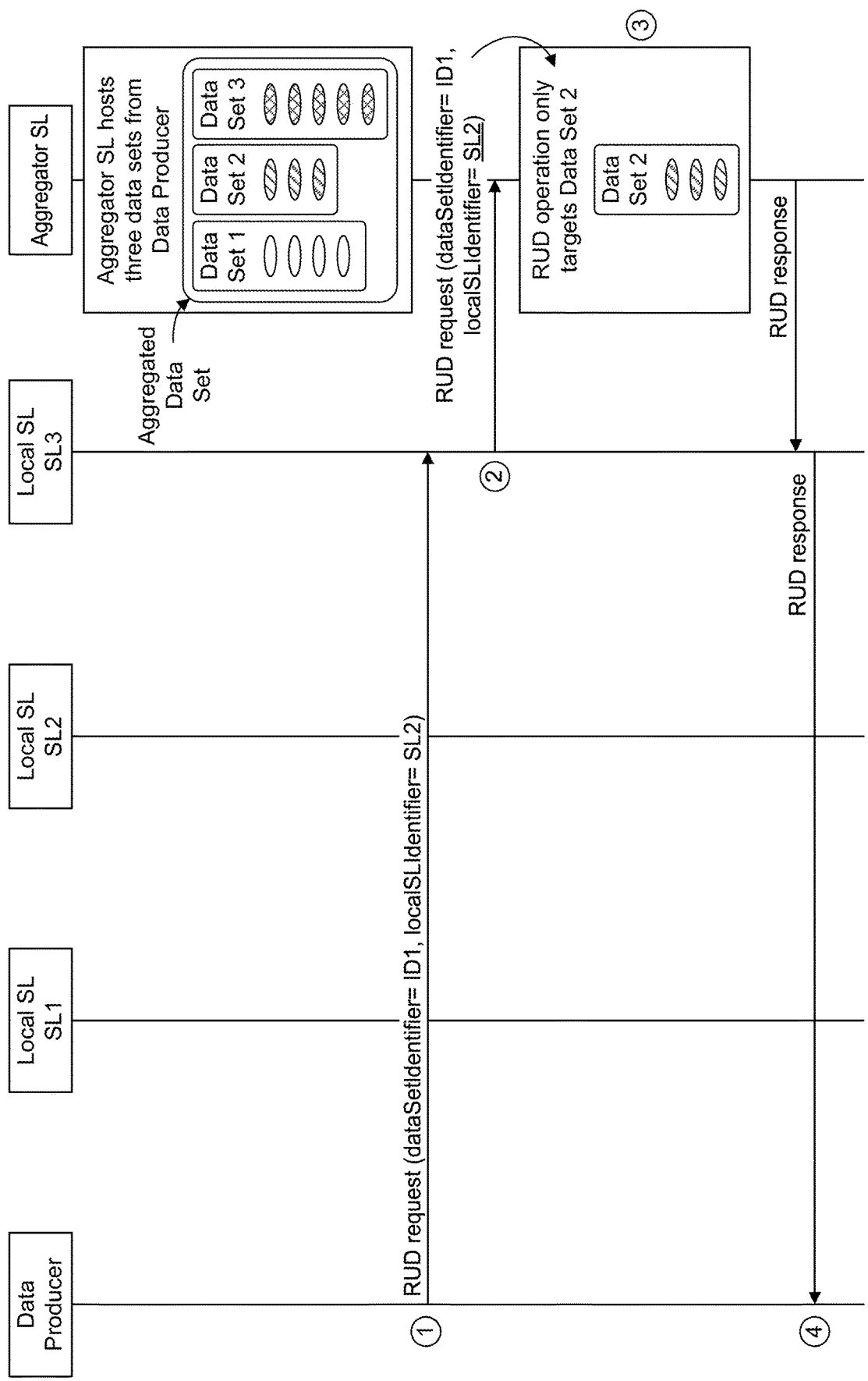
FIG. 14 shows an example data set RUD using Method 1.

Once the data sets are stored in the M2M/IoT system, the Data Producer can retrieve, update, or delete the individual data sets or the aggregated data set. Hereinafter the operation may be referred to as a Retrieve/Update/Delete (RUD) request. The processing steps are shown in FIG. 14 and additional details are described below. It may be assumed that the Data Producer is requesting a RUD operation on the data with datsSetID=ID1, and that it is connected through Local SL (SL3). The Aggregator SL has three data sets (one from each Local SL (SL1, SL2, and SL3)).

In step 1, Data Producer issues a RUD request to the Aggregator SL. The Data Producer may include the following parameters in the request:

(1) Aggregated Data Set identifier (aggDataSetIdentifier): In this example, aggDataSetIdentifier=ID1; and (2) Local SL Identifier (localSLIdentifier): If the Data Producer would like to target a single data set of the aggregated data set, it may include the localSLIdentifier to identify that data set. For example, this may be set to "SL2" to target the data set while the Data Producer was connected to Local SL (SL2). Alternatively, the Data Producer may omit the attribute, or use an "aggregate" value, to indicate that the request is targeting the aggregated data set. In the example shown, the request is a Retrieve operation that is targeting the data set produced while connected to Local SL (SL2).

In step 2, SL3 forwards the request to the Aggregator SL.

In step 3, Aggregator SL manages the request. The request may only impact only those resources (data) that are part of the data set produced while connected to Local SL (SL2). The Aggregator SL prepares the related response depending on the request, and issues the response to the Data Producer. For example, if request is a Retrieve, the Aggregator SL may only return retrieved results from the selected data set.

In step 4, the RUD response arrives at the Data Producer.

Figure 15A:
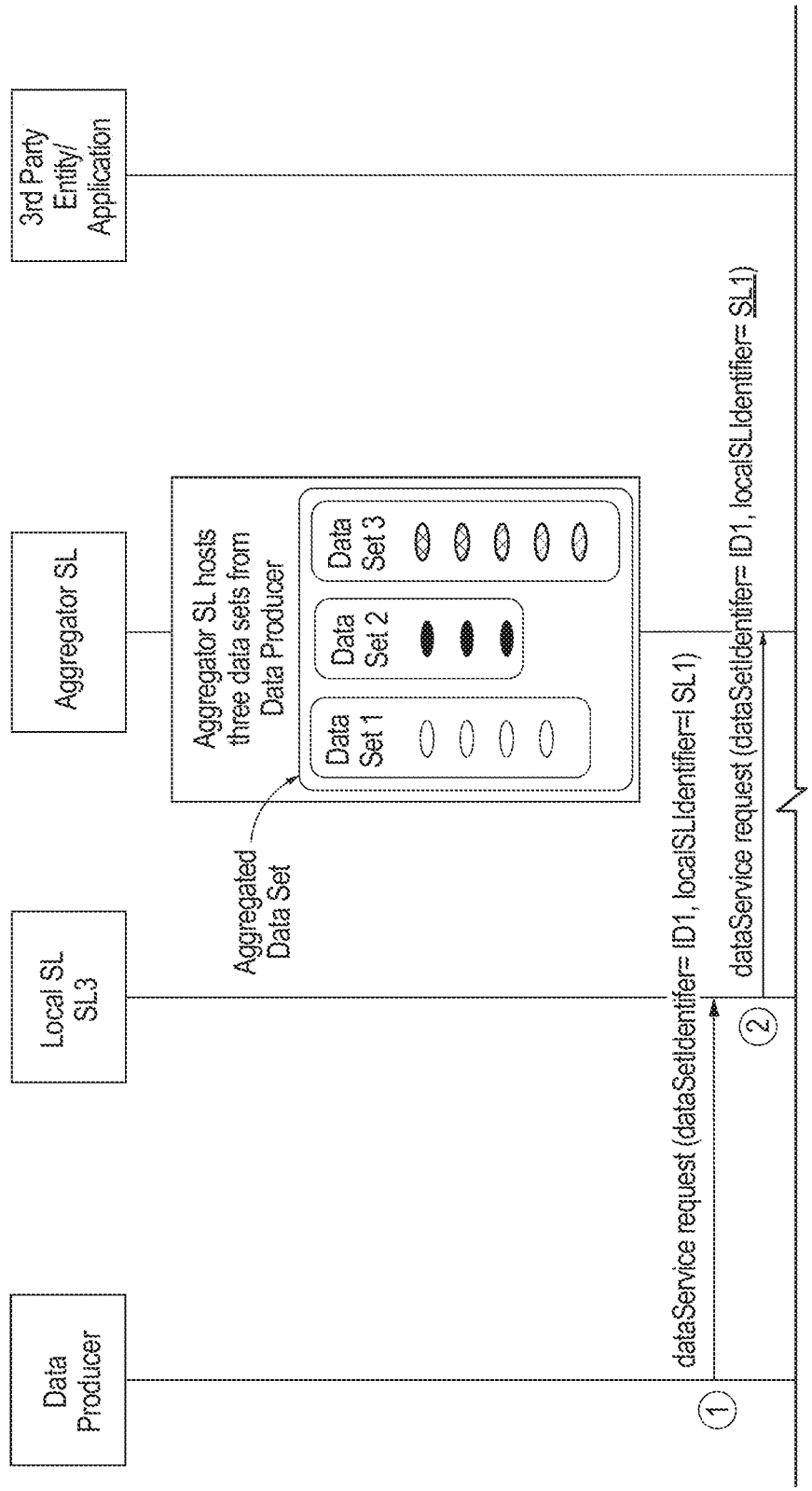

A Data Producer may request a Data Service be run on the data set. Typical examples of Data Services include: capping the number of entries stored in a data set, monitoring if an entry is missing in a periodic data set, finding the moving average of the data set, subscribing to be notified if an entry in the data set is updated, deleted, etc. Continuing with the previous example, the aggregated data set in the Aggregator SL may contain three data sets. The processing steps are shown in FIG. 15 and additional details are described below:

In step 1, Data Producer issues a dataService request to the Aggregator SL. The Data Producer may include the following parameters in the request:

(1) Aggregated Data Set identifier (aggDataSetIdentifier): In this example, aggDataSetIdentifier=ID1;

(2) Local SL Identifier (localSLIdentifier): If the Data Producer would like to target a single data set, it may include the local SLIdentifier to identify the data set. For example, this may be set to "SL1" to target the data set while the Data Producer was connected to Local SL (SL1). Alternatively, the Data Producer may omit the attribute, or use an "aggregate" value to indicate that the request is targeting the aggregated data set. In the example shown, the requested data service is a subscription to be notified when some third party retrieves one or more entries from Data Set 1 (the data produced while the Data Producer was connected via Local SL (SL1));

(3) Service Identity: the identity of the service that should process the data; and (4) Service Configuration: Any information that is necessary to configure the service.

In step 2, SL3 forwards the request to the Aggregator SL.

In step 3, Aggregator SL manages the Data Service request. The Aggregator SL may provide the service to the requested Data Set (Data Set 1 in this example). The Aggregator SL responds to the Data Service request and initiates the service.

In step 4, the dataService response arrives at the Data Producer.

In step 5, third Party application/entity retrieves the entries of Data Set 3. Data service is not triggered, and the Data Producer is not notified.

In step 6, third Party application/entity retrieves the entries of Data Set 1. The Data service is triggered, and the Data Producer is notified.

In method 1b, all data sets may be stored in an Aggregator SL, and the Data Producer may be unaware that the data is to be stored in the Aggregator SL. The Data Producer wants data continuity but lets the M2M/IoT system manage this, including the selection of the Aggregator SL. The Data Producer knows it will be moving and hence makes this request. The local SL may then not store the data set locally, but instead forward this data set to the Aggregator SL. This case differs from the previous case in that the Data Producer may not have an Aggregator SL set up beforehand. It may be assumed that: the Data Producer receives some Connectivity Service from a local SL; the Data Producer requires the Data Continuity Service from the M2M/IoT system for data set with dataSetID=ID1; the Data Producer has already determined that it should make use of Method 1b for data continuity with the local SL but does not have an Aggregator SL identified; and the Data Sets are stored in the M2M/IoT system using a storeData request.

As the Data Producer generates data, it may store this data in the M2M/IoT system. As it moves, the Data Producer may change its local SL (e.g., moving from Local SL (SL1) to Local SL (SL2)).

In this method, no data sets are stored in the Local SLs. Rather, the method relies on the Local SL retargeting to the Aggregator SL all request operations from the Data Producer that interact with any of the entries in the aggregated data set. The Data Producer continues to interact only with the Local SL. The retargeting is handled transparently by the M2M/IoT system. If the Data Producer is unaware of the identity of the Aggregator SL, then the Local SL maintains mapping information that links the Data Producer identity and Aggregated Data Set identifier to the Aggregator SL that stores the aggregate data set. This mappingInfo may be stored for each Data Producer as a set of lists, for example:

List of Aggregated Data Set identifiers for the Data Producer. The pair of Data Producer and Aggregated Data Set identifier uniquely identifies an aggregated data set in the M2M/IoT system; and List of Aggregator SL addresses: For each unique aggregated data set (identified by the pair of Data Producer and Aggregated Data Set identifier), there may be a corresponding Aggregator SL where the aggregated data set is stored.

The Data Producer request operation may have a flag or indication that allows the Local SL to know that this request is to be retargeted to the aggregated data set in the Aggregator SL. This can be achieved using one of the options described below:

Option 1: The Local SL may use the Data Producer identity and Aggregated Data Set identifier (aggDataSetIdentifier) in the request to determine (1) that a requested operation needs to be retargeted, and (2) to determine the identity of the Aggregator SL.

Option 2: The request may have a new parameter to explicitly signal that the request needs to be retargeted (retargFlag). The Local SL may still need to use the Aggregated Data Set identifier (aggDataSetIdentifier) and Data Producer identity to determine identity of the Aggregator SL.

Option 3: The Local SL maintains a virtual <virtDataSet> resource specifically for retargeting. Data Producers may need to target this virtual resource any time they wish to interact with the data set. The Local SL may still need to use the Aggregated Data Set identifier (aggDataSetIdentifier) and Data Producer identity to determine the identity of the Aggregator SL. The Data Producer may be made aware of the virtual <virtDataSet> resource from one or more of the following methods: pre-configuration; as part of data continuity service initiation procedure (or registration procedure); in response to an initial data set request/response exchange with the local SL (e.g., during the first storeData request to the local SL, the SL may respond with the information regarding the <virtDataSet> resource); and/or in response to a dedicated exchange with the local SL. For example, the Data Producer may request the creation of a resource to host an aggregated data set. In response to this request, the local SL may provide the Data Producer with the details regarding the <virtDataSet> resource.

Option 4: The Local SL may maintain specialized resources that trigger the hosting service layer to retarget any requests that interact with this resource. The Data Producer may be made aware of this resource as part of the initial data set request/response exchange with the local SL. In a typical oneM2M example, special data sharing resources may be defined. If for example a Data Producer issues a request to store data in this data sharing resource, the hosting SL may autonomously store the data in the Aggregator SL.

Additionally or alternatively, if the Data Producer is aware of the Aggregator SL identity, then:

Option 5: The Data Producer indicates the need for data continuity service and provides the method for that service. In addition, the Aggregated Data Set identifier and the Aggregator SL ID (or address of Aggregator SL) may also be included in the request.

Figure 16:
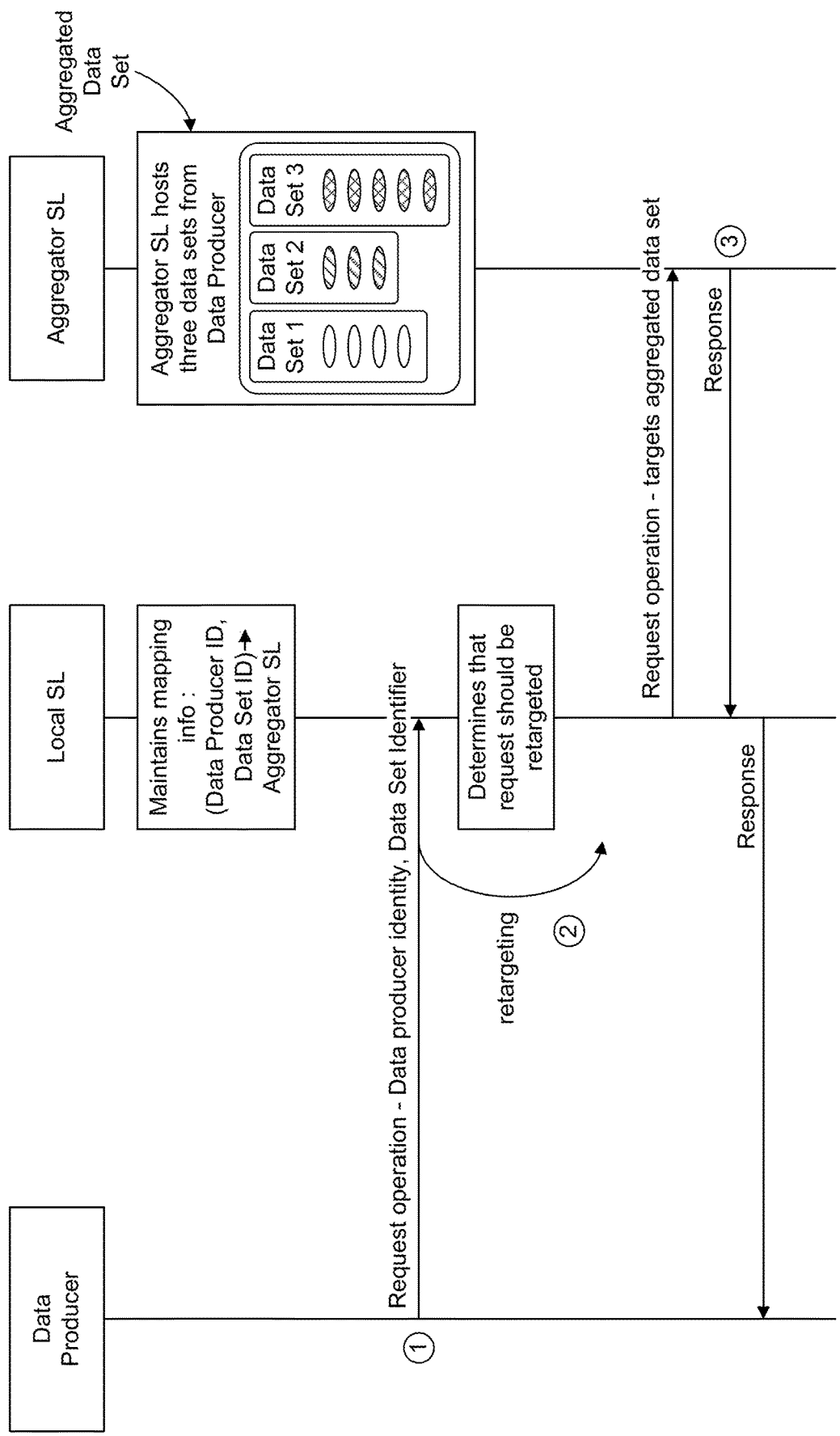
FIG. 16 shows an example retargeting to the aggregator SL.
Figure 17:
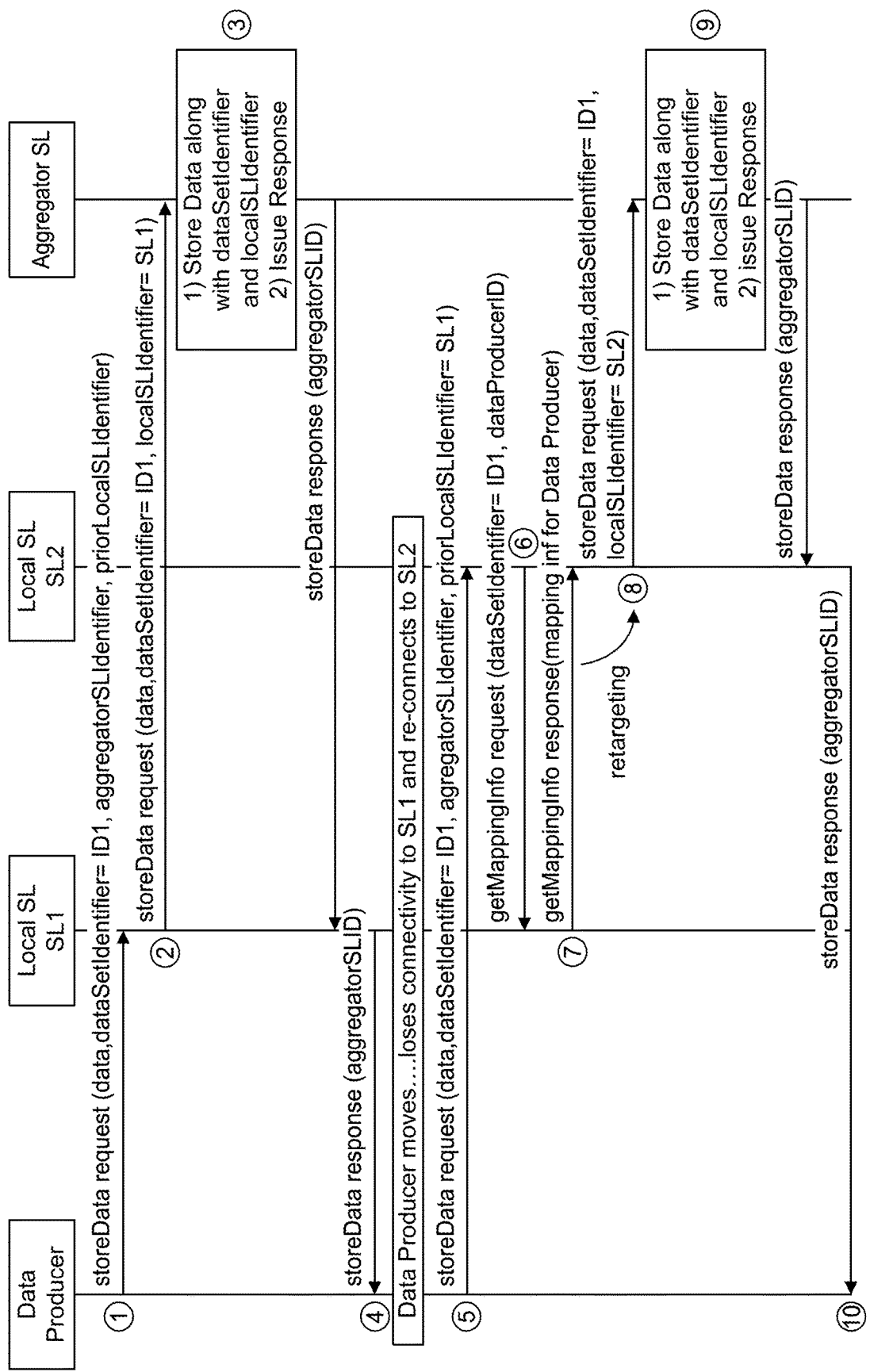
FIG. 17 shows an example data set creation using Method 1b.

FIG. 16 shows a high level view of the expected re-targeting according to Option 1. The retargeting operation is shown in Step 2. Hereinafter, only Option 1 is shown. However, the results can be extended to the other methods. As an alternative, after receiving a request operation (Step 1), a Local SL may issue an immediate response to the Data Producer, and then take the follow-on step of retargeting the request to the Aggregator SL. A typical call flow using Option 1 is shown in FIG. 17. It is assumed that the Data Producer moves from Local SL (SL1) to Local SL (SL2).

In step 1, the Data Producer generates new data and issues a storeData request to SL1. The storeData request may contain one or more of the following attributes:

(1) Indication for data continuity service (dataContinuityFlag): Boolean to indicate to the Local SL if this data is to use the data continuity service. If TRUE, then Local SL uses the agreed method to provide data continuity.

(2) Aggregated Data Set identifier (aggDataSetIdentifier): This identifier allows the M2M/IoT system to distinguish between multiple data sets that may be produced by the Data Producer. In this example, aggDataSetIdentifier=ID1.

(3) Prior Local SL Identifier (priorLocalSLIdentifier): This identifier allows the M2M/IoT system to know the last/prior local SL that handled connectivity for the Data Producer. The M2M/IoT system may use this information to retrieve any mapping information. In this example, priorLocalSLIdentifier=NULL.

(4) Aggregator SL Identifier (aggregatorSLIdentifier): This identifies the SL acting as the Aggregator SL. If the Data Producer knows this identity, it may include it in the storeData request (5) Data Set Sequence Number (dataSetSequenceNumber): Allows the M2M/IoT system to know how the aggregated data set is structured and to determine missing data sets. The Aggregator SL can use this to help ensure that all data is aggregated. It may be used as a hint to avoid duplication and to look for missing data.

(6) Data Set Complete Indicator (dataSetCompletetInd): Indicator to Local SL that this is the last entry for a data set.

In step 2, SL1 determines that the request should be retargeted. To determine where to retarget (Aggregator SL), it may look through its mappingInfo to see if any entries correspond to the Data Producer Identity and the aggregated Data Set Identifier of the request. If so, it may then use the mapping information to determine the Aggregator SL. Additionally or alternatively, it may use the value provided in the storeData request (if the Data Producer provided the Aggregator SL ID in this request).

In step 3, the Aggregator SL stores the data and issues a storeData response.

In step 4, Data Producer receives the storeData response including the selected Aggregator SL ID and possibly a new aggregated Data Set ID if it was changed from the ID provided in step 1.

At some later time, the Data Producer loses connectivity to Local SL (SL1), and re-connects to Local SL (SL2).

In step 5, the Data Producer generates new data and issues a storeData request to SL2. The storeData request may contain: aggDataSetIdentifier=ID1, priorLocalSLIdentifier=SL1, and aggregatorSLIdentifier.

In step 6, if SL2 knows the identity of the Aggregator SL (either from the storeData request in Step 5) or from mapping info available in SL2, then processing proceeds with Step 8. Otherwise SL2 queries the prior Local SL (i.e. SL1) to obtain the mapping info, using a getMappingInfo request. This request may include the aggDataSetIdentifier and the Data Producer identity.

In step 7, Local SL1 responds with getMappingInfo response message that contains the mapping information for this data set.

In step 8, the Local SL2 retargets this request to the Aggregator SL.

In step 9, the Aggregator SL stores the data and issues a storeData response.

In step 10, Data Producer receives the storeData response.

As an alternative to Step 6 and Step 7, the M2M/IoT system may maintain the mapping information for all data sets in one common service layer. SL2 may query this common SL to determine the mapping information for the selected data set.

Figure 18:
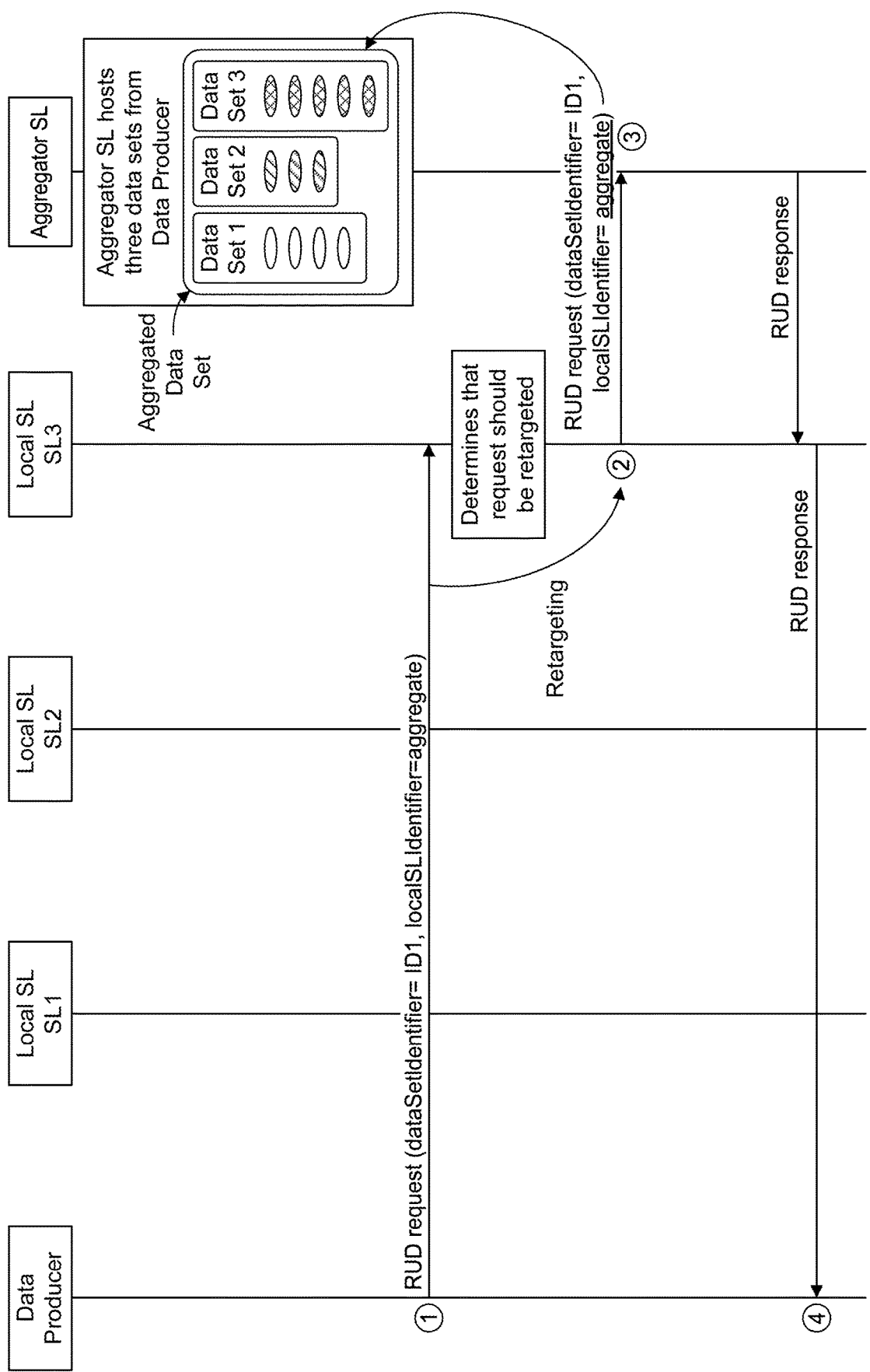
FIG. 18 shows an example data set RUD using method 1b.

Once the data sets are stored in the M2M/IoT system, the Data Producer can retrieve, update, or delete a specific entry in a data set, a complete data set, or the aggregated data set. Hereinafter the operation may be referred to as a Retrieve/Update/Delete (RUD) request. The processing steps are shown in FIG. 18 and additional details are described below. It is assumed that the Data Producer is requesting a RUD operation on the data with aggDataSetIdentifier=ID1, and that it is connected through Local SL (SL3). The Aggregator SL may have three data sets (one each from Local SLs (SL1, SL2, and SL3).

In step 1, Data Producer issues a RUD request to the Local SL (SL3). The Data Producer may include the following attributes in the request:

(1) Aggregated Data Set identifier (aggDataSetIdentifier): In this example, aggDataSetIdentifier=ID1;

(2) Local SL Identifier (localSLIdentifier): If the Data Producer would like to target a single data set, it may include the local SLIdentifier to identify the data set. For example, this may be set to "SL2" to target the data set while the Data Producer was connected to Local SL (SL2). Alternatively, the Data Producer may omit the attribute, or use an "aggregate" value to indicate that the request is targeting the aggregated data set. In the example shown, the request is a Retrieve that is targeting the aggregated data set; and (3) Prior Local SL Identifier (priorLocalSLIdentifier): This identifier allows the M2M/IoT system to know the last/prior local SL that handled connectivity for the Data Producer. The M2M/IoT system may use this information to retrieve any mapping information. In this step of this example, priorLocalSLIdentifier=NULL.

In step 2, SL3 looks through its mappingInfo to see if any entries correspond to the Data Producer Identity and the aggregated Data Set Identifier of the request. If so, SL3 determines that this request should be retargeted, and uses the mapping information to determine the Aggregator SL. The request may be retargeted to the Aggregator SL.

In step 3, Aggregator SL manages the request. The request impacts the aggregated data set. The Aggregator SL prepares the related response depending on the request and issues the response to the Data Producer. For example, if request is a Retrieve, the Aggregator SL may return retrieved results from the aggregated data set.

In step 4, the RUD response arrives at the Data Producer.

Figure 19A:
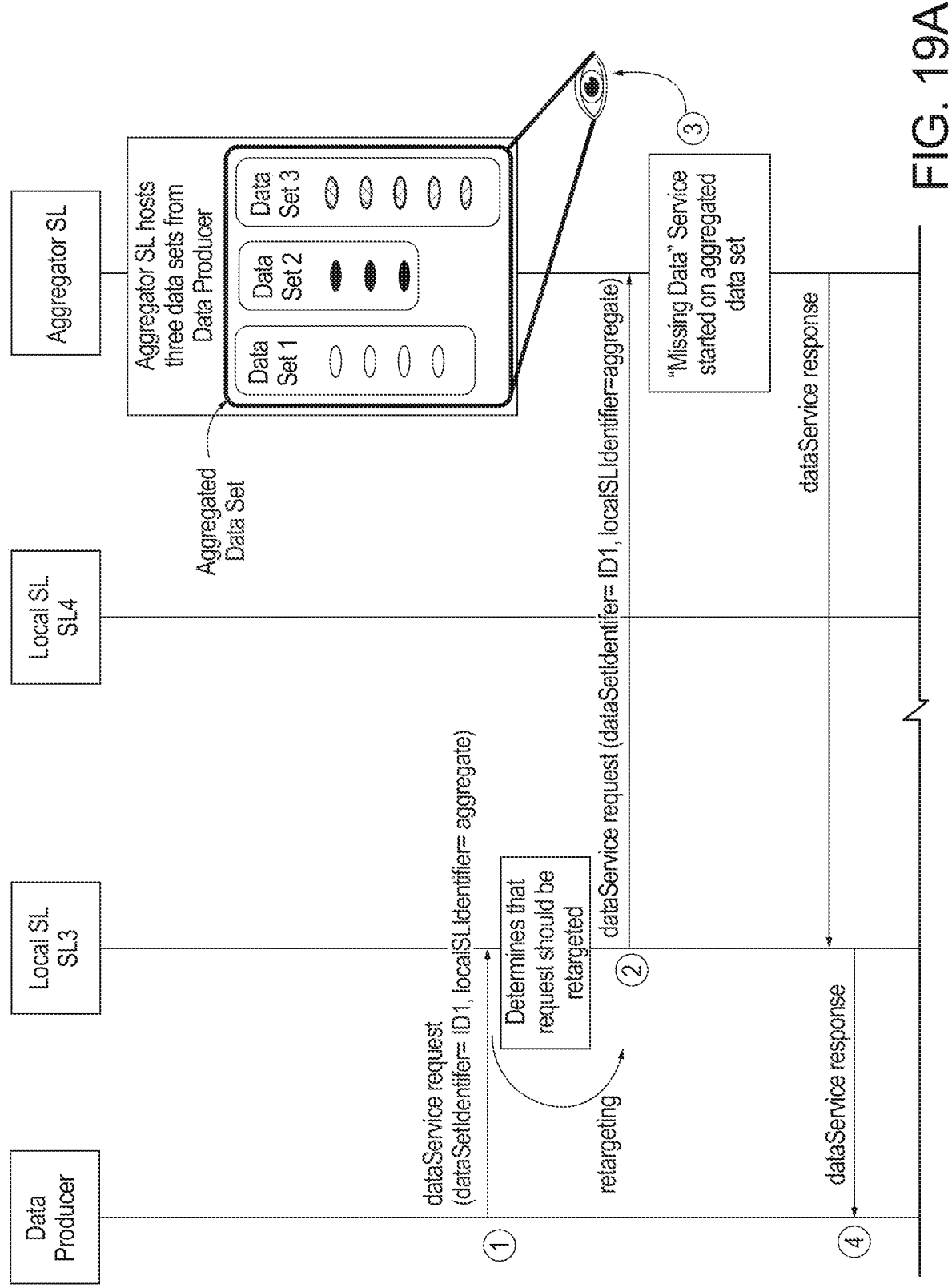
FIGS. 19A and 19B shows an example data service running on data set using Method 1b.
Figure 19B:
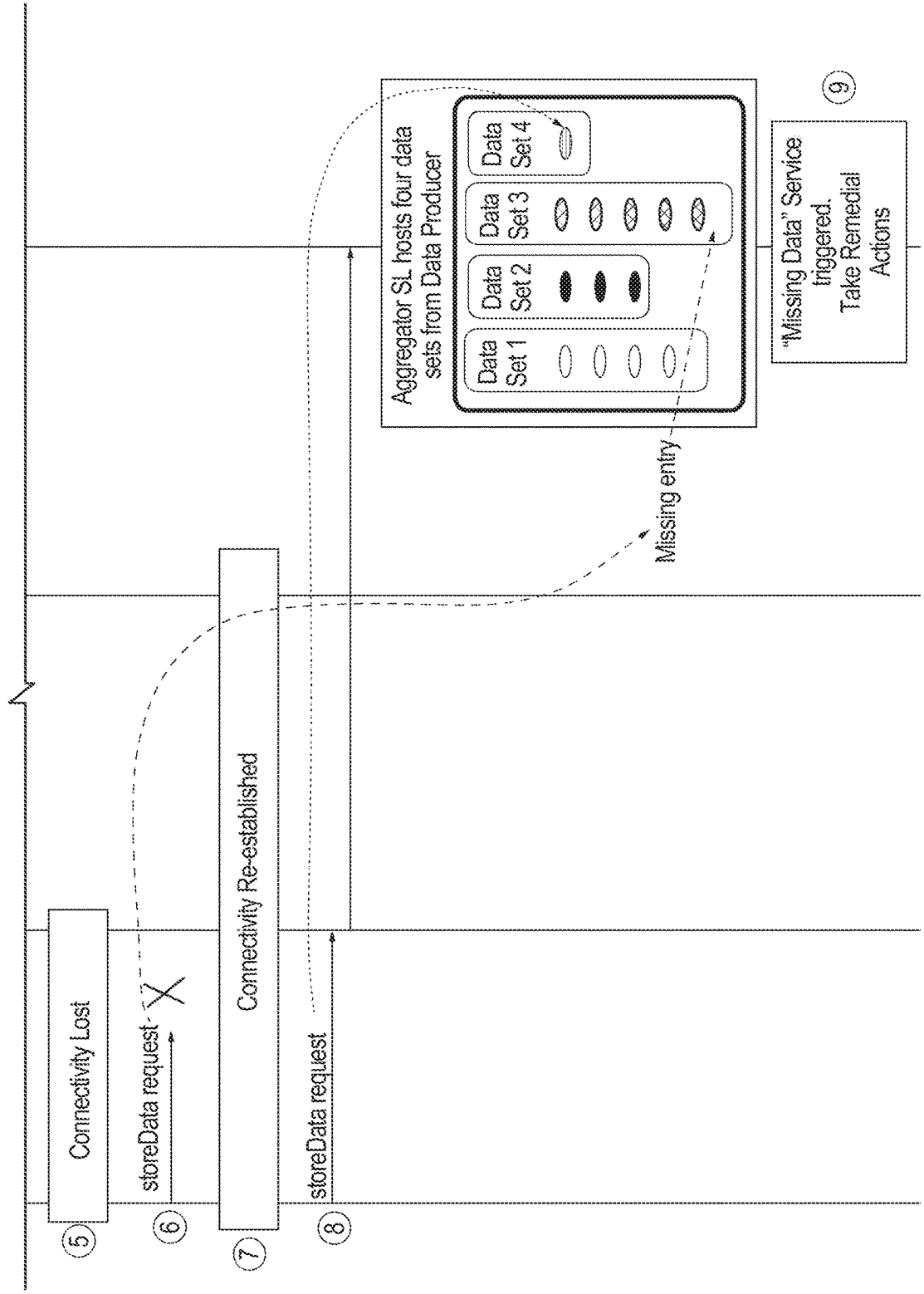

A Data Producer may request a Data Service be run on the data set. Continuing with the previous example, it may be assumed that the aggregated data set in the Aggregator SL contains three data sets. The processing steps are shown in FIG. 19 and additional details are described below.

In step 1, Data Producer issues a dataService request to the Aggregator SL. The Data Producer may include the following attributes in the request:

(1) Aggregated Data Set identifier (aggDataSetIdentifier): In this example, aggDataSetIdentifier=ID1;

(2) Local SL Identifier (local SLIdentifier): If the Data Producer would like to target a single data set, it may include the local SLIdentifier to identify the data set. For example, this may be set to "SL1" to target the data set while the Data Producer was connected to Local SL (SL1). Alternatively, the Data Producer may omit the attribute, or use an "aggregate" value to indicate that the request is targeting the aggregated data set. In the example shown, the requested data service is a "missing data" service, where the SL monitors the entries in the data set to determine if one is missing, and takes some remedial action—for example it notifies a third party application;

(3) Prior Local SL Identifier (priorLocalSLIdentifier): This identifier allows the M2M/IoT system to know the last/prior local SL that handled connectivity for the Data Producer. The M2M/IoT system may use this information to retrieve any mapping information. In this example, priorLocalSLIdentifier=NULL;

(4) Service Identity: the identity of the service that should process the data; and (5) Service Configuration: Any configuration information that is necessary to process the service.

In step 2, SL3 retargets the request to the Aggregator SL.

In step 3, Aggregator SL manages the Data Service request. The Aggregator SL may provide the service to the requested Data Set (aggregated data set in this example). The Aggregator SL responds to the Data Service request and initiates the service.

In step 4, the dataService response arrives at the Data Producer.

In step 5, the Data Producer loses connectivity to Local SL (SL3).

In step 6, the Data Producer tries to store a data entry in the aggregated data set, but fails as a result of the lack of connectivity.

In step 7, some time later the Data Producer reconnects to a new Local SL (SL4).

In step 8, Data Producer stores a data entry in the aggregated data set.

In step 9, Aggregator SL determines that a data entry in the data set is missing. Aggregator SL takes remedial action, by notifying a third party application about the missing data.

In Method 2, the aggregated data set may be maintained in the current local SL. The Data Producer may always interact with its local SL, and the M2M/IoT system may make sure that all prior data sets follow the Data Producer. In this embodiment, it may be assumed that the Data Producer receives some Connectivity Service from a local SL, the Data Producer requires the Data Continuity Service from the M2M/IoT system for data set with dataSetID=ID1, the Data Producer has already negotiated the use of Method 2 for data continuity, and Data Sets are stored in the M2M/IoT system using a storeData request.

Figure 20:
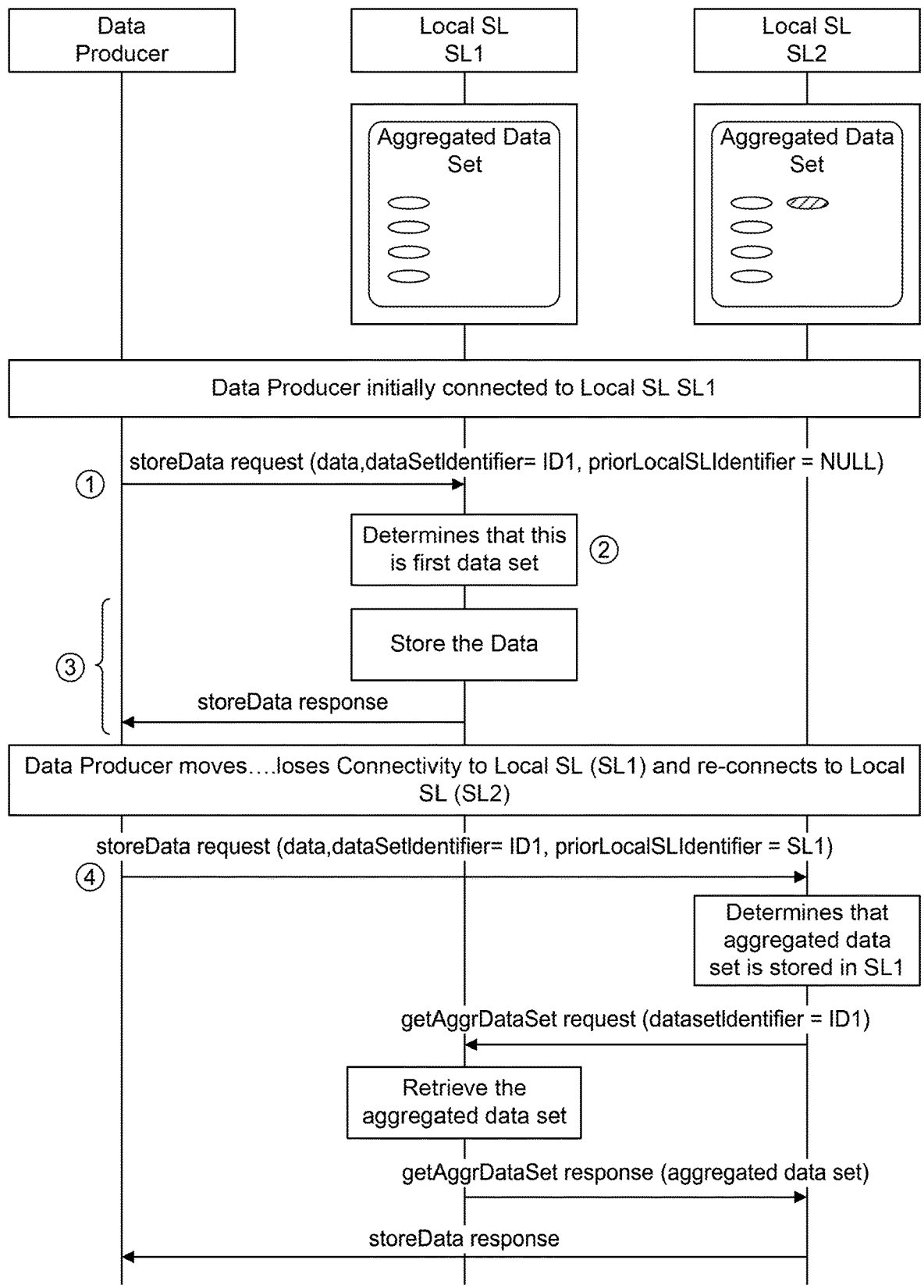
FIG. 20 shows an example data set creation using Method 2.

As the Data Producer generates data, it may store this data in the M2M/IoT system—as it moves, the Data Producer changes its local SL (moving from Local SL (SL1) to Local SL (SL2)). An example call flow for the creation of data sets is shown in FIG. 20. It is assumed that the Data Producer moves from Local SL (SL1) to Local SL (SL2).

In step 1, the Data Producer generates new data and issues a storeData request to the Local SL (SL1). The storeData request may contain one or more of the following attributes:

(1) Indication for data continuity service (dataContinuityFlag): Boolean to indicate to the Local SL if this data is to use the data continuity service. If TRUE, then Local SL uses the agreed method to provide data continuity;

(2) Aggregated Data Set identifier (aggDataSetIdentifier): This identifier allows the M2M/IoT system to distinguish between multiple data sets that may be produced by the Data Producer. In this example, aggDataSetIdentifier=ID1;

(3) Local SL Identifier (localSLIdentifier): This identifier allows the M2M/IoT system to know the local SL that handled the StoreData request. In this example, localSLIdentifier=SL1;

(4) Prior Local SL Identifier (priorLocalSLIdentifier): This identifier allows the M2M/IoT system to know the last/prior local SL that handled connectivity for the Data Producer. The M2M/IoT system may use this information to retrieve any mapping information. In this example, priorLocalSLIdentifier=NULL;

(5) Data Set Sequence Number (dataSetSequenceNumber): Allows M2M/IoT system to know how the aggregated data set is structured, and to determine missing data sets. The Aggregator SL can use this to help ensure that all data is aggregated. It may be used as a hint to avoid duplication and to look for missing data; and (6) Data Set Complete Indicator (dataSetCompleteInd): Indicator to Local SL that this is the last entry for a data set.

In step 2, SL1 determines if the Data Producer has prior data sets. For example, SL1 may use the priorLocalSLIdentifier to make this determination. In this case, as the value of priorLocalSLIdentifier=NULL, SL1 determines that this is the first data set from this producer.

In step 3, SL1 stores the data and issues a storeData response to the Data Producer At some later time, the Data Producer loses connectivity to Local SL (SL1), and connects to Local SL (SL2).

In step 4, the Data Producer generates new data and issues a storeData request to the SL2. The storeData request may contain: aggDataSetIdentifier=ID1; localSLIdentifier=SL2; priorLocalSLIdentifier=SL1.

In step 5, SL2 uses priorLocalSLIdentifier to determine if the Data Producer has prior data sets. As priorLocalSLIdentifier=SL1, SL2 determines that the prior data sets are stored in SL1. SL2 issues a getAggrDataSet request to SL1. The getAggrDataSet may include the data set identifier (ID1).

In step 6, SL1 responds with getAggrDataSet response message that contains the aggregated data set. In addition, the prior data set on SL1 may be deleted.

In step 7, SL2 stores the aggregated data set as well as the data in the current storeData request.

In step 8, SL2 issues a storeData response to the Data Producer.

Note that on subsequent storeData requests, SL2 ignores the priorLocalSLIdentifier information contained in the request.

As an alternative to Step 5 and Step 6, the M2M/IoT system may maintain the mapping information for all data sets in one common service layer. Local SL2 may query this common SL to determine the mapping information for the selected data set.

As an additional enhancement, as part of the getAggrDataSet, SL1 may also transfer all ongoing services that are currently running on SL1. These services are restarted at SL2 at the end of the transfer.

Once the data sets are stored in the M2M/IoT system, the aggregated data set may be located in the current Local SL. The Data Producer can retrieve, update, or delete a specific entry in a data set, a complete data set, or the aggregated data set by interacting directly to the local SL.

In one embodiment, a Data Producer may request a Data Service be run on the data set. As the aggregated data set is always stored in the current Local SL, the Data Service is also running in the current Local SL.

One issue that needs to be resolved is how to manage a Data Service that is started on a SL and, subsequently, the aggregated data set is moved to another SL. As part of moving the aggregated data set from one SL to another, any ongoing Data Services should also be moved.

In Method 3, all data sets may be stored in Local SLs and links/references may be added to these data sets. The links allow the data sets to be grouped into an aggregated data set. The M2M/IoT System may be responsible for creating the links (pastDataSetLink, futureDataSetLink) in each local data set. For this method, it may be assumed that the Data Producer receives some Connectivity Service from a local SL, the Data Producer requires the Data Continuity Service from the M2M/IoT system and the aggregated data set has dataSetID=ID1, the Data Producer has already negotiated the use of Method 4 for data continuity, and Data Sets are stored in the M2M/IoT system using a storeData request.

Figure 21:
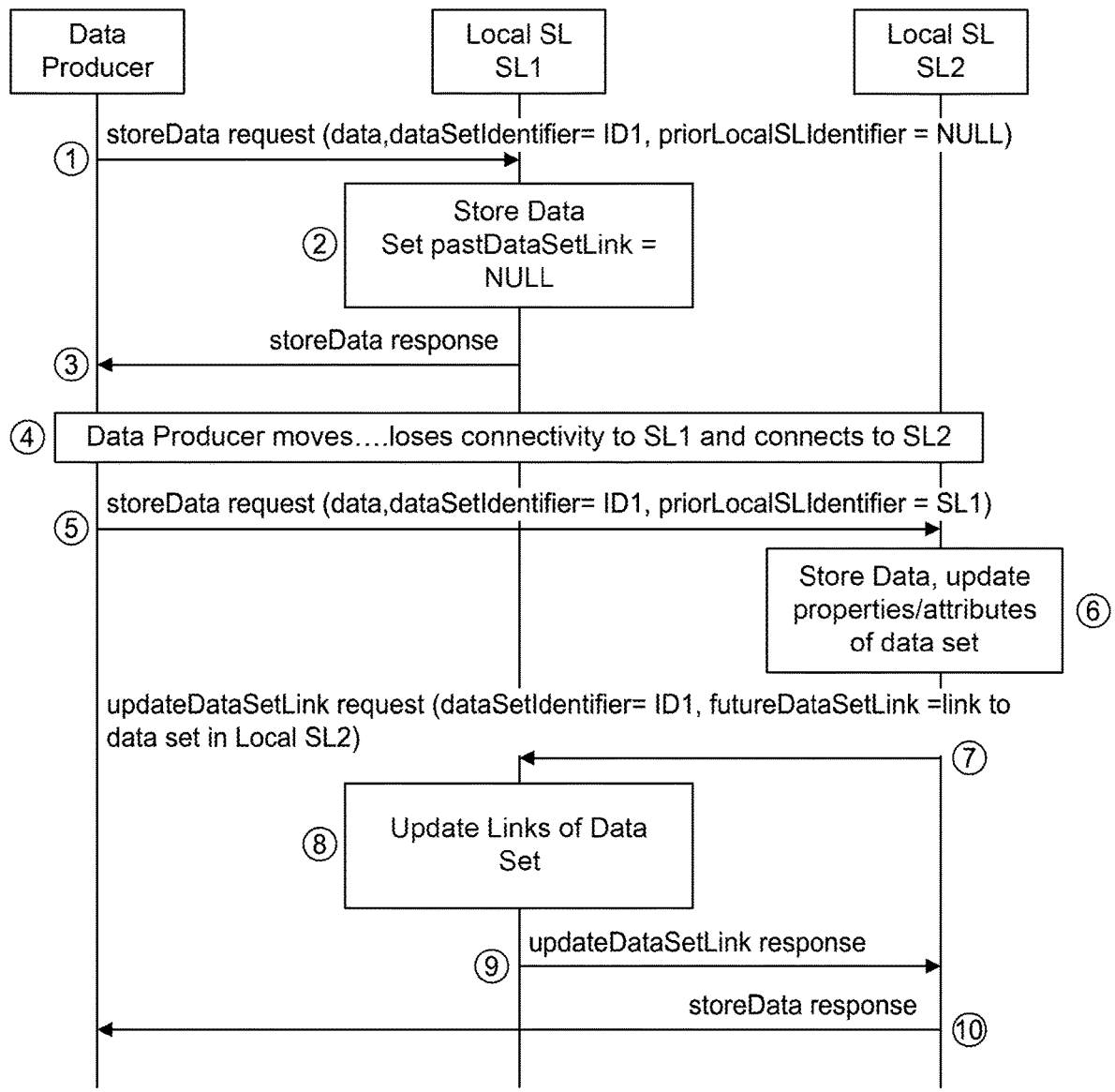
FIG. 21 shows an example data set creation using Method 3.

As the Data Producer generates data, it may store this data in the M2M/IoT system—as it moves, the Data Producer changes its local SL (moving from SL1 to SL2) and creates a new data set in SL2. The procedure for creating and linking data sets is shown in FIG. 21 and is described below.

In step 1, the Data Producer generates new data and issues a storeData request targeting the Local SL (SL1), which provides Connectivity Service as well as data storage service to the Data producer. In addition to the data to be stored, the StoreData request may contain one or more of the following attributes:

(1) Indication for data continuity service (dataContinuityFlag): Boolean to indicate to the Local SL if this data is to use the data continuity service. If TRUE, then Local SL uses the agreed method to provide data continuity;

(2) Aggregated Data Set identifier (aggDataSetIdentifier): This identifier allows the M2M/IoT system to distinguish between multiple data sets that may be produced by the Data Producer. In this example, aggDataSetIdentifier=ID1;

(3) Prior Local SL Identifier (priorLocalSLIdentifier): This identifier allows the M2M/IoT system to know the last/prior local SL that handled connectivity for the Data Producer. In this example, priorLocalSLIdentifier=NULL;

(4) Data Set Sequence Number (dataSetSequenceNumber): Allows M2M/IoT system to know how the aggregated data set is structured, and to determine missing data sets. The Aggregator SL can use this to help ensure that all data is aggregated. It may be used as a hint to avoid duplication and to look for missing data; and (5) Data Set Complete Indicator (dataSetCompleteInd): Indicator to Local SL that this is the last entry for a data set.

In step 2, SL1 stores the data in the data set, as well as the provided properties (aggDataSetIdentifier).

In step 3, SL1 uses the priorLocalSLIdentifier to determine where the prior data set is stored. As this value is set to NULL, SL1 determines that this is the first data set associated with the Data Producer and may set pastDataSetLink="NULL".

In step 4, at some later time, the Data Producer loses connectivity to SL1, and connects to SL2. Data Producer may be aware that its last data set was stored in SL1.

In step 5, the Data Producer generates new data and issues a storeData request targeting SL2, which is now providing the Connectivity Service and the data storage service to the Data Producer. The storeData request contains aggDataSetIdentifier=ID1 and priorLocalSLIdentifier=SL1.

In step 6, SL2 uses the priorLocalSLIdentifier to determine where the prior data set is stored. As this value is set to SL1, SL2 determines that the current data set should be linked to the data set in SL1. It may update the link to the past data set (pastDataSetLink) to point to data set in SL1.

In step 7, SL2 also updates the link in the data set on SL1 so that the forward link (futureDataSetLink) points to the data set in SL2. This is done through an updateDataSetLink request. The request may contain the following information: Aggregated Data Set identifier (aggDataSetIdentifier=ID1) and Link to future data set (futureDataSetLink=link to data set in SL2).

In step 8, SL1 updates the data set so that its "future" link points to data set in SL2.

In step 9, SL1 issues a updateDataSetLink response to SL2.

In step 10, SL2 issues a storeData response to the Data Producer.

Once the data sets are stored in the M2M/IoT system (in the local SLs), the Data Producer can issue a RUD request targeting a data entry in a data set, targeting one or more data sets in specific local SLs, or targeting the aggregated data set. Two alternatives are possible:

Data Producer interacts with all the local SLs to "coordinate" the requested operation. For example, if the Data Producer is interested in retrieving the aggregated data set, it may retrieve each individual data set in each of the local SLs, and aggregate them once all the data sets are retrieved. This is possible, as the Data Producer is aware of the SLs that host each data set. However, this may lead to certain inefficiencies since the Data Producer may have to retrieve data sets in Local SLs that are many communication hops away; or Data Producer interacts with the current Local SL providing connectivity service and data storage service, and the M2M/IoT system is responsible for coordinating the requested operation. Using the example above where the Data Producer is interested in retrieving the aggregated data set, the current Local SL may be responsible for retrieving each of the individual data sets and performing the aggregation. The local SL may then respond with a single response to the requestor with the aggregated data set.

Figure 22A:
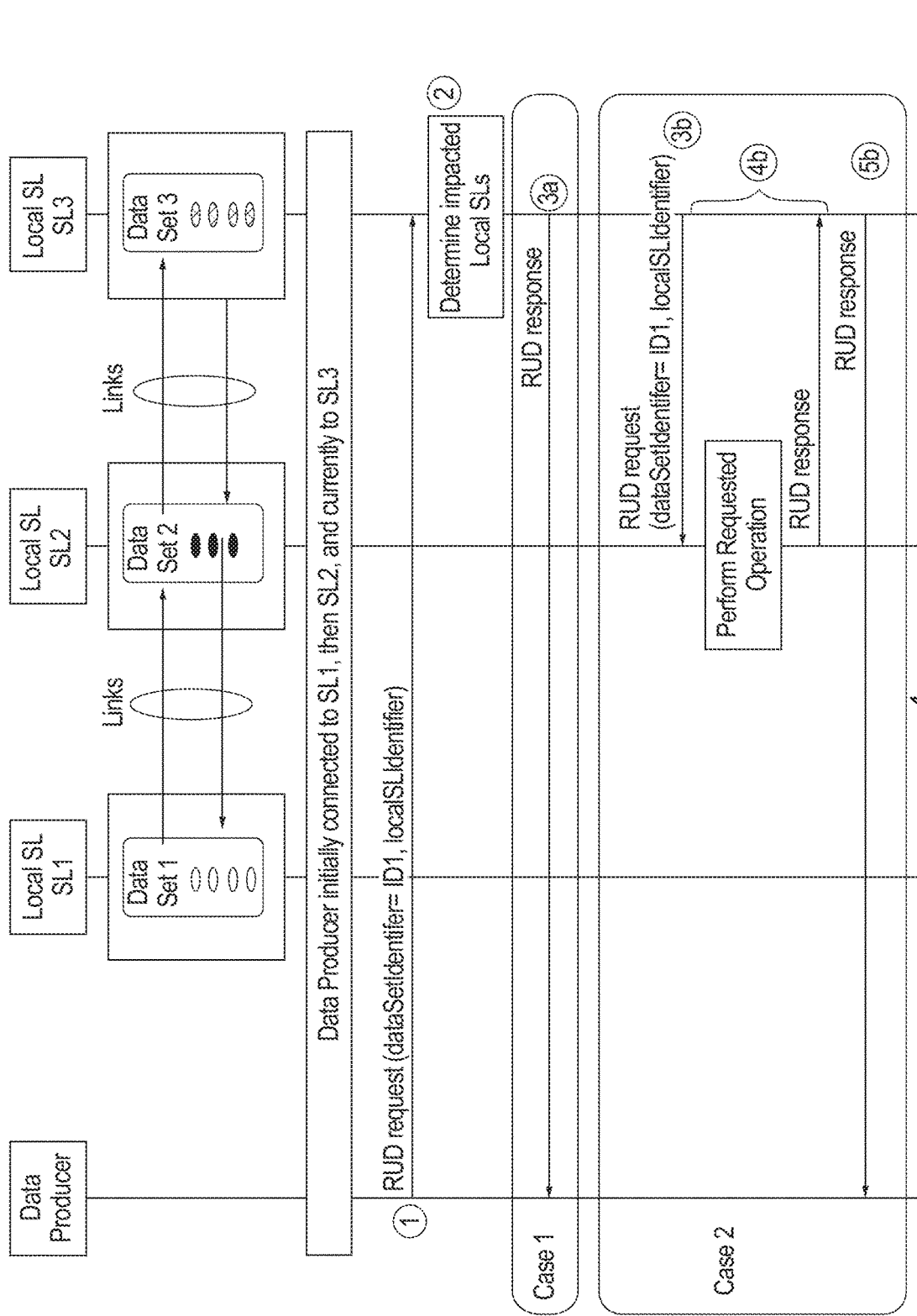
FIGS. 22A, 22B and 22C show an example data set RUD for Method 3.
Figure 22B:
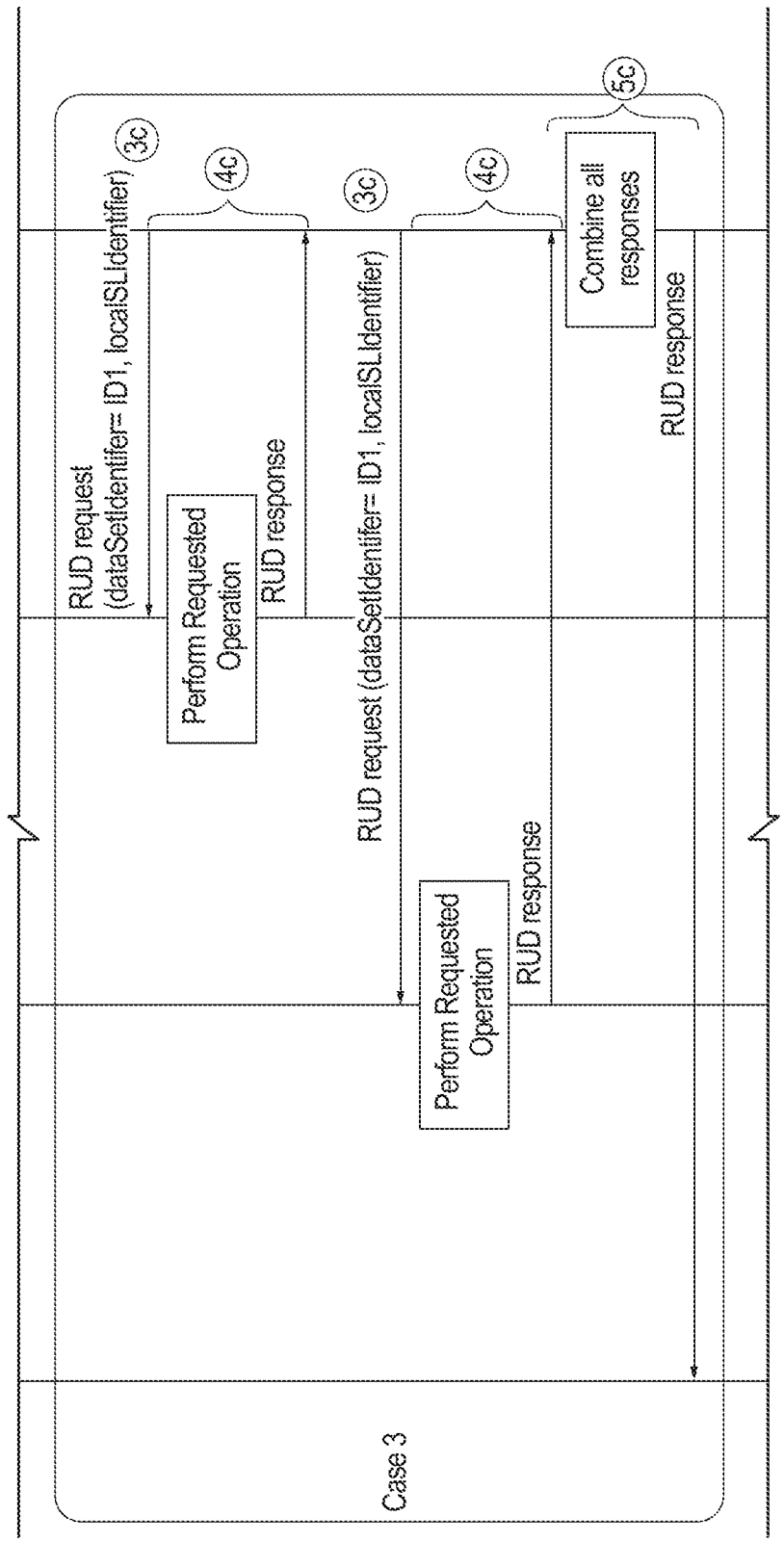
Figure 22C:
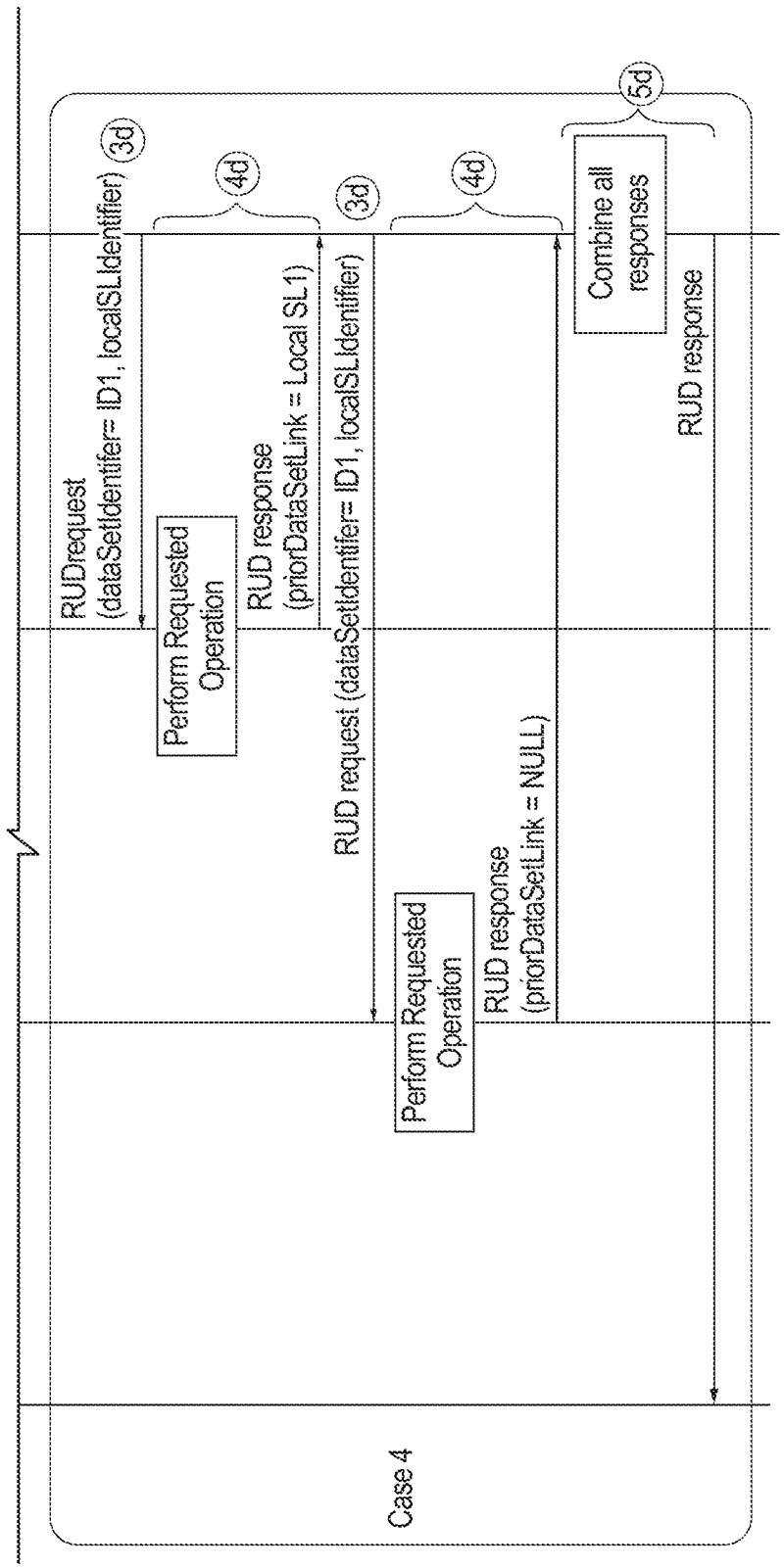

A typical call flow for the latter method is shown in FIG. 22 and described below. It may be assumed that the Data Producer is requesting a RUD operation on the data with aggDataSetIdentifier=ID1, and that it is connected through Local SL (SL3), and that the Data Producer has produced three data sets (one each in Local SLs (SL1, SL2, and SL3), and is currently receiving Connectivity Service and data storage service from SL3.

In step 1, Data Producer issues a RUD request to SL3. The Data Producer may include the following attributes in the request:

(1) Aggregated Data Set identifier (aggDataSetIdentifier): In this example, aggDataSetIdentifier=ID1; and (2) List of Local SL Identifier (localSLIdentifier): If the Data Producer would like to target data entries in a data set, or specific data sets, it may include a list of localSLIdentifier(s) to identify the data set(s). For example, localSLIdentifier may be set to "SL2" to target the data set while the Data Producer was connected to Local SL (SL2). Alternatively, the Data Producer may omit the attribute, or use an "aggregate" value to indicate that the request is targeting the aggregated data set. In the example shown, the request is a Retrieve that is targeting the data set produced while connected to Local SL (SL2).

In step 2, SL3 determines the Local SLs that are impacted by the RUD request from Step 1.

If the RUD request only impacts the current Local SL (that is SL3) (case 1), than in step 3a, the operation is performed at SL3 and a response is issued to the Data Producer.

If the RUD request only targets a single other Local SL (e.g. SL2) (case 2), then:

In step 3b, SL3 issues a new RUD request to SL2;

In step 4b, SL2 performs the requested operation, and responds to SL3; and

In step 5b, SL3 uses the response from Step 3b and generates a RUD response to the request from Step 1, which is issued to the Data Producer.

If the RUD request targets multiple Local SLs (case 3):

In step 3c, SL3 issues multiple new RUD requests to each of these Local SLs;

In step 4c, each of the local SLs performs the requested operation and responds to SL3; and In step 5c, SL3 combines all the responses from Step 3c and generates a RUD response to the request from Step 1, which is issued to the Data Producer.

If the RUD request targets the aggregated data set (i.e. localSLIdentifier="aggregate") (case 4):

In step 3d, SL3 uses the pastDataSetLink attribute to determine a link to the prior data set, and sends the RUD request to the hosting SL (pastDataSetLink==link to aggregated data set in SL2).

In step 4d, SL2 performs the requested operation and responds to SL3. The response also includes its pastDataSetLink (==link to data set in SL1).

Step 3d: SL3 uses the pastDataSetLink to determine that further data sets are linked to this aggregated set and issues another RUD request. This time, the RUD request is sent to SL1.

In step 4d, SL1 performs the requested operation and responds to SL3. The response also includes its pastDataSetLink (==NULL).

In step 5d, SL3 uses the pastDataSetLink (==NULL) as an indication that no more data sets are linked to this aggregated set. It combines all the responses and generates a RUD response to the request from Step 1, which is issued to the Data Producer.

In Case 4, the Data Producer only provides the last SL it saved data set to, while in Case 3 the Data Producer provides a complete list of all SLs it saved data sets to. For Case 4, SL3 may need to use the pastDataSetLink attribute to determine the local SLs that are involved in the aggregate data set, and recursively send a new RUD request to each of these.

Figure 23A:
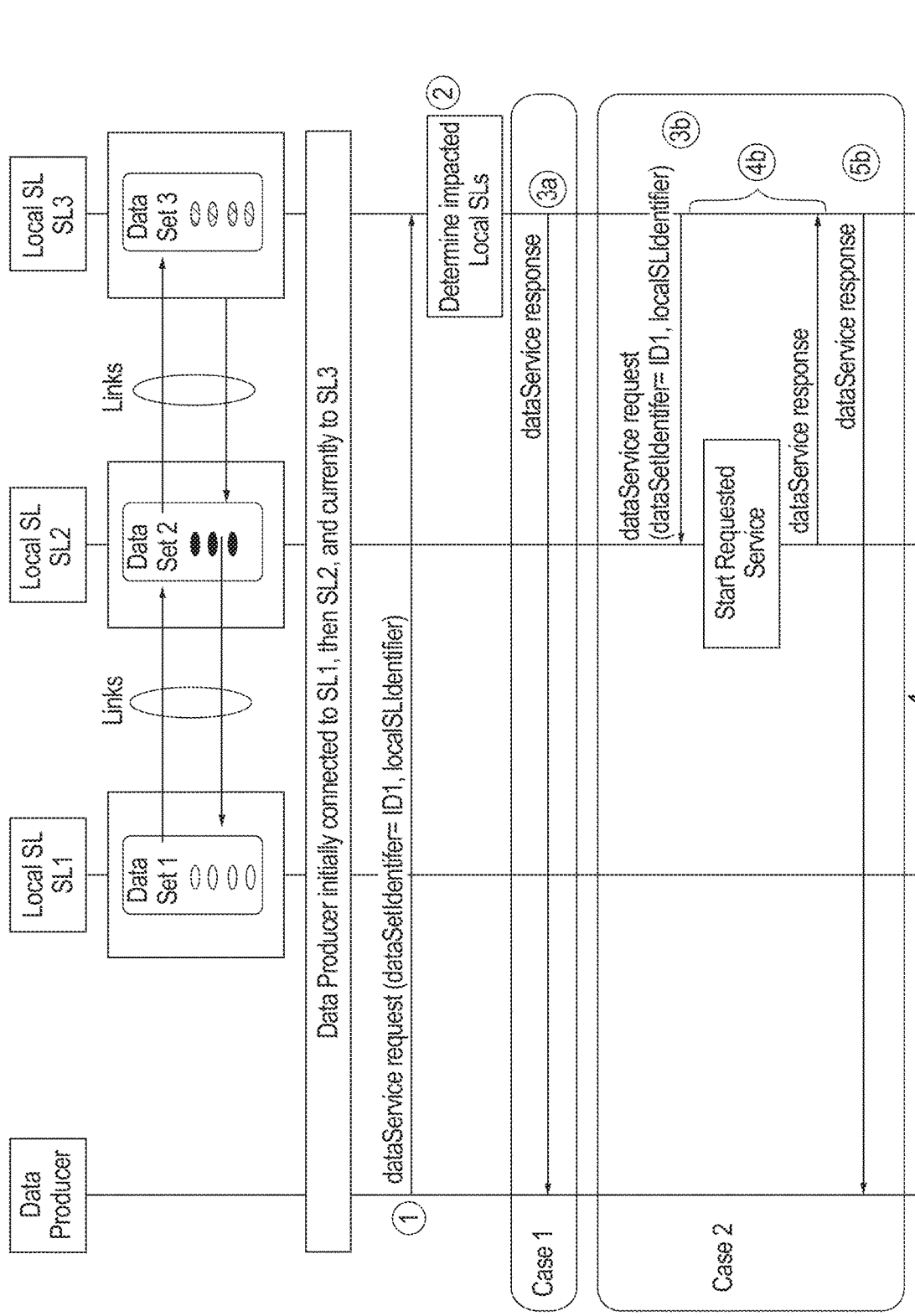
FIGS. 23A and 23B shows an example data service for Method 3.
Figure 23B:
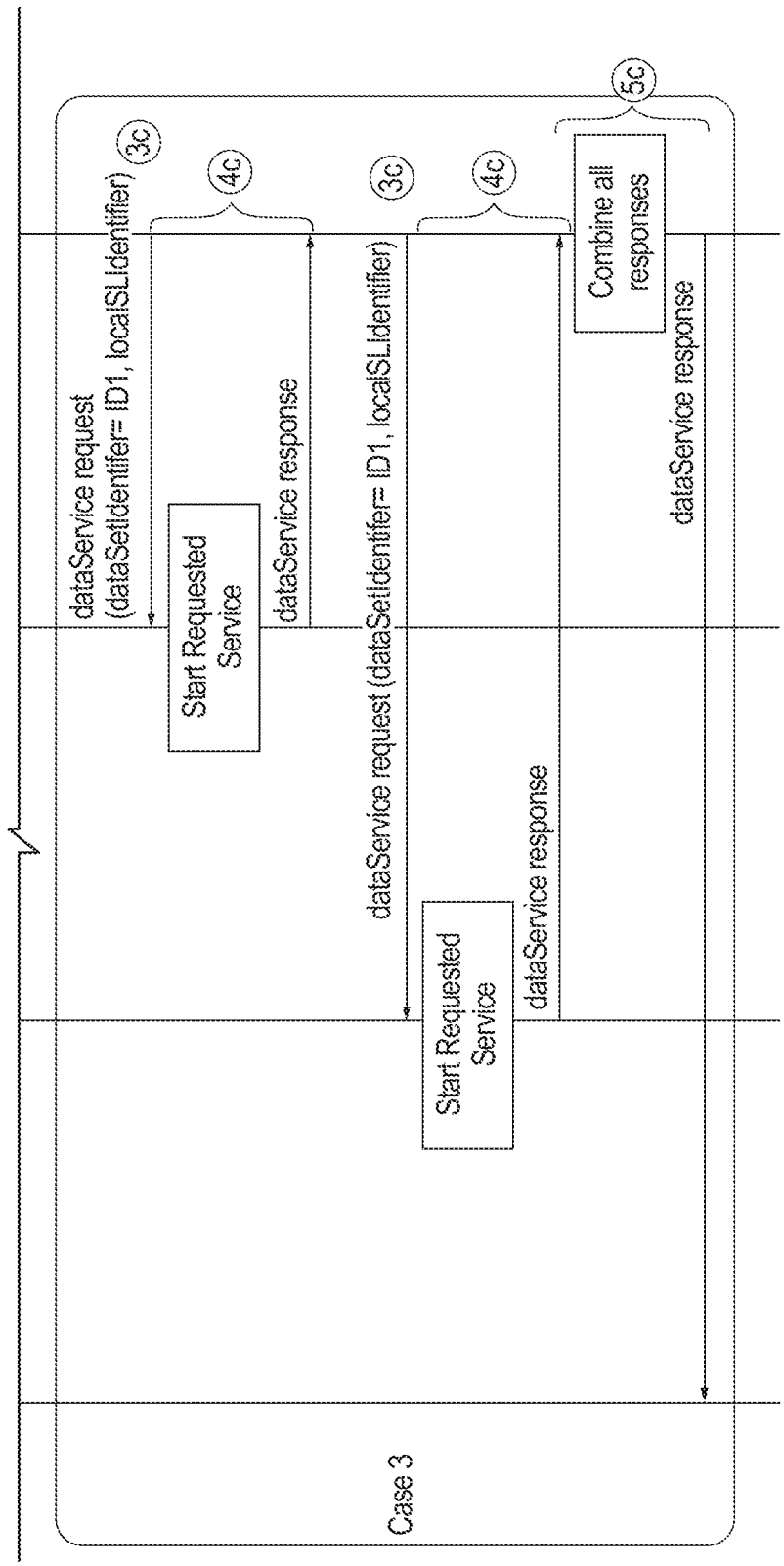

Once the data sets are stored in the M2M/IoT system (in the local SLs), the Data Producer can initiate a Data Service targeting a data entry in a data set, targeting one or more data sets in specific local SLs, or targeting the aggregated data set. It is assumed that the Data Producer initiates the Data Service through its current Local SL, and that the M2M/IoT system is responsible for guaranteeing the service is run in the correct Local SL. The procedure is shown in the call flows of FIG. 23, and described below.

In step 1, Data Producer issues a dataService request to its current local SL (SL3). The Data Producer may include the following attributes in the request:

(1) Aggregated Data Set identifier (aggDataSetIdentifier): For example, aggDataSetIdentifier=ID1;

(2) Local SL Identifier (localSLIdentifier): If the Data Producer would like to target a single data set, it may include the localSLIdentifier to identify the data set. For example, this may be set to "Local SL1" to target the data set while the Data Producer was connected to Local SL1. Alternatively, the Data Producer may omit the attribute, or use an "aggregate" value to indicate that the request is targeting the aggregated data set. In the example shown, the requested data service is a "missing data" service, where the SL monitors the entries in the data set to determine if one is missing, and takes some remedial action;

(3) Service Identity: the identity of the service that should process the data; and (4) Service Configuration: Any configuration information that is necessary to process the service.

In step 2, SL3 manages the Data Service request, and determines the impacted SLs.

If the Data Service only impacts the current Local SL (that is SL3) (case 1):

In step 3a, the Data Service is started at SL3 and a response is issued to the Data Producer.

If a Data Service request only targets a single other Local SL (e.g. SL2) (case 2):

In step 3b, SL3 issues a new Data Service request to SL2;

In step 4b, SL2 starts the requested service, and responds to SL3; and

In step 5b, SL3 uses the response from Step 3b and generates a Data Service response to the request from Step 1, which is issued to the Data Producer.

If a Data Service request targets multiple Local SLs (case 3):

In step 3c: SL3 issues multiple new Data Service requests to each of these Local SLs;

In step 4c: Each of the local SLs starts the requested service and responds to SL3; and In step 5c: SL3 combines all the responses from Step 3c and generates a Data Service response to the request from Step 1, which is issued to the Data Producer.

If a Data Service request targets the aggregated data set (i.e. localSLIdentifier="aggregate") (case 4), SL3 may need to use the pastDataSetLink attribute to determine the local SLs that are involved in the aggregate data set. The specific processing depends on the type of data service requested. Some services are relatively static. Such services rely on the service layer to look through aggregated data set and perform a one-time action. These services run on a "snapshot" of the aggregated data set. Typical examples of static data services include: determine the maximum of aggregated data set, check for out-of-range entries in the aggregated data set, etc. Alternatively, some services may be very dynamic. Such services rely on the service layer to continuously monitor and perform a service as new data entries are added to the aggregated data set. These services are not based on a snapshot of the aggregated data set, but assume that the aggregated data set changes with time (as new entries are added and old entries are deleted and/or expire). Typical examples of dynamic data services include: determine the running average of an aggregated data set; check for inconsistent data as new data entries are stored in an aggregated data set, check if a third party has retrieved any entries in a data set, etc. For such dynamic data services, SL3 may need to do one or more of the following:

Retrieve specific attributes of all the data sets in the aggregated data set. For example, in the case of a running average data service, SL3 may need to retrieve the number of data entries and sum of all entries in each of the remote data sets (SL1 and SL2 in example shown) that make up the aggregated data set. This allows SL3 to calculate the running average; and Subscribe to be notified when certain events occur at the service layers hosting the remote data sets that make up the aggregated data set. So for example if the dynamic data service monitors when a third party retrieves any data entry in the aggregated data service, then SL3 may need to subscribe to SL1 and SL2 to monitor for this event.

For static data services, the processing is similar to how SL3 handles a RUD request and the detail is not repeated here.

The details for a typical dynamic data service request (e.g., running average) are shown in Steps 3d to 13d. To calculate the running average, SL3 may need to know the number of entries in each of the remote SLs, as well as the sum of all the entries in these service layers. In addition, SL3 may also need to know if any of these values (number and sum) changes. For example, these values may change if a data entry in a data set in a remote SL expires. In this case, both the number of entries as well as the sum of the entries may change. As a result, SL3 may need to retrieve these attributes in each of the remote SLs and to subscribe to be notified if one of these attributes changes. The details of the operation are described below:

In step 3d, SL3 uses the pastDataSetLink attribute to determine a link to the prior data set, and sends the retrieve request to the remote SL (pastDataSetLink==link to aggregated data set in SL2) to obtain the needed attributes (dataSetNumberEntries, dataSetTotalSum);

In step 4d, SL2 performs the requested operation and responds to SL3. The response also includes its pastDataSetLink (==link to data set in SL1);

In step 5d: SL3 stores the (dataSetNumberEntries, dataSetTotalSum) from SL2 in local attributes of the data set so that these can be used by the running data service. These may be stored in a new attributes of the data set, which may contain:

dataSetPriorSLIdentityList: List of identities of service layers that host data sets linked to the aggregated data set. For this example, dataSetPriorSLIdentityList={Identity of SL2}; and dataSetPriorSLAttributeList: List of attributes that are tied to the data sets stored in prior service layers, and that are required to run the data service. This may be a complex attribute. For the example shown: dataSetPriorSLAttributeList={(value of dataSetNumberEntries from SL2, value of dataSetTotalSum from SL2).

In step 6d, SL3 issues a request to subscribe to be notified if the attributes (dataSetNumberEntries, dataSetTotalSum) in the SL2 change.

In step 7d, SL2 responds to the subscribe request.

In step 8d, SL3 uses the pastDataSetLink parameter received from Step 4d to determine that further data sets linked to this aggregated set and issues another retrieve request. This time, the retrieve request is sent to SL1.

In step 9d, SL1 performs the requested operation and responds to SL3. The response also includes its pastDataSetLink (==NULL).

In step 10d, SL3 stores the (dataSetNumberEntries, dataSetTotalSum) from SL1 in local attributes. For the example shown:

dataSetPriorSLIdentityList={Identity of SL2, Identity of SL1}; and dataSetPriorSLAttributeList={

(value of dataSetNumberEntries from SL2, value of dataSetTotalSum from SL2)

(value of dataSetNumberEntries from SL1, value of dataSetTotalSum from SL1)

In step 11d, SL3 issues a request to subscribe to be notified if the attributes (dataSetNumberEntries, dataSetTotalSum) in the SL1 change.

In step 12d, SL1 responds to the subscribe request.

In step 13d, SL3 uses the pastDataSetLink (==NULL) from Step 9d as an indication that no more data sets are linked to this aggregated set. Continuing with the running average example, SL3 determines the total number of entries and sum of all entries in the aggregated data set by summing all the responses. In addition, SL3 may send a response to the dataService request from Step 1, which is issued to the Data Producer.

Subsequently, when SL3 is notified that one of the attributes in a prior data set has changed, SL3 may retrieve the new attribute values, update the dataSetPriorSLAttributeList, and re-evaluate the running average.

Note that if SL3 has a stored dataSetPriorSLIdentityList, it may use this to determine the impacted SLs (in Step 2). In such a case, the current local SL does not need to recursively use the pastDataSetLink attribute to find the impacted SLs.

A Data Consumer is any entity that interacts with data sets, but which does not generate entries that are stored in the data set. As a result, a Data Consumer may retrieve data sets, delete data sets, or start a data service on the data sets. Note that the Data Consumer procedures for Method 1 (a/b) are not described herein.

Data Consumer Procedures for Method 2—In this method, the aggregated data set may always follow the Data Producer. In one example, the aggregated data set always follows the data producer. Once a Data Consumer has discovered an aggregated data set on a SL, it may issue a retrieve/delete request to this SL, and it may also start one or more Data Services on the aggregated data set. However, as a Data Producer moves and connects to a new SL, the aggregated data set and the Data Services running on the aggregated data set are all transferred to this new SL. If a Data Consumer has started a Data Service on one SL, and that service has been transferred to a new SL, the Data Consumer may need to be informed of this transfer. This allows the Data Consumer to maintain control of this service so that it can be updated/stopped.

Figure 24:
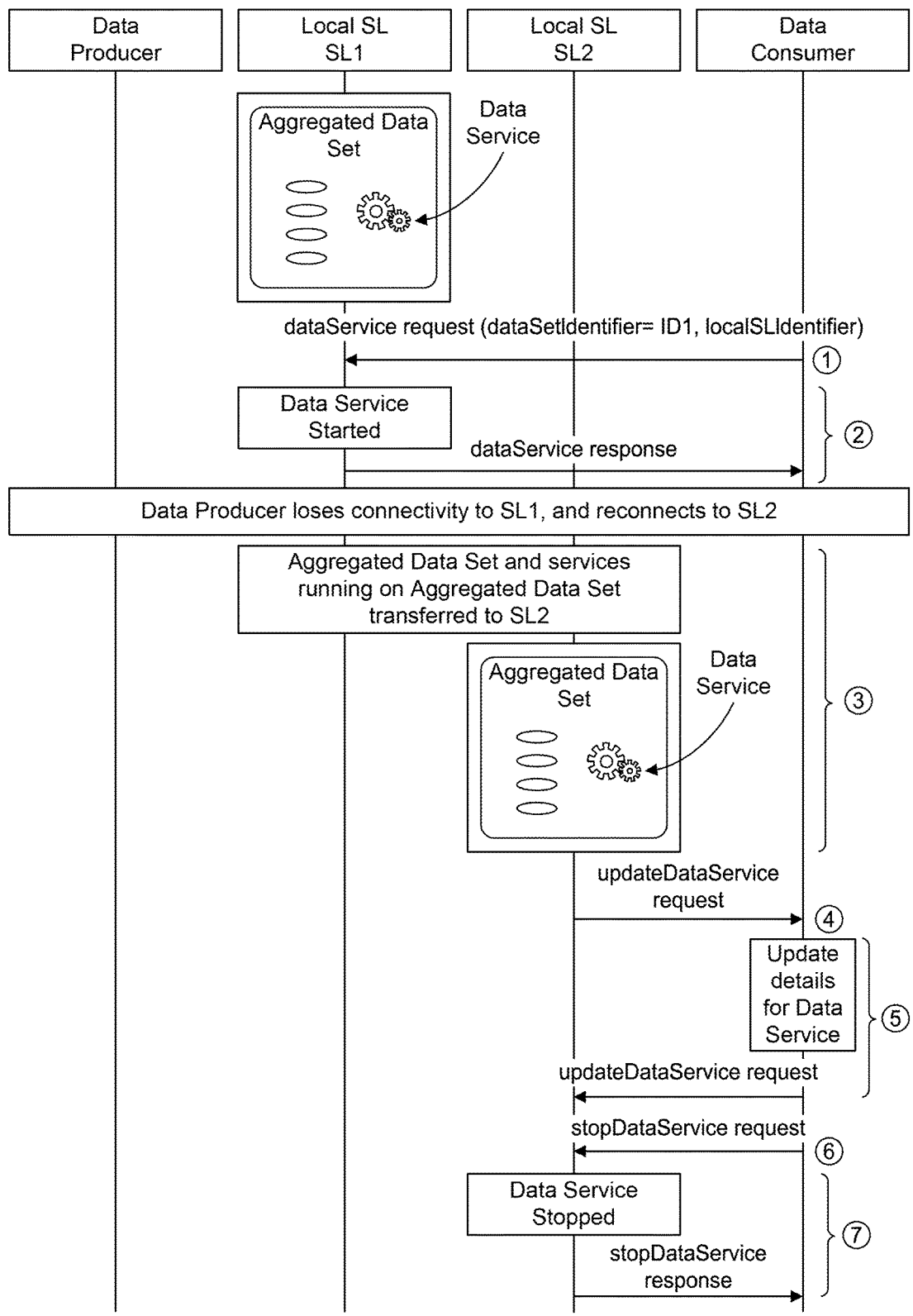
FIG. 24 shows an example data service request from a data consumer using Method 2.

This is shown through the call flow in FIG. 24 which is described further below. It may be assumed that a Data Producer is connected to local SL (SL1) and that the aggregated data set is available at SL1. Furthermore, it may also be assumed that a Data Consumer has discovered the aggregated data set in SL1 and has started a Data Service on SL1. The example service shown is a monitor service where the Data Consumer asks to be notified if the number of entries in the data set exceeds a certain threshold (Thresh1).

In step 1, Data Consumer issues a dataService request to SL1.

In step 2, SL1 starts the requested service and issues a dataService response to the Data Consumer.

Some time later, the Data Producer loses connection to SL1 and connects to SL2.

In step 3, Aggregated data set and services running on the aggregated data set are transferred to SL2.

In step 4, SL2 sends a updateDataService request to the Data Consumer. This message may include an identifier of the data service as well as the new SL that will host the service.

In step 5, Data Consumer updates the information for the requested Data Service (from Step 1) and responds to SL2.

In step 6, after some time, the Data Consumer would like to Stop the Data Service. It issues a stopDataService request to the current local SL that is managing the aggregated data set.

In step 7, Local SL (SL2) stops the service and responds to the Data Consumer.

Additionally or alternatively, since SL1 is aware that the service will be transferred to SL2, the updateDataService request/response exchange from Step 4 and Step 5 may be initiated by SL1.

Data Consumer Procedures for Method 3. The individual data sets may be stored in various SLs of the M2M/IoT system, but each of these data sets may have cross-links that allow the M2M/IoT system to manage the aggregated data set. A Data Consumer can find any of the individual data sets in a Local SL. Through this Local SL, the Data Consumer may issue a retrieve/delete request for the aggregated data set, and it may also start one or more Data Services on the aggregated data set.

Figure 25:
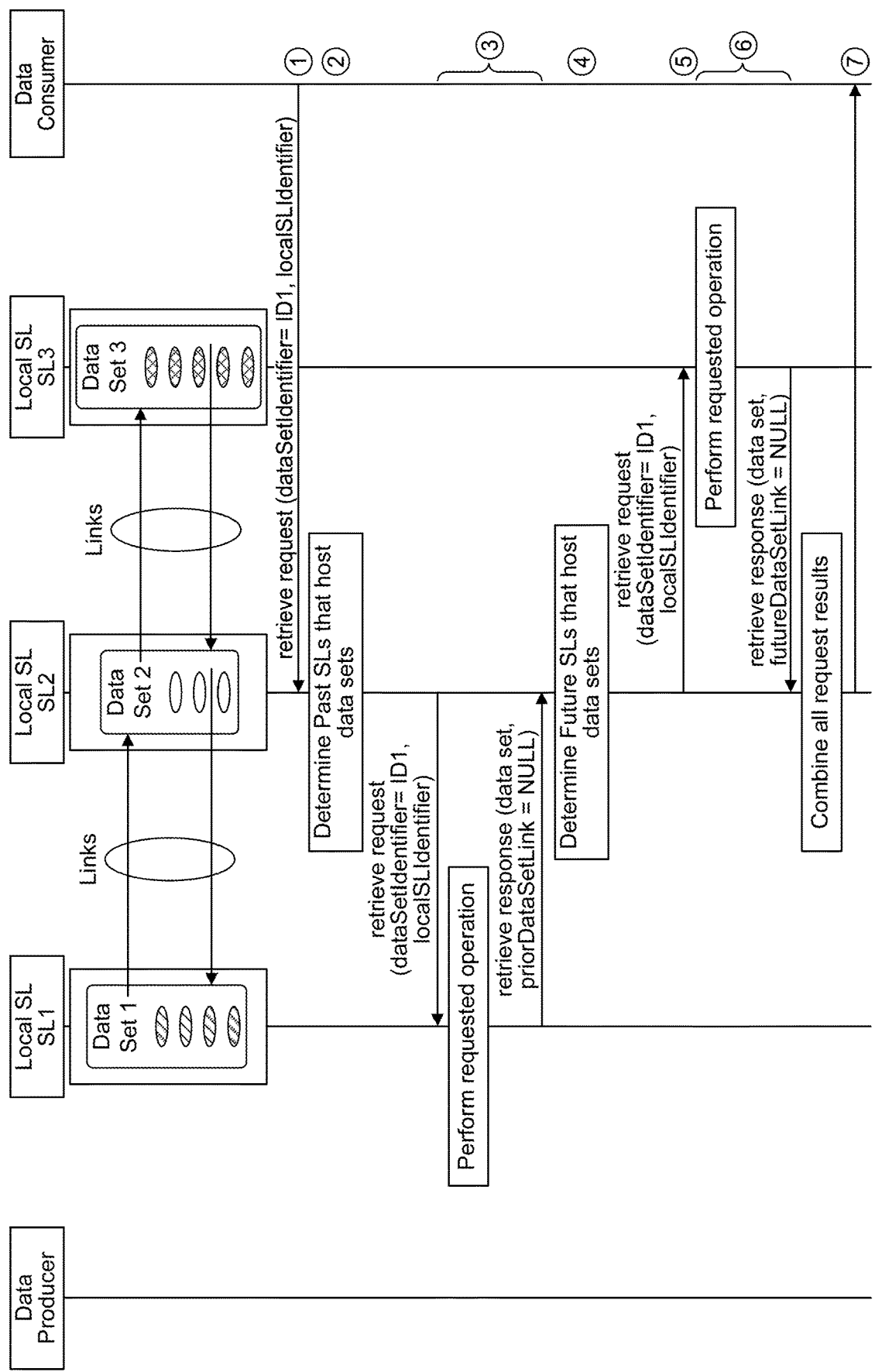
FIG. 25 shows an example data consumer retrieving data set for Method 3.

It may be assumed that a Data Consumer has found one of the data sets in a Local SL, and that this Data Consumer has issued a request to retrieve or delete the entire aggregated data set. Since the Local SL is not the current Local SL for the aggregated data set, when it receives the retrieve/delete request, it may need to propagate this request to past as well as future SLs that host data sets that are linked to the aggregated data set. A typical call flow is shown in FIG. 25.

It may be assumed that an aggregated data set is distributed over three local SLs (SL1, SL2, and SL3). The Data Producer is connected to SL3, and this is the current Local SL. It may also be assumed that the Data Consumer has discovered the data through SL2 and issues its retrieve request or delete request through SL2. For simplicity, only the retrieve request is shown in the example, but the processing also applies to a delete request.

In step 1, Data Consumer issues a retrieve request to SL2, asking to retrieve the aggregated data set with aggDataSetIdentifier=ID1.

In step 2, SL2 uses the links in the data set to recursively determine all impacted SLs. SL2 first uses the pastDataSet-Link attribute to determine a link to the prior data set, and sends the retrieve request to the hosting SL (pastDataSetLink==link to aggregated data set in SL1).

In step 3, SL1 performs the requested operation and responds to SL2. The response also includes its pastData-SetLink (==NULL).

In step 4, SL2 uses the pastDataSetLink (==NULL) as an indication that no more prior data sets are linked to this aggregated set.

In step 5, SL2 uses the futureDataSetLink attribute to determine a link to any future data set and sends the retrieve request to the hosting SL (futureDataSetLink==link to aggregated data set in SL3).

In step 6, SL3 performs the requested operation and responds to SL2. The response also includes its futureData-SetLink (==NULL).

In step 7, SL2 uses the futureDataSetLink (==NULL) as an indication that no more future data sets are linked to this aggregated set. It combines all the responses (received from Step 3 and Step 6) as well as the data set information it has stored locally, and generates a retrieve response to the request from Step 1, which is issued to the Data Consumer.

Once a Data Consumer has discovered part of the aggregated data set (in a local SL), it may initiate a Data Service on the aggregated data set. In such a case, the M2M/IoT system may have to propagate the service request to both past and future SLs, retrieve necessary attributes in both past and future SLs to allow performing the requested data service, and subscribe to monitor certain events in both past and future SLs to allow performing of the requested data service.

Embodiments for implementing the proposed methods/enhancements to the oneM2M architecture are disclosed herein. In addition, a user interface is also disclosed to display and/or configure related parameters and information. The functionality described may be a new Data Continuity CSF which handles the processing dealing with any of the proposed methods that enable interacting with aggregated data sets.

Figure 26:
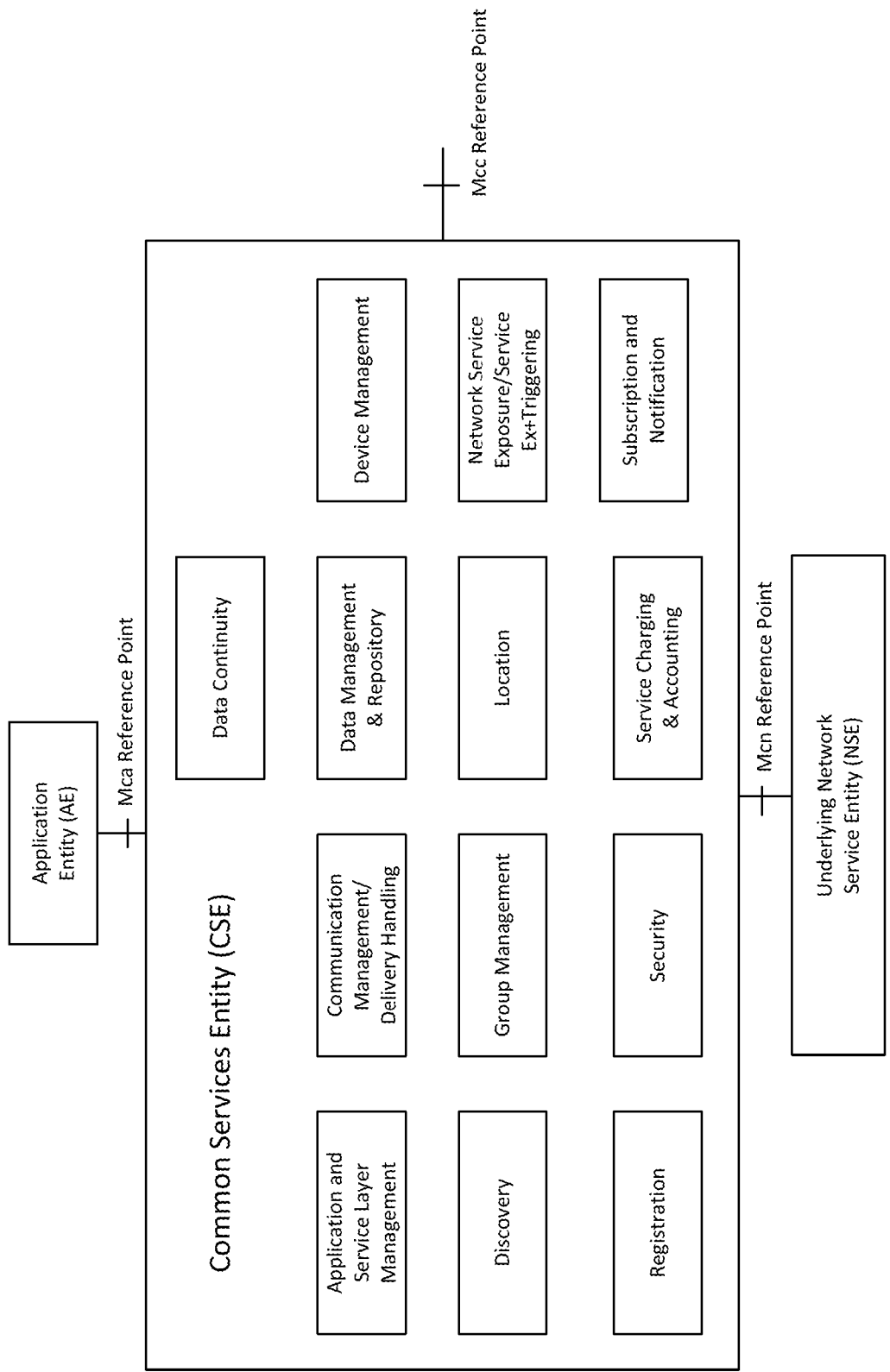
FIG. 26 shows an example new Data Continuity CSF.

The Data Continuity CSF shown in FIG. 26 may be found in the IN-CSE as well as MN-CSEs and ASN-CSEs. This new CSF supports procedures and processes defined for the Local SLs and the Aggregator SL. In addition, AEs and CSEs support procedures and processes defined for the Data Producer and Data Consumer. The proposed resources and procedures related to the Service Layer may be implemented in a CSE. Additionally or alternatively, the new functionality proposed herein may be implemented in an existing CSF—for example the Data Management and Repository CSF.

In order to implement the Data Continuity methods described, all the request/response exchanges may need to be mapped to oneM2M CRUDN exchanges. An example mapping is shown in Table 2:

TABLE 2 oneM2M CRUDN Exchanges

| Request/Response Exchange | oneM2M CRUDN Exchange | Description |
|---|---|---|
| dataContinuityService | CREATE registration resource (<AE> or <CSE>) | Used to initiate the data service between the Data Producer and the M2M/IoT system. Data Producer provides information as to its type, data sets, preferred method and supported methods |
| storeData | CREATE content resource (<contentInstance> or <timeSeriesInstance>) | Exchange to store a data entry into a data set |
| RUD | Corresponding Retrieve, Update, or Delete targeting content sharing resources | Any retrieve/update/delete request on a data set |
| dataService | CREATE service resource (e.g. <subscription>). Note that in some cases, the data service is started automatically by the SL - for example for <container> and <timeSeries> resources), and no explicit dataService request is needed. | Exchange to start a data service |
| updateDataService | NOTIFY data service creator | This exchange is applicable to Method 3. It allows the M2M/IoT system to notify the creator of a data service that the service is now running on a different SL |
| stopDataService | DELETE service resource | Exchange to stop a data service |
| updateDataSetLink | NOTIFY prior Registrar CSE | This exchange is applicable to Method 3. It allows the M2M/IoT system to keep the links between the data sets in sync. In particular, used to update the futureDataSetLink attribute |
| getMappingInfo | RETRIEVE request to the prior Registrar CSE | This exchange is applicable to Method 1b. It allows a local SL to retrieve the address of the Aggregator SL for an aggregated data set. |
| getAggrDataSet | RETRIEVE request to the data sharing resource on the prior CSE. | This exchange is applicable to Method 3. It allows the M2M/IoT system to transfer all data and services from the prior Local SL to the current Local SL |

New Request Parameters—the following new Request parameters are proposed to implement some to the functionality disclosed herein:

(1) aggDataSetIdentifier: optional parameter to identify the aggregated data set of an Originator. An Originator may generate multiple data sets. This identifier may be used to differentiate between these data sets. This identifier may be assigned by the Originator, and used in all exchanges that target an aggregated data set. An Originator guarantees that each of its data sets has a unique identifier. The combination of Originator identifier and aggDataSetIdentifier uniquely identifies an aggregated data set in the oneM2M system;

(2) retargetFlag: optional parameter used for Method 1b (M2M/IoT System driven case). Boolean which tells the oneM2M system if the request should be retargeted to an Aggregator SL;

(3) dataContinuityFlag: optional parameter used for all methods to indicate to the current Registrar CSE if this data is to use the data continuity service. It applies, for example, to the CREATE operation. If TRUE, the current Registrar CSE uses the agreed method to provide data continuity;

(4) localSLIdentifier: optional parameter used in all Methods. It is used in Request/Update/Delete requests to identify the part of the aggregated data set that was created when the data producer was registered to a particular CSE. An aggregated data set may have data that is generated while the originator is registered to different CSEs. An originator may issue a request with localSLIdentifier=CSE1 to tell the hosting CSE that the request is only targeting the part of the data set that was created when the data producer was registered to CSE1. An originator may also issue a request with localSLIdentifier="aggregate" to identify that the request targets the aggregated data set. This parameter is also used in Create requests for Method 1a (Data Producer driven case) so that the Aggregator CSE may note where the Data Producer was registered when the data was produced.

(5) priorLocalSLIdentifier: optional parameter used in Method 1b (M2M/IoT System driven case) and in Methods 2 and 3. It tells the current registrar CSE about the identity of the last CSE where the originator was registered. This allows the current Registrar CSE to query the prior Registrar CSEs.

Figure 27A:
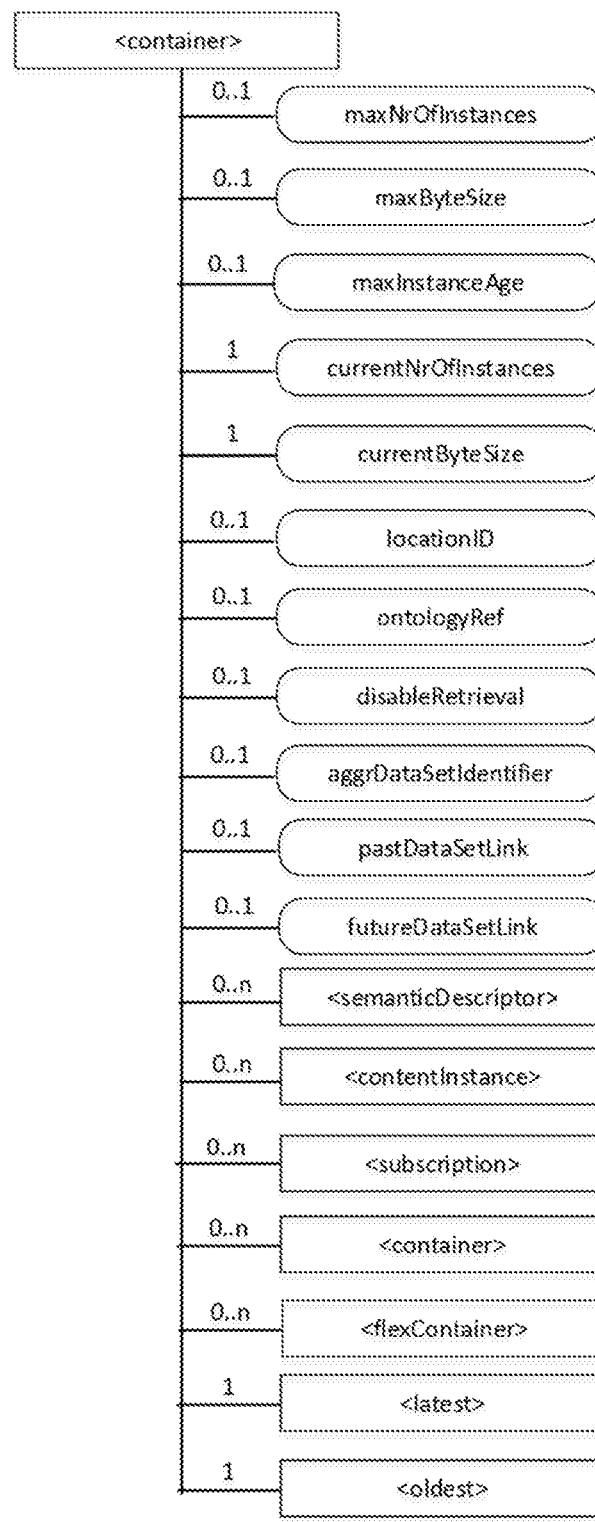
FIG. 27A shows an example new attribute for <container>.
Figure 27B:
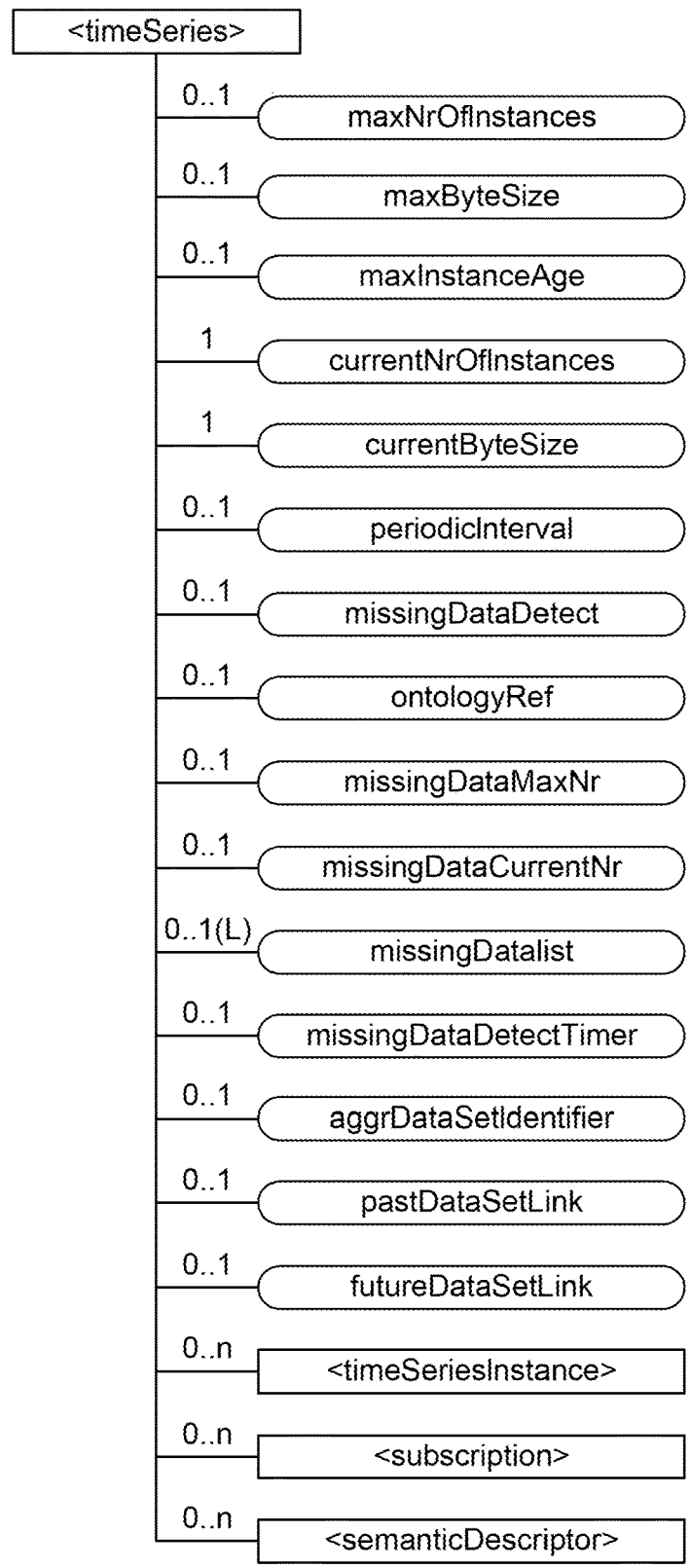
FIG. 27B shows an example new attribute for <timeSeries>.
Figure 27C:
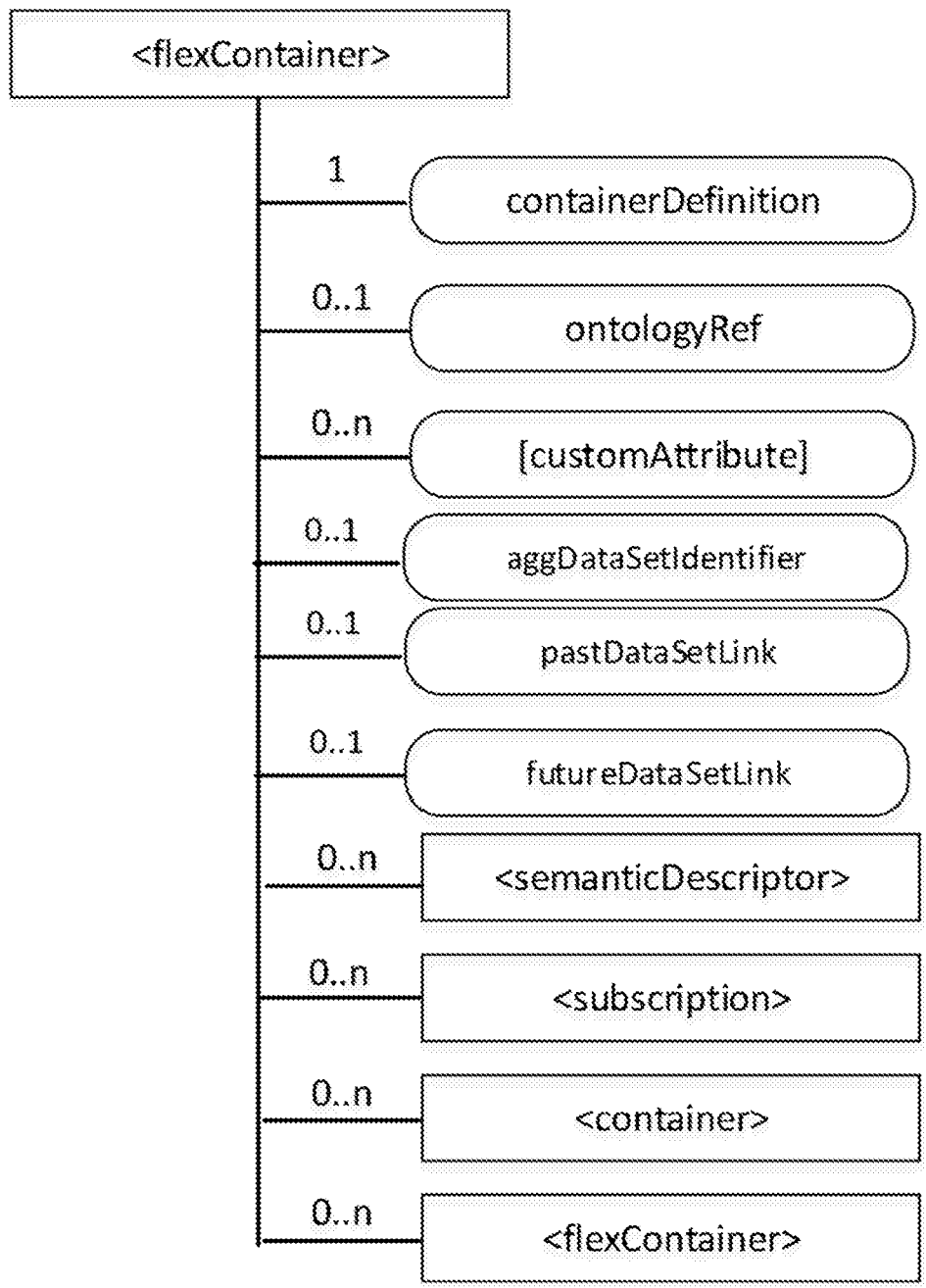
FIG. 27C shows an example new attribute for <flexContainer>.

In oneM2M, data sets are implemented either as <container>, <flexContainer> or <timeSeries> resources. New attributes have been added to these resources to enable the functionality described herein, as shown in FIG. 27. The <container>, <flexContainer> and <timeSeries> resources may contain the new attributes specified in Table 3.

TABLE 3

New Attributes for data sharing resources

| Attributes of <container> <flexContainer> and <timeSeries> | Multiplicity | RW/RO/ WO | Description | <containerAnnc> Attributes |
|---|---|---|---|---|
| aggDataSetIdentifier | 0 . . . 1 | RW | If present, indicates that resource is part of an aggregated data set which is identified by this identifier. The originator specifies this identifier when the data sharing resource is created. An originator may have more than one aggregated data set, and each is identified by a unique aggDataSetIdentifier. Additional details are provided in the Information flows | NA |
| pastDataSetLink | 0 . . . 1 | RO | Attribute may apply only to Method 3. If present, indicates that the container is part of an aggregated data set. This link points to the data set resource stored in the last CSE where the originator was registered. It is provided by the originator in the priorLocalSLIdentifier request parameter, when the data sharing resource is created. Initially set to NULL for the first data set resource of an aggregated data set. | NA |
| futureDataSetLink | 0 . . . 1 | RW | Attribute may apply only to Method 3. If present, indicates that the data sharing resource is part of an aggregated data set. This link points to the future data set resources. When an originator creates a data sharing resource in a new CSE, the new CSE notifies the prior CSE. As a result of this notification, the new CSE updates the futureDataSetLink of the data sharing resource to point to the new CSE. | NA |

New Attributes for Content Instance and Time Series Instance resources (<timeSeriesInstance> and <contentInstance>)—If <timeSeriesInstance> (or <contentInstance>) resources are part of an aggregated data set, they may have a new local SLIdentifier attribute. This attribute defines the CSE where the data producer was registered when the <timeSeriesInstance> (or <contentInstance>) was created.

New Attributes for Registration resources (<AE> and <remoteCSE>)—As part of the registration procedures, an Originator may initiate the Data Continuity Service. As oneM2M implements registration through the creation of <AE> and <remoteCSE> resources, Table 4 lists the new attributes of these registration resources that enable this initiation.

TABLE 4

New Attributes of <AE> and <remoteCSE> resources

| Attributes of <AE> and <remoteCSE> | Multiplicity | RW/RO/ WO | Description | <remoteCSEAnnc> Attributes |
|---|---|---|---|---|
| dataProdType | 0 . . . 1 | RW | Type of data producing AE or CSE. This is a string from a set of standard types. | NA |
| dataSetID | 0 . . . 1(L) | RW | List of data set identifiers to be produced by the originator (AE or CSE) | NA |
| dataSetType | 0 . . . 1(L) | RW | List of data set types for each of the data sets to be produced by the originator (AE or CSE) | NA |

TABLE 4-continued

New Attributes of <AE> and <remoteCSE> resources

| Attributes of <AE> and <remoteCSE> | Multiplicity | RW/RO/WO | Description | <remoteCSEAnnc> Attributes |
|---|---|---|---|---|
| dataContPref | 0 ... 1 | RW | Originator preferred method for data continuity. May correspond to any of the Methods described herein. | NA |
| dataContSupp | 0 ... 1(L) | RW | Supported Data Continuity methods for the Originator | NA |
| dataProdMobInd | 0 ... 1 | RW | Boolean indicator denoting if Originator is mobile | NA |
| dataContSel | 0 ... 1 | RO | The selected data continuity method. May correspond to any of the Methods described herein. | NA |
| addrAggregatorSL | 0 ... 1(L) | RO | Attribute applies only to Method 1a and Method 1b. URI of Aggregator SL. Note that there is a one to one correspondence between entries in this list and entries in the dataSetID list. That is, the first Aggregator SL identified in the latter list applies to the first aggregated data set identified in the former list | NA |

New Attributes for Data Service resources (<subscription>, <container>, <timeSeries>)—When using Method 3, each of the resources that implement data services may need to maintain attributes from prior Registrar CSEs of an Originator. For example, if a service is running to cap the number of content instances in an aggregated data set, the current Registrar CSE may need to know how many content instances exist in all prior Registrar CSEs. This attribute history may be stored as a list of complex attributes of the data service resource.

TABLE 5

New Attributes of data service resources

| Attributes of data service resource (<subscription>, <container>, <timeSeries>) | Multiplicity | RW/RO/WO | Description | <remoteCSEAnnc> Attributes |
|---|---|---|---|---|
| dataSetPriorSLIdentityList | 0 ... 1(L) | RW | Attribute may apply only to Method 3. List of identities of CSEs that host data sets linked to the aggregated data set (prior Registrar CSEs). When an aggregated service is created in a hosting CSE that hosts only a part of the aggregated data set, the hosting CSE may need to retrieve attributes in other CSEs to provide the requested aggregated service. The hosting CSE uses the pastDataSetLink of the data sharing resource to recursively find all prior CSEs that have data sets that are part of the aggregate data set. The identities of these prior CSEs are stored in this dataSetPriorSLIdentityList attribute | NA |
| dataSetPriorSLAttributeList | 0 ... 1(L) | RW | Attribute may apply only to Method 3. List of comma separated attributes that are tied to the data sets stored in the prior Registrar CSEs and that are required to perform the aggregated service. For each of the prior CSEs in the dataSetPriorSLIdentityList, the hosting CSE may need to retrieve a set of attributes so that it can provide the requested aggregated service. These attributes are stored in the hosting CSE in the | NA |

TABLE 5-continued

New Attributes of data service resources

| Attributes of data service resource (<subscription>, <container>, <timeSeries> | Multiplicity | RW/RO/WO | Description | <remoteCSEAnnc> Attributes |
|---|---|---|---|---|
| | | | dataSetPriorSLAttributeList. For example, if the aggregated data service is monitoring the total number of content instances in an aggregated data set stored in <container> resources, then the dataSetPriorSLAttributeList contains the number of content instances in each of the data sets stored in the CSEs identified in the dataSetPriorSLIdentityList attribute. | |

New virtual <virDataSet> Resource—The <virDataSet> is a virtual resource applicable to Method 1b (M2M/IoT System Driven case). It may be a child resource of a <CSEBase> resource. When a request addresses the <virDataSet> resource, the Hosting CSE may use this as an indication that the request is targeting an Aggregator SL. The Hosting CSE may look at additional parameters to uniquely identify the aggregated data set and forward the request to the correct Aggregator SL.

Figure 28:
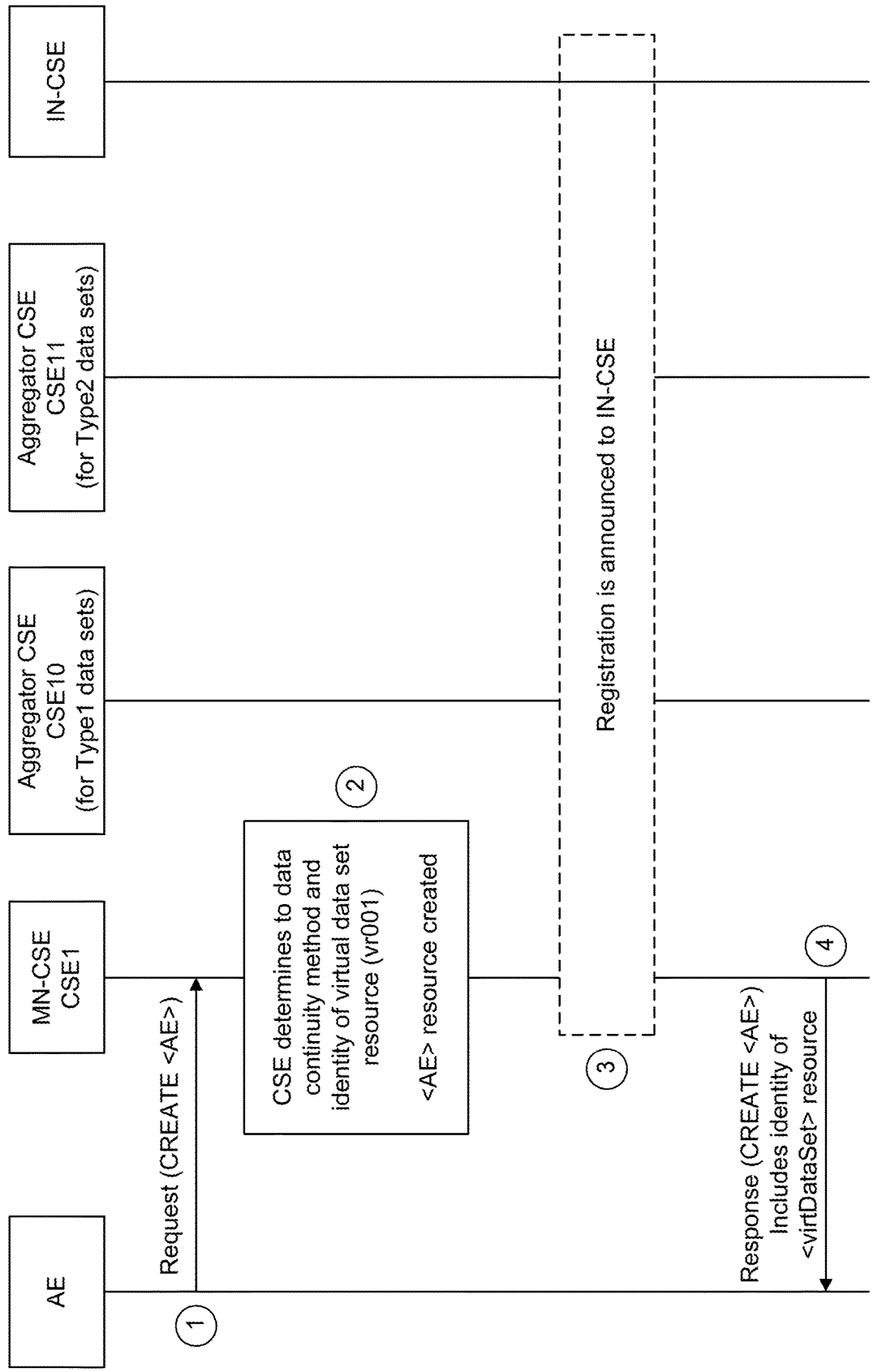
FIG. 28 shows an example AE registration information flow.

A modified Registration Information Flow for a preferred embodiment based on Method 1b is shown in FIG. 28 and is discussed below. It is assumed that the originator is an AE.

In step 1, AE issues a CREATE <AE> request to Registrar CSE (CSE1). The <AE> resource includes the following:
  dataProdType: "Heart Rate monitor";
  dataSetID: identifiers for the data sets produced by this AE (e.g. DS001, DS001, DS003);
  dataSetType: the type of data for each of the data sets in the dataSetID list (e.g. Type1, Type2, Type1);
  dataContSupp and dataContPref: Method 1b; and
  dataProdMobInd=TRUE.

In step 2, CSE1 determines the method of providing the data continuity service. In this example, CSE1 selects Method 1b, the only method supported by the AE. CSE1 then selects an Aggregator CSE for each of the data sets, as well as the identity of the virtual resource that may be used to interact with CSE1 (vr001). In this information flow, it may be assumed that all the data sets of Type1 are stored in CSE10 and data sets of Type2 are stored in CSE11. CSE then creates the <AE> resource and sets the following attributes:

| | |
|---|---|
| dataProdType | Heart Rate Monitor |
| dataSetID | DS001, DS001, DS003 |
| dataSetType | Type1, Type2, Type1 |
| dataContPref | Method 1b |
| dataContSupp | Method 1b |
| dataProdMobInd | TRUE |
| dataContSel | Method 1b |
| addrAggregatorSL | CSE10, CSE11, CSE10 |

In Step 3, registration may be announced to IN-CSE. Step 3 is an optional step depending on whether the AE requested that its registration be announced to the IN-CSE.

In step 4, CSE1 responds to CREATE request. This response may include the identity of the <virtDataSet> resource. The AE may use this virtual resource for any future interactions with the oneM2M system related to one of the data sets.

Figure 29A:
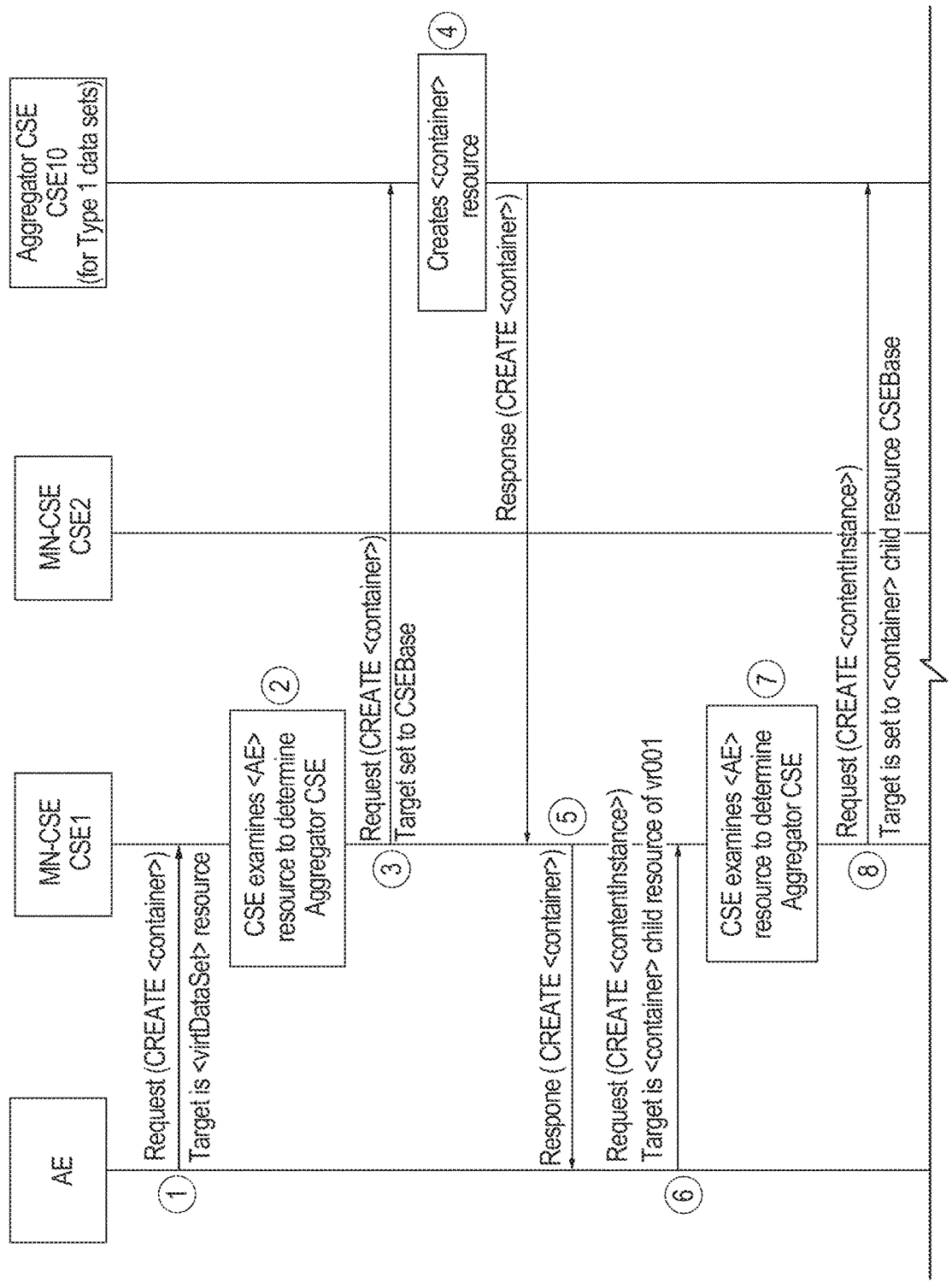
FIGS. 29A, 29B and 29C show an example CREATE data set information flow.
Figure 29B:
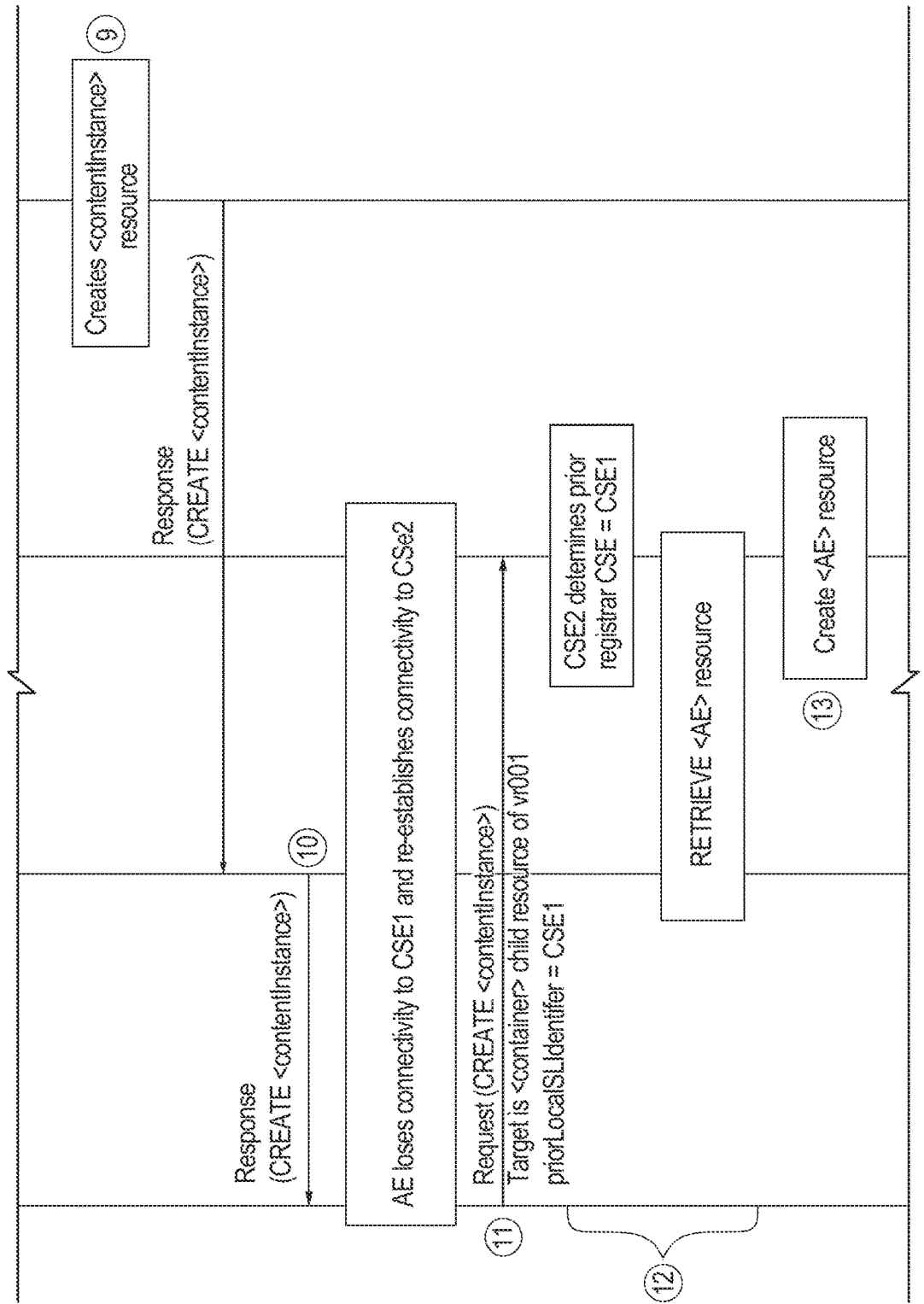
Figure 29C:
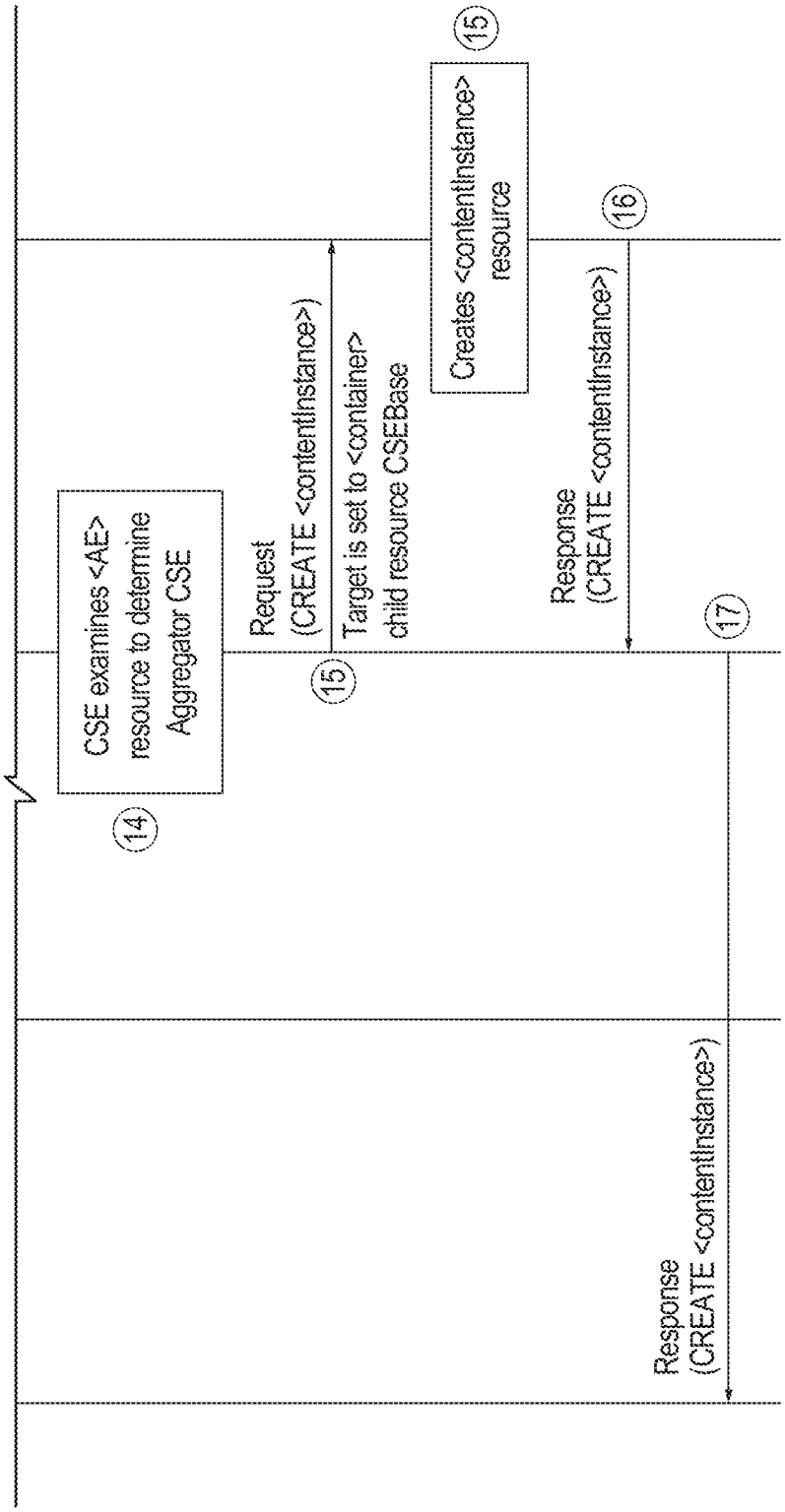

A modified CREATE request Information Flow for a preferred embodiment based on Method 1b is shown in FIG. 29 and described below. It is assumed that the AE has already registered with CSE1, and that it wishes to create content instances for data set DS001.

In step 1, AE issues a CREATE <container> resource to CSE1. The resource targets the <virtDataSet> resource on CSE1 (vr001). This request may contain the following parameters:
  dataContinuityFlag=TRUE;
  aggDataSetIdentifier=DS001; and
  priorLocalSLIdentifier=NULL In step 2, CSE1 uses the identity of the AE (AE-ID) and the aggregated data set identifier (DS001) to determine the address of the aggregate CSE. This information is in the addrAggregatorSL attribute of the <AE> resource. For this case, the Aggregator CSE is CSE10.

In step 3, CSE1 retargets the CREATE request to CSE10. The target may be set to <CSEBase> resource.

In step 4, CSE10 creates the <container> resource with the following attributes: aggDataSetIdentifier=DS001. CSE10 issues a CREATE <container> response to CSE1.

In step 5, CSE1 retargets the CREATE <container> response to the AE.

In step 6, AE issues a CREATE <contentInstance> resource to CSE1. The resource targets the <container> child resource of vr001. This request may contain the following parameters:
  dataContinuityFlag=TRUE;
  aggDataSetIdentifier=DS001; and
  priorLocalSLIdentifier=NULL In step 7, CSE1 uses the identity of the AE (AE-ID) and the aggregated data set identifier (DS001) to determine the address of the aggregate CSE. This information is in the addrAggregatorSL attribute of the <AE> resource. For this case, the Aggregator CSE is CSE10.

In step 8, CSE1 retargets the CREATE request to CSE10.

In step 9. CSE10 creates the <contentInstance> resource and includes the following attribute: localSLIdentifier=CSE1. CSE10 issues a CREATE <contentInstance> response to CSE1

In step 10, CSE1 retargets the CREATE <contentInstance> response to the AE.

Some time later, the AE losses connection to CSE1 and re-registers to CSE2. As part of this re-registration, the IN-CSE may have provided CSE2 with the all the information shown in Step 2 of the Registration Information Flow.

Alternatively, CSE2 may query CSE1 to find this information. This latter option is shown below.

In step 11, AE issues a CREATE <contentInstance> resource to CSE2. The resource targets the <container> child resource of vr001. This request contains the following parameters:
 dataContinuityFlag=TRUE;
 aggDataSetIdentifier=DS001; and
 priorLocalSLIdentifier=CSE1.

In step 12, from the priorLocalSLIdentifier, CSE2 observes that the AE had a prior registration to CSE1. CSE2 retrieves the <AE> resource from CSE1.

In step 13, CSE2 re-creates the <AE> resource.

In step 14, CSE2 uses the identity of the AE (AE-ID) and the aggregated data set identifier (DS001) to determine the address of the aggregator CSE (CSE10).

In step 15, CSE2 retargets the CREATE request to CSE10.

In step 16, CSE10 creates the <contentInstance> resource and includes the following attribute: localSLIdentifier= CSE2. CSE10 issues a CREATE <contentInstance> response to CSE2

In step 17, CSE2 retargets the CREATE <contentInstance> response to the AE.

A modified RETRIEVE Information Flow for a preferred embodiment based on Method 1b is described below. The procedure for UPDATE and DELETE requests is very similar. It may be assumed that AE is currently registered with CSE5, and that it wishes to retrieve the entire aggregated data set with identifier DS001. The aggregated data set is stored in a <container> resource in CSE10, and has <contentInstance> child resources created while the AE was registered with CSE1, CSE2, CSE3, CSE4, and CSE5.

In step 1, AE issues a RETRIEVE request to CSE5 targeting the <container> child resource of resource vr001. The request includes the following parameters:
 aggDataSetIdentifier=DS001;
 localSLIdentifier="aggregate"; and
 priorLocalSLIdentifier=CSE4

In step 2, CSE5 uses the identity of the AE (AE-ID) and the aggregated data set identifier (DS001) to determine the address of the aggregator CSE (CSE10);

In step 3, CSE5 retargets the RETRIEVE request to CSE10;

In step 4, As localSLIdentifier="aggregate", CSE10 retrieves the entire aggregated data set (the <container> resource and all its <contentInstance> child resources). It prepares a representation and issues a RETRIEVE <container> response to CSE5;

In step 5, CSE5 retargets the RETRIEVE <container> response to the AE.

Figure 31:
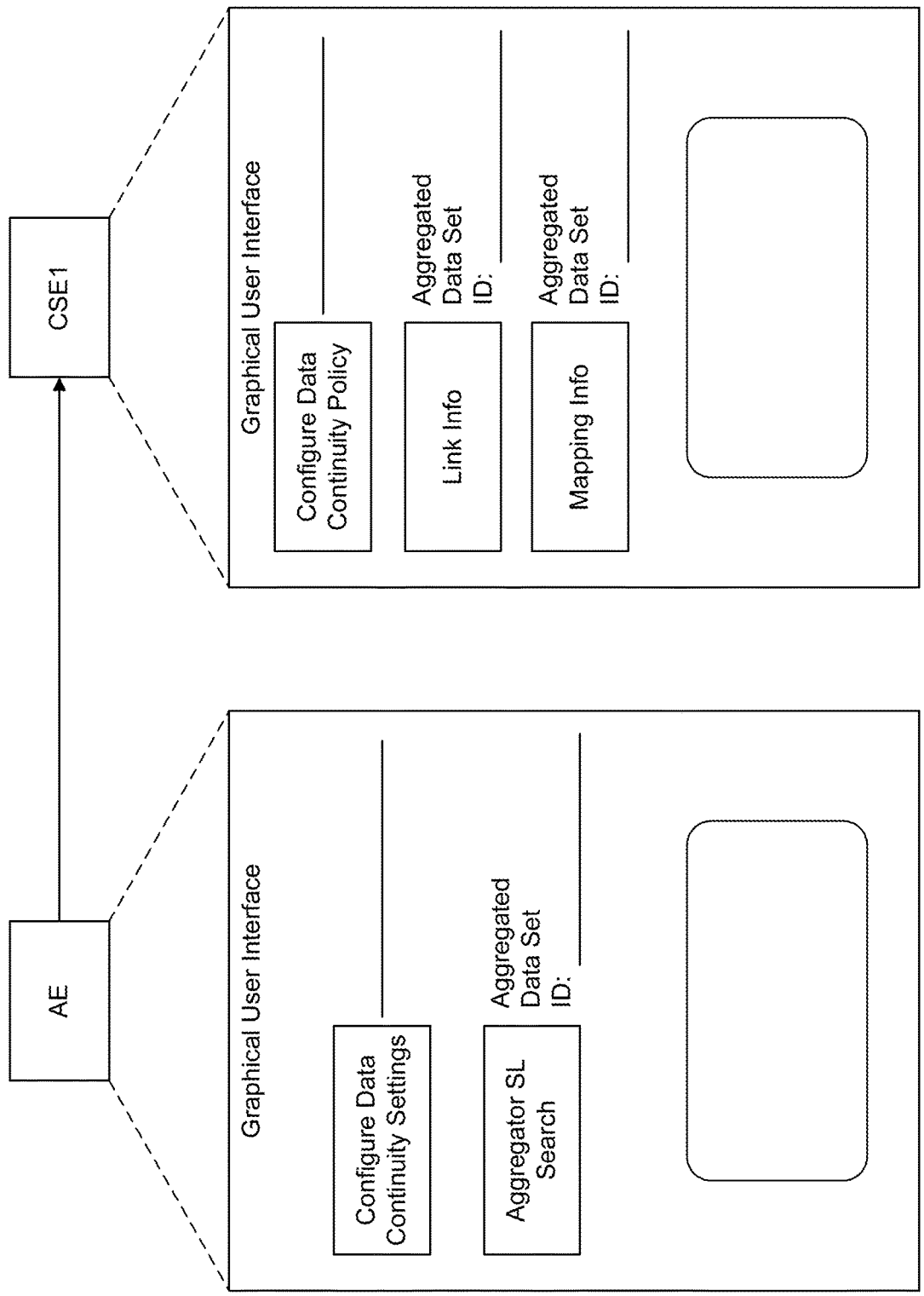
FIG. 31 shows an example graphical user interface.

FIG. 31 shows an example graphical user interface (GUI). A user interface can be added to the AEs, for example, to query a CSE for information pertaining to an aggregator data set (e.g., the Aggregator SL), check if Data Continuity support is activated for an AE, or provide configuration information for Data Continuity (supported methods, preferred methods, data producer type, etc.). A user interface can be added to the CSEs, for example, to query another CSE for information pertaining to an aggregator data set (for example the Aggregator SL), query for the mappingInfo for a particular aggregated data set (or all aggregated data sets), display link information for a particular aggregated data set (or all aggregated data sets), and configure the policies for Data Continuity Service initiation.

Figure 32A:
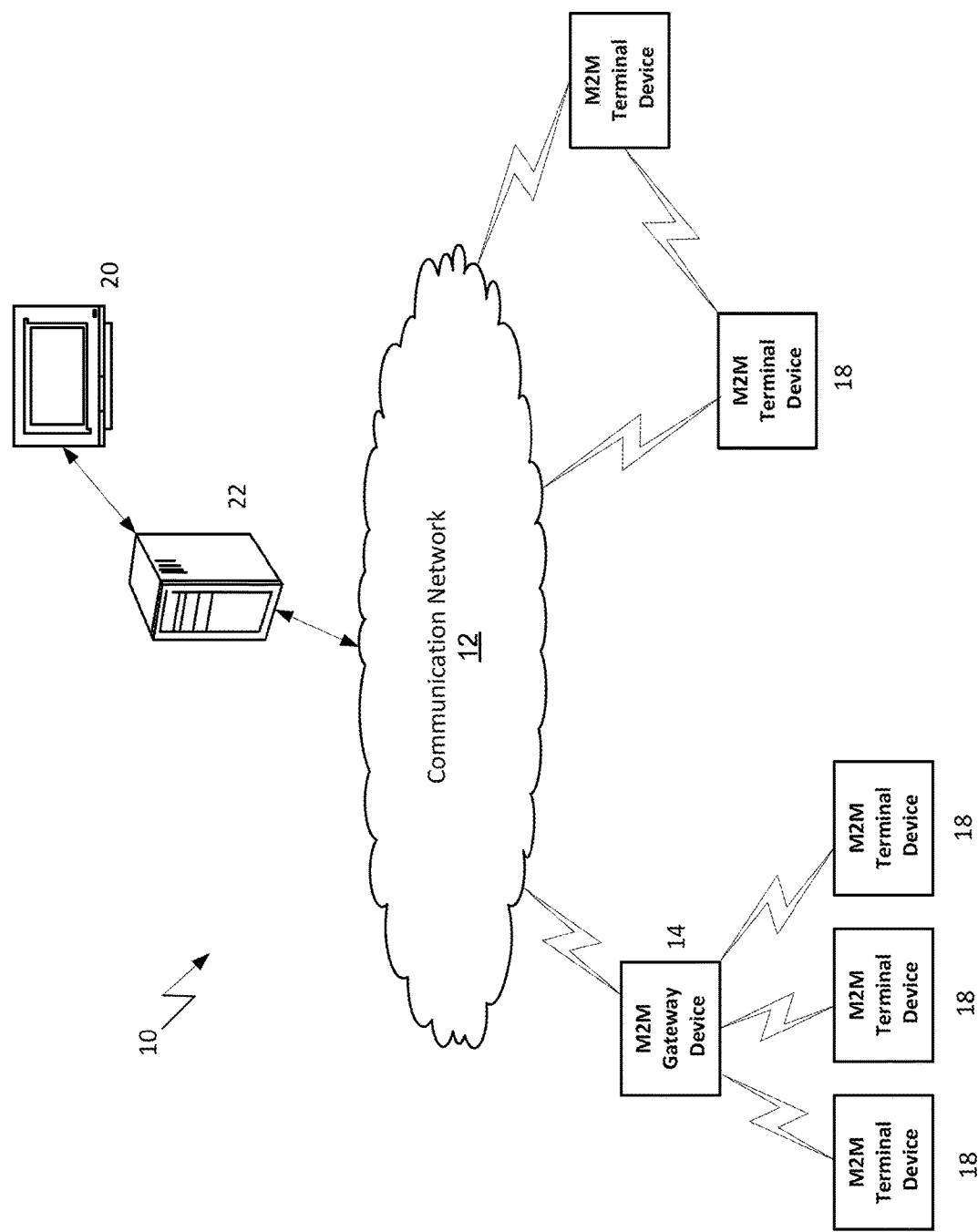
FIG. 32A shows an example system diagram of an example machine-to-machine (M2M) or Internet of Things (IoT) communication system in which one or more disclosed embodiments may be implemented.

FIG. 32A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1, 3-26 and 28-30 may comprise a network apparatus of a communication system, such as the ones illustrated in FIGS. 32A-32D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 32A, the M2M/ IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 32A, the M2M/ IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 32B:
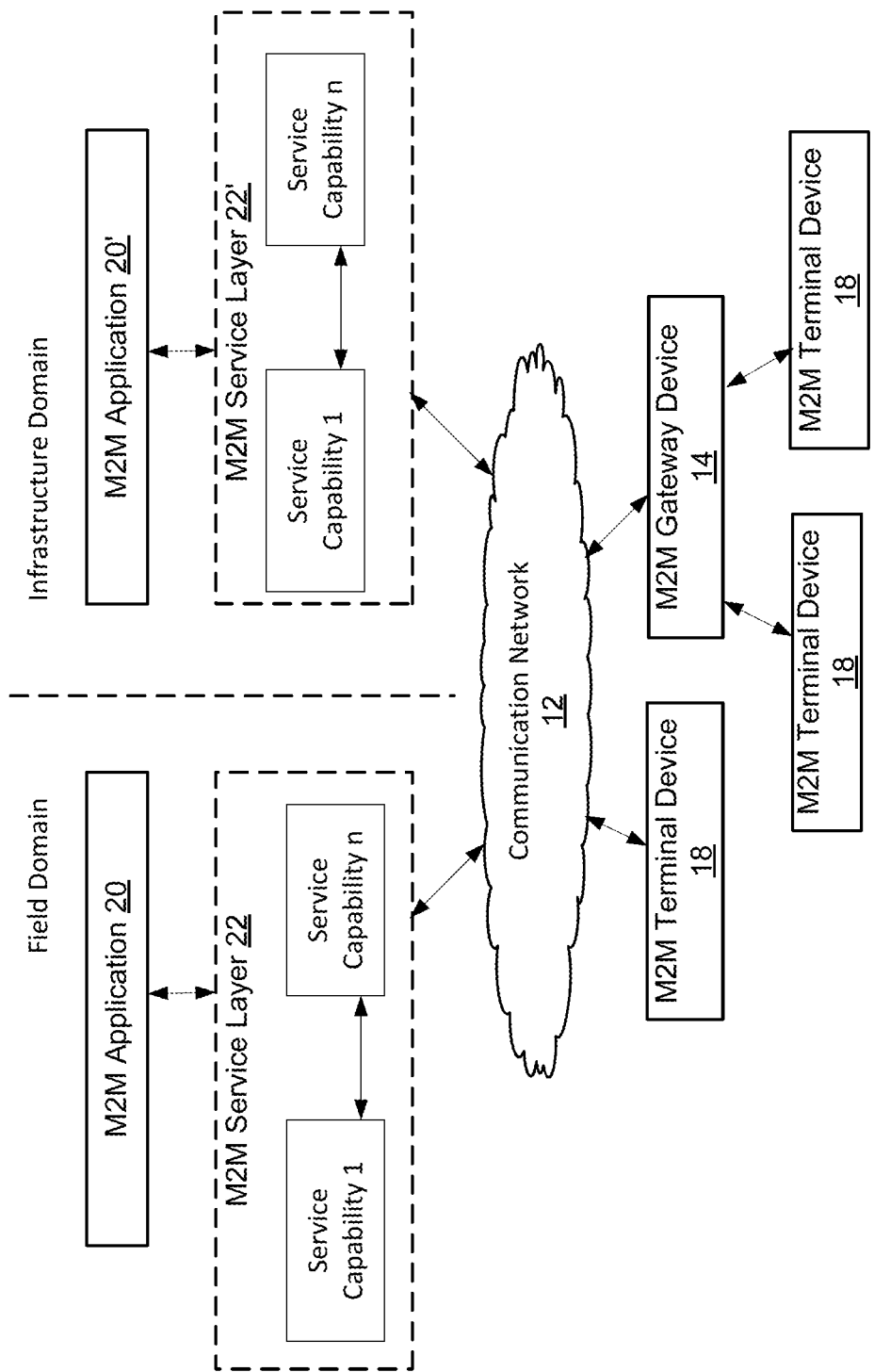
FIG. 32B shows an example system diagram of an example architecture that may be used within the M2M/IoT communications system illustrated in FIG. 32A.

Referring to FIG. 32B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 32B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 32B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 32C or FIG. 32D described below.

Further, the methods and functionalities described herein may be implemented as part of an M2M network that uses a Service Oriented Architecture (SOA) and/or a Resource-Oriented Architecture (ROA) to access services.

Figure 32C:
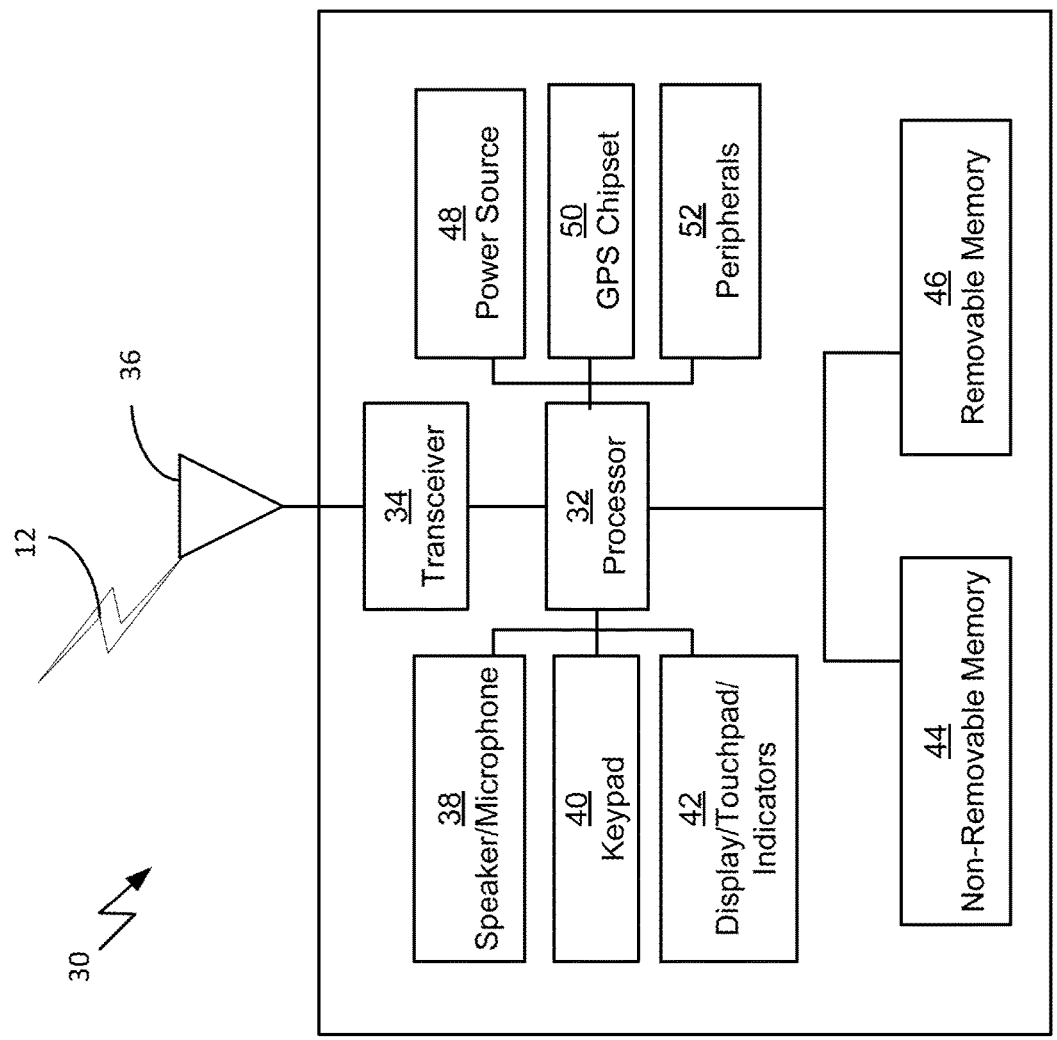
FIG. 32C shows an example system diagram of an example M2M/IoT terminal or gateway device that may be used within the communications system illustrated in FIG. 32A.
Figure 32D:
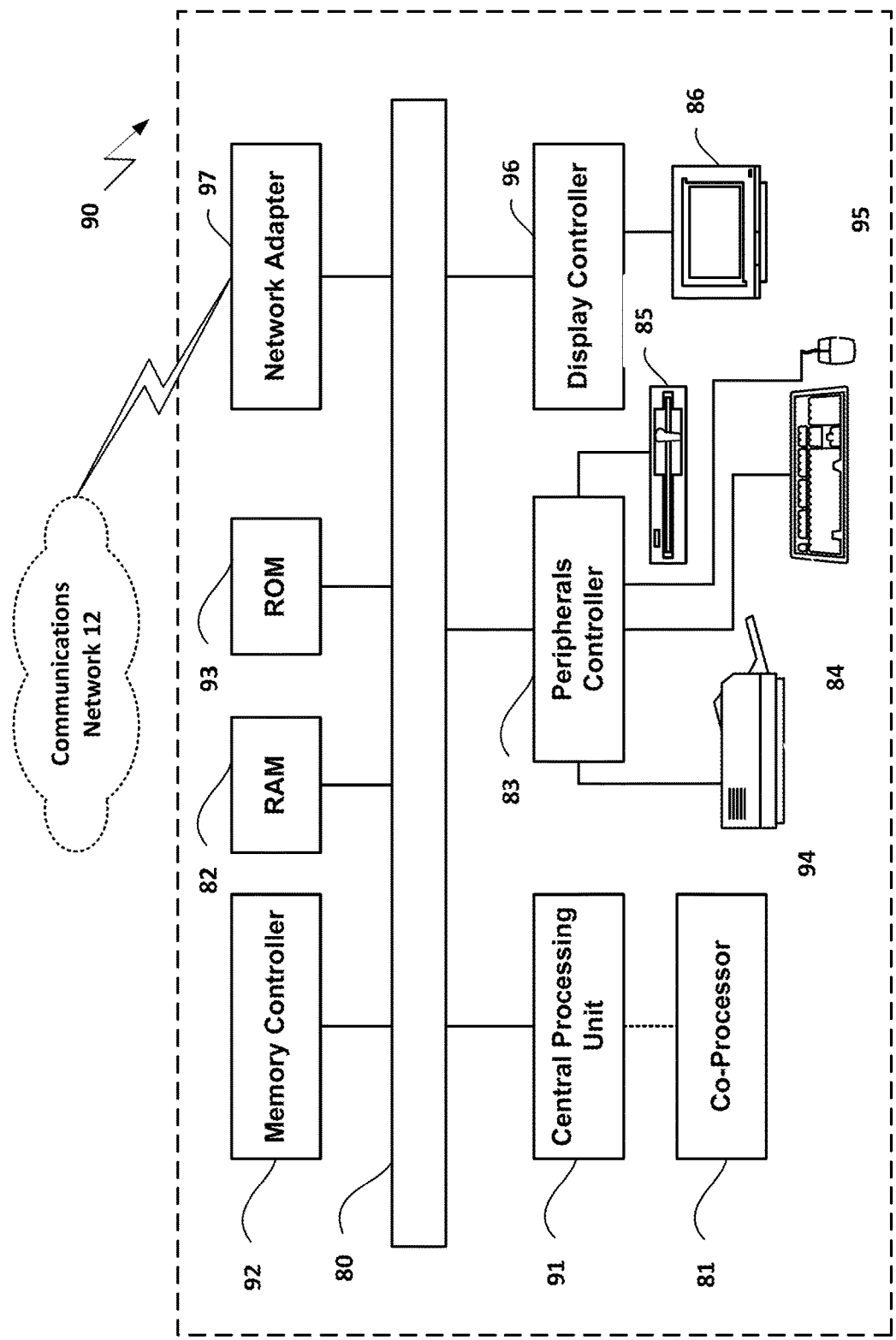
FIG. 32D shows an example block diagram of an example computing system in which aspects of the communication system of FIG. 32A may be embodied.

FIG. 32C is a block diagram of an example hardware/software architecture of an apparatus of a network, such as one of the entities illustrated in FIGS. 1, 3-26 and 28-30, which may operate as an M2M server, gateway, device, or other network apparatus in an M2M network such as that illustrated in FIGS. 32A and 32B. As shown in FIG. 32D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the message template management capabilities and methods described herein, such as the methods operations illustrated and described in relation to FIGS. 11-25 and 28-30.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 32C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 11-25 and 28-30) and in the claims. While FIG. 32C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 32C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 31 and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

Figure 30:
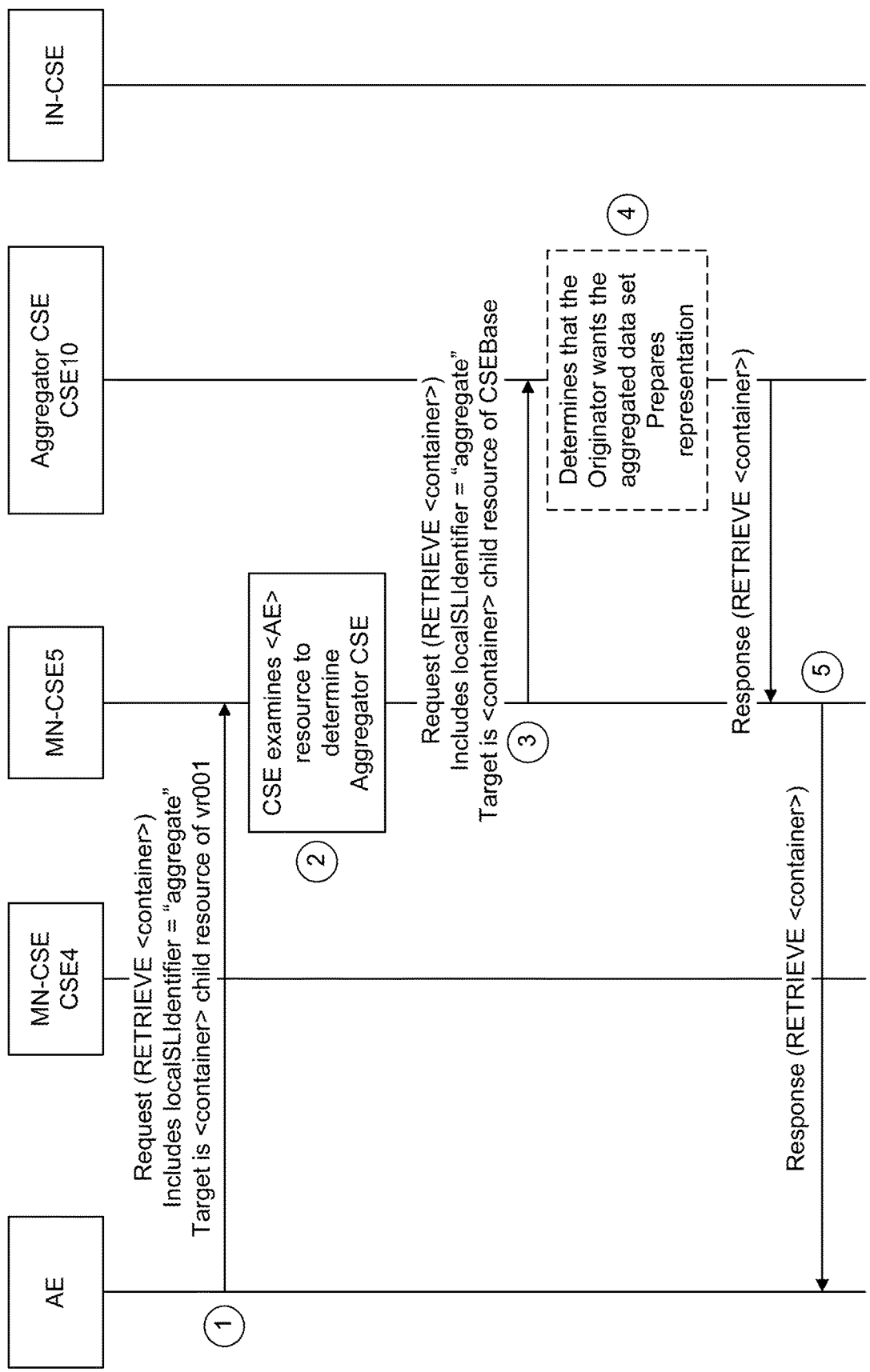
FIG. 30 shows an example RETRIEVE data set information flow.

FIG. 30 is a block diagram of an exemplary computing system 90 which may also be used to implement one or more network apparatuses of a network, such as the entities illustrated in FIGS. 1, 3-26 and 28-30 and described herein, which may operate as an M2M server, gateway, device, or other network apparatus in an M2M network such as that illustrated in FIGS. 32A and 32B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 31 and its accompanying description.

Further, computing system 90 may contain communication circuitry, such as for example a network adaptor 97, that may be used to connect computing system 90 to an external communications network, such as network 12 of FIG. 32A-32D, to enable the computing system 90 to communicate with other apparatuses of the network. The communication circuitry, alone or in combination with the CPU 91, may be used to perform the transmitting and receiving steps described herein (e.g., in FIGS. 11-25 and 28-30) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

| | |
|---|---|
| ADN | Application Dedicated Node |
| AE | Application Entity |
| API | Application Programming Interface |
| App | Application |
| ASM | Application and Service Layer Management |
| ASN | Application Service Node |
| BP | Branching Point |
| CMDH | Communication Management and Delivery Handling |
| CRUD | Create, Retrieve, Update, and Delete |
| CSE | Common Service Entity |
| CSF | Common Service Function |
| DIS | Discovery |
| DMR | Data Management and Repository |
| HTML | Hypertext Markup Language |
| HTTP | Hypertext Transfer Protocol |
| IN | Infrastructure Node |
| IoT | Internet of Things |

-continued

| | |
|---|---|
| IP | Internet Protocol |
| LOC | Location |
| M2M | Machine-to-Machine |
| MN | Middle Node |
| NSE | Underlying Network Services Entity |
| NSSE | Network Service Exposure, Service Execution and Triggering |
| REG | Registration |
| ROA | Resource Oriented Architecture |
| SC | Service Capability |
| SCA | Service Charging and Accounting |
| SEC | Security |
| SL | Service Layer |
| SUB | Subscription and Notification |
| UDP | User Datagram Protocol |
| URI | Uniform Resource Identifier |
| XML | Extensible Markup Language |

The following is a list of terms and definitions relating to service layer technologies that may appear in the above description. Unless otherwise specified, the terms and definitions used herein refer to the corresponding term listed below:

| Term | Definition |
|---|---|
| Aggregated Data Set | The aggregation of all Local Data Sets of a Data Producer. These Local Data Sets may be stored in one or more Local service layers. |
| Aggregator SL | A SL which hosts the aggregated data set for a Data Producer |
| Announced Resource | An original resource may be announced (published, advertised) to a remote SL. The resource at the remote SL is known as an announced resource. The announced resource is linked to the original resource and maintains some of the attributes of the original resource. |
| Common Services Entity | oneM2M term for an instantiation of a set of Common Service Functions. |
| Common Services Function | oneM2M term for a Service Capability/ Functionality that resides in the common Service Layer. |
| Connectivity Service | A service layer functionality that allows the Data Producer to connect to the M2M/IoT system. |
| Hosting SL | A SL which hosts various resources |
| Local Data Set | A set of data that is produced by a Data Producer and stored in a service layer. |
| M2M/IoT Service | M2M oriented capabilities that are provided to applications, typically through Application Program Interfaces |
| M2M/IoT Service Node | A network node hosting a service layer supporting one or more service capabilities for M2M/IoT communication. |
| M2M/IoT System | Set of M2M/IoT Service Nodes that provides M2M/IoT Services to applications, data producers, data consumers, etc. |
| Middle Node CSE | The CSE in a middle node. |
| Middle Node | A node between the Originator and the Hosting SL |
| Original Resource | A created resource hosted in a SL (e.g. oneM2M CSE). An original resource may be announced to a remote SL. |
| Data Consumer | An entity that uses data stored in the service layer. |
| Data Producer | An entity that generates data and uses the service layer to store this data, allow Data Consumers to have access to this data, and provided Data Services on this data. |
| Data Service | A value added service running on a set of data. The Service Layer offers these services to Data Consumers and Data Producers. Typical examples include: capping the number and size of data stored, checking that stored data is in a valid range, etc. |
| Data Set | A set of data that is generated by a Data Producer. |
| Service Capability | A specific type of service supported by a service layer |
| Receiver SL | The SL that is that target of a Request operation. For example, the SL where an Originator is trying to perform a resource discovery. |
| Registree SL | A SL that registers to a second SL to receive the services offered by the second SL. |
| Registrar SL | A SL that accepts registration requests from a Registree SL or application, and offers services to the Registree SL or application. |
| Remote SL | A SL that is not a Hosting SL of a resource. |
| resource-hosting entity | An entity (server, service layer) that hosts resources |
| resource-querying entity | An entity (server, service layer, application) that queries a resource-hosting entity to interact with a resource, in order to trigger an action on the resource-hosting entity. For example, start a service, store data, etc. |
| Service Users | Any entity that makes use of the services provided by an M2M/IoT system. Service Users may be applications in field nodes, applications running in the Internet, or service layers running in devices and gateways. |
| Subscription Profile | Profile tied to an entity Data producer, Data Consumer, or SL entity in the M2M/IoT system. The profile has basic operating conditions of the entity: the preferences on an entity, the features an entity supports, the capacity of an entity, etc. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method performed in a machine-to-machine/internet of things (M2M/IoT) system by a first service layer entity implemented on an apparatus of a communications network, the method comprising:
receiving a data continuity service request, wherein the data continuity service request comprises information associated with a computing device;
determining, based on the data continuity service request, to configure a second service layer entity implemented on another apparatus of the communications network for performing one or more data operations on data associated with the computing device;
configuring the second service layer entity for performing the one or more data operations on the data associated with the computing device;

receiving, from the computing device, a request to perform, by the first service layer entity, at least one data operation, wherein the request to perform the at least one data operation identifies a resource associated with the first service layer entity; and retargeting, to the second service layer entity, the request to perform the at least one data operation on at least a portion of the data.

2. The method of claim 1, further comprising:
sending, to the computing device, an indication that at least a portion of the data is stored at the second service layer entity.

3. The method of claim 2, wherein the indication that at least a portion of the data is stored at the second service layer entity comprises an identifier of the second service layer entity.

4. The method of claim 1, further comprising:
receiving, from the second service layer entity, a response indicating that the at least one data operation on the at least the portion of the data has been performed; and
sending, to the computing device, the indication that the at least one data operation on the at least the portion of the data has been performed.

5. The method of claim 1, wherein the computing device is pre-configured with information associated with the resource.

6. The method of claim 1, further comprising sending, based on configuring the second service layer entity for performing the one or more data operations on the data associated with the computing device, information associated with the resource.

7. The method of claim 1, wherein the request to perform the at least one data operation comprises a request to perform one or more of a create, update, retrieve, or delete operation associated with the data.

8. An apparatus in a machine-to-machine/internet of things (M2M/IoT) system comprising a processor and a memory, the memory storing computer-executable instructions which, when executed by the processor, implement a first service layer entity of a communications network and cause the first service layer entity to perform operations comprising:

receiving a data continuity service request, wherein the data continuity service request comprises information associated with a computing device;

determining, based on the data continuity service request, to configure a second service layer entity implemented on another apparatus of the communications network for performing one or more data operations on the data associated with the computing device;

configuring the second service layer entity for performing the one or more data operations on the data associated with the computing device;

receiving, from the computing device, a request to perform, by the first service layer entity, at least one data operation, wherein the request to perform the at least one data operation identifies a virtual resource associated with the first service layer entity; and retargeting, to the second service layer entity, the request to perform the at least one data operation on at least a portion of the data.

9. The apparatus of claim 8, wherein the instructions when executed further cause the first service layer entity to perform operations comprising:
sending, to the computing device, an indication that at least a portion of the data is stored at the second service layer entity.

10. The apparatus of claim 9, wherein the indication that at least a portion of the data is stored at the second service layer entity comprises an identifier of the second service layer entity.

11. The apparatus of claim 8, wherein the instructions when executed further cause the first service layer entity to perform operations comprising:
receiving, from the second service layer entity, a response indicating that the at least one data operation on the at least the portion of the data has been performed; and
sending, to the computing device, the indication that the at least one data operation on the at least the portion of the data has been performed.

12. The apparatus of claim 8, wherein the computing device is pre-configured with information associated with the resource.

13. The apparatus of claim 8, wherein the instructions when executed further cause the first service layer entity to perform operations comprising sending, based on configuring the second service layer entity for performing the one or more data operations on the data associated with the computing device, information associated with the resource.

14. The apparatus of claim 8, wherein the request to perform the at least one data operation comprises a request to perform one or more of a create, update, retrieve, or delete operation associated with the data.

15. The method of claim 1, wherein the service layer entity supports service capabilities through a set of Application Programming Interfaces (APIs).

16. The method of claim 15, wherein functions of the service layer entity are defined according to the European Telecommunications Standards Institute (ETSIs)/OneM2M.

17. The apparatus of claim 8, wherein the service layer entity supports service capabilities through a set of Application Programming Interfaces (APIs).

18. The apparatus of claim 17, wherein functions of the service layer entity are defined according to the European Telecommunications Standards Institute (ETSI)/OneM2M.

* * * * *